United States Patent
Ye et al.

(10) Patent No.: US 9,819,947 B2
(45) Date of Patent: Nov. 14, 2017

(54) METHODS, APPARATUS AND SYSTEMS FOR SCALABLE VIDEO CODING WITH MIXED INTERLACE AND PROGRESSIVE CONTENT

(71) Applicant: VID SCALE, INC., Wilmington, DE (US)

(72) Inventors: Yan Ye, San Diego, CA (US); Yong He, San Diego, CA (US); Yuwen He, San Diego, CA (US); Ralph Neff, San Diego, CA (US)

(73) Assignee: VID SCALE, INC., Wilmington, DE (US)

(*) Notice: Subject to any disclaimer, the term of this patent is extended or adjusted under 35 U.S.C. 154(b) by 260 days.

(21) Appl. No.: 14/581,488

(22) Filed: Dec. 23, 2014

(65) Prior Publication Data

US 2015/0189298 A1 Jul. 2, 2015

Related U.S. Application Data

(60) Provisional application No. 61/939,217, filed on Feb. 12, 2014, provisional application No. 61/923,110, filed on Jan. 2, 2014.

(51) Int. Cl.
*H04N 19/196* (2014.01)
*H04N 19/172* (2014.01)
(Continued)

(52) U.S. Cl.
CPC ......... *H04N 19/196* (2014.11); *H04N 19/117* (2014.11); *H04N 19/139* (2014.11);
(Continued)

(58) Field of Classification Search
None
See application file for complete search history.

(56) References Cited

U.S. PATENT DOCUMENTS

| 6,993,076 B1 * | 1/2006 | Comer | H04N 5/45 348/407.1 |
| 2004/0017852 A1 * | 1/2004 | Garrido | H04N 7/0125 375/240.16 |

(Continued)

FOREIGN PATENT DOCUMENTS

| WO | WO-2007/058328 | 5/2007 |
| WO | WO-2014/025741 | 2/2014 |

OTHER PUBLICATIONS

"Advanced video coding for generic audiovisual services", ITU-T Rec H.264 and ISO/IEC/MPEG 4 part 10, Mar. 2010, 676 Pages.
(Continued)

*Primary Examiner* — Mohammad J Rahman
(74) *Attorney, Agent, or Firm* — Theodore Naccarella

(57) ABSTRACT

Methods, apparatus, and systems for video coding/decoding are disclosed. One representative method includes a decoder receiving video content including at least a base layer (BL), an enhancement layer (EL) and phase information. The phase information includes an indicator indicating one or more sets of phase parameters from among plural sets of phase parameters. The method further includes assembling the BL into an inter-layer reference (ILR) picture based on the video content and the received phase information, selecting one or both of the ILR picture or an EL reference picture, and predicting a current EL picture using the phase information and one or more of the selected ILR picture or the selected EL reference picture.

26 Claims, 21 Drawing Sheets

(51) Int. Cl.

| | | |
|---|---|---|
| H04N 19/139 | (2014.01) | |
| H04N 19/513 | (2014.01) | |
| H04N 19/117 | (2014.01) | |
| H04N 19/16 | (2014.01) | |
| H04N 19/174 | (2014.01) | |
| H04N 19/70 | (2014.01) | |
| H04N 19/33 | (2014.01) | |

(52) U.S. Cl.
CPC ........... *H04N 19/16* (2014.11); *H04N 19/172* (2014.11); *H04N 19/174* (2014.11); *H04N 19/513* (2014.11); *H04N 19/33* (2014.11); *H04N 19/70* (2014.11)

(56) References Cited

U.S. PATENT DOCUMENTS

| | | | | |
|---|---|---|---|---|
| 2007/0116131 | A1* | 5/2007 | Sun | G06T 3/4007 375/240.29 |
| 2007/0140354 | A1* | 6/2007 | Sun | H04N 19/29 375/240.24 |
| 2007/0160153 | A1* | 7/2007 | Sullivan | G06T 3/4007 375/240.29 |
| 2008/0089597 | A1* | 4/2008 | Guo | H04N 19/30 382/238 |
| 2009/0310674 | A1* | 12/2009 | Le Leannec | H04N 19/33 375/240.12 |
| 2010/0283895 | A1* | 11/2010 | Sun | G06T 3/4007 348/448 |
| 2012/0269267 | A1* | 10/2012 | Choi | H04N 19/597 375/240.13 |
| 2014/0010294 | A1 | 1/2014 | Ye et al. | |
| 2014/0037015 | A1* | 2/2014 | Ye | H04N 19/46 375/240.26 |
| 2014/0064374 | A1 | 3/2014 | Xiu et al. | |
| 2015/0201206 | A1* | 7/2015 | Leontaris | H04N 19/597 375/240.25 |
| 2015/0237376 | A1* | 8/2015 | Alshina | H04N 19/65 375/240.02 |
| 2015/0326865 | A1* | 11/2015 | Yin | H04N 19/46 375/240.13 |
| 2015/0381999 | A1* | 12/2015 | Chuang | H04N 19/503 375/240.16 |
| 2016/0330459 | A1* | 11/2016 | Choi | H04N 19/597 |

OTHER PUBLICATIONS

"AHG15: Interlaced to progressive scalability for SHVC hybrid codec use case—Doc. JCTVC-P0163r1", Joint Collaborative Team on Video Coding (JCT-VC) of ITU-T SG 16 WP 3 and ISO/IEC JTC 1/SC 29/WG 11 16th Meeting: San José, US, Jan. 9-17, 2014, 6 pages.
"BoG report on phase adjustment in SHVC re-sampling process—Doc. JCTVC-P0312", Joint Collaborative Team on Video Coding (JCT-VC) of ITU-T SG 16 WP 3 and ISO/IEC JTC 1/SC 29/WG 11, 16th Meeting: San José, US, Jan. 9-17, 2014, 5 pages.
"Codec for audiovisual services at n×384 kbit/s", CCCITT The International Telegraph and Telephone Consultative Committee H.261, Nov. 1988, 14 pages.
"Coding of moving pictures and associated audio for digital storage media at up to about 1,5 Mbit/s—Part 2: Video", ISO/IEC 11172-2:1993(en), 1993, 20 pages.
"Description of scalable video coding technology proposal by InterDigital Communications", Joint Collaborative Team on Video Coding (JCT-VC) of ITU-T SG16 WP3 and ISO/IEC JTC1/SC29/WG11, 11th Meeting: Shanghai, CN, Oct. 10-19, 2012, 28 pages.
"High efficiency video coding (HEVC) scalable extension Draft 4", Joint Collaborative Team on Video Coding (JCT-VC) of ITU-T SG 16 WP 3 and ISO/IEC JTC 1/SC 29/WG 11,15th Meeting: Geneva, Nov. 1, 2013, 106 pages.
"High efficiency video coding (HEVC) scalable extensions Draft 5—Doc. JCTVC-P1008v4", Joint Collaborative Team on Video Coding (JCT-VC) of ITU-T SG 16 WP 3 and ISO/IEC JTC 1/SC 29/WG 11, 16th Meeting: San José, US, Jan. 9-17, 2014, 125 pages.
"Information technology—Coding of audio-visual objects Part 2: Visual", International Standard: ISO/IEC 14496-2 Second Edition, Dec. 1, 2001, 536 pages.
"InformationTechnology—Generic coding of moving pictures and associated audio information", ISO/IEC 13818-2:2013(en), Feb. 2013, 5 Pages.
"Interlaced to progressive scalability in SHVC—Doc. JCTVC-P0165", Joint Collaborative Team on Video Coding (JCT-VC) of ITU-T SG 16 WP 3 and ISO/IEC JTC 1/SC 29/WG 11 16th Meeting: San José, US, Jan. 9-17, 2014, 4 pages.
"Meeting report of the 13th meeting of the Joint Collaborative Team on Video Coding (JCT-VC), Incheon, KR", Joint Collaborative Team on Video Coding (JCT-VC) of ITU-T, Apr. 18-26, 2013, 216 pages.
"MV-HEVC/SHVC HLS: On inter-layer sample and syntax prediction indications (combining aspects of JCTVC-M0205 and JCTVC-M0046) Doc. JCTVC-M0457", Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, 8 pages.
"On field to frame scalability—Doc. JCTVC-P0175v2", Joint Collaborative Team on Video Coding (JCT-VC) of ITU-T SG 16 WP 3 and ISO/IEC JTC 1/SC 29/WG 11, 16th Meeting: San José, US, Jan. 9-17, 2014, 2 pages.
"Overview of the Stereo and Multiview Video Coding Extensions of the H.264/MPEG-4 AVC Standard", Proceedings of the IEEE (2011), Apr. 1, 2010, 16 pages.
"Rate-distortion optimization for video compression.", IEEE Signal Processing Magazine, vol. 15, issue 6, Nov. 1998, 17 pages.
"Requirements of the scalable enhancement of HEVC", International Organisation for Standardisation: ISO/IEC JTC1/SC29/WG11, Jul. 2012, 12 pages.
"Scalable HEVC (SHVC) Test Model 4 (SHM 4)", Joint Collaborative Team on Video Coding (JCT-VC) of ITU-T SG 16 WP 3 and SO/IEC JTC 1/SC 29/WG 11,15th Meeting: Geneva, CH, Nov. 1, 2013, 9 pages.
"SCE4: Summary Report of SHVC Core Experiment on inter-layer filtering", Joint Collaborative Team on Video Coding (JCT-VC) of ITU-T SG 16 WP 3 and SO/IEC JTC 1/SC 29/WG 11, 13th Meeting: Incheon, KR, Apr. 18-26, 2013, 6 pages.
"Video coding for low bit rate communication", ITU-T Rec. H.263: Series H. Audiovisual and Multimedia Systems; Infrastructure of audiovisual services—Coding of moving video, 2005, 226 pages.
Bross, B., et al., "High Efficiency Video Coding (HEVC) Text Specification Draft 10 (for FDIS & Last Call)", ISO/IEC Joint Collaborative Team on Video Coding—Document No. JCTVC-L1003v34, Jan. 2013, 310 pages.
Luthra, A., "Joint call for Proposals on the Scalable Video Coding Extensions of HEVC", International Organization for Standardization: ISO/IEC JTC-1/SC29/WG11 N12957, Jul. 2012, 11 pages.
Luthra, A., "Use cases for the scalable enhancement of HEVC", International Organisation for Standardisation: ISO/IEC JTC1/SC29/WG11 N12955 Stockholm, Sweden, Jul. 2012, 8 pages.
Schwarz, Heiko, et al., "Overview of the Scalable Video Coding Extension of the H.264/AVC Standard", IEEE Transactions on Circuits and Systems for Video Technology, vol. 17, No. 9, Sep. 2007, 18 Pages.
"International Search Report and Written Opinion", PCT Application No. PCT/US14/72105, Mar. 24, 2015, 11 pages.
Chen, et al., "High efficiency video coding (HEVC) scalable extension Draft 4", Joint Collaborative Team on Video Coding of ISO/IEC JTC1/SC29/WG11A and ITU-T SG.16; JCTVC-O1008; 15th JCT-VC Meeting; Oct. 23, 2013-Nov. 1, 2013, Geneva, Nov. 14, 2013, 76 pages.
Chen, et al., "SHVC Test Model 4 (SHM 4)", Joint Collaborative Team on Video Coding of ITU-T SG 16 WP 3 and ISO/IEC JTC 1/SC 29/WG 11; JCTVC-O1007; 15th JCTVC Meeting; Oct. 23, 2013-Nov. 1, 2013; Geneva, Dec. 2, 2013, 9 pages.
Minoo, et al., "AHG13: SHVC Upsampling with phase offset adjustment", Joint Collaborative Team on Video Coding of ITU-T

(56) References Cited

OTHER PUBLICATIONS

SG 16 WP 3 and ISO/IEC JTC 1/SC 29/WG 11; JCTVC-M0263; 13th JCT-VC Meeting; Apr. 18, 2013-Apr. 26, 2013; Incheon, Apr. 11, 2013, 7 pages.

* cited by examiner

US 9,819,947 B2

METHODS, APPARATUS AND SYSTEMS FOR SCALABLE VIDEO CODING WITH MIXED INTERLACE AND PROGRESSIVE CONTENT

RELATED APPLICATIONS

This application is a non-provisional application of U.S. provisional patent application No. 61/923,110, filed Jan. 2, 2014, and U.S. provisional patent application No. 61/939,217, filed Feb. 12, 2014, the contents of which are incorporated herein fully by reference.

FIELD OF DISCLOSURE

This application relates to video coding and, in particular, systems, apparatus, and methods of scalable video coding with mixed interlace and progressive content.

BACKGROUND

Over the past two decades, various digital video compression technologies have been developed and standardized to enable efficient digital video communication, distribution, and consumption. Most of the commercially widely deployed standards are developed by ISO/IEC and ITU-T, such as H.261, MPEG-1, MPEG-2, H.263, MPEG-4 part 2, and H.264/MPEG-4 part 10 AVC. Recently, the video coding standard, called High Efficiency Video Coding (HEVC) or H.265, was jointly developed by ITU-T Video Coding Experts Group (VCEG) and ISO/IEC Moving Picture Experts Group (MPEG).

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

Figure 1A:
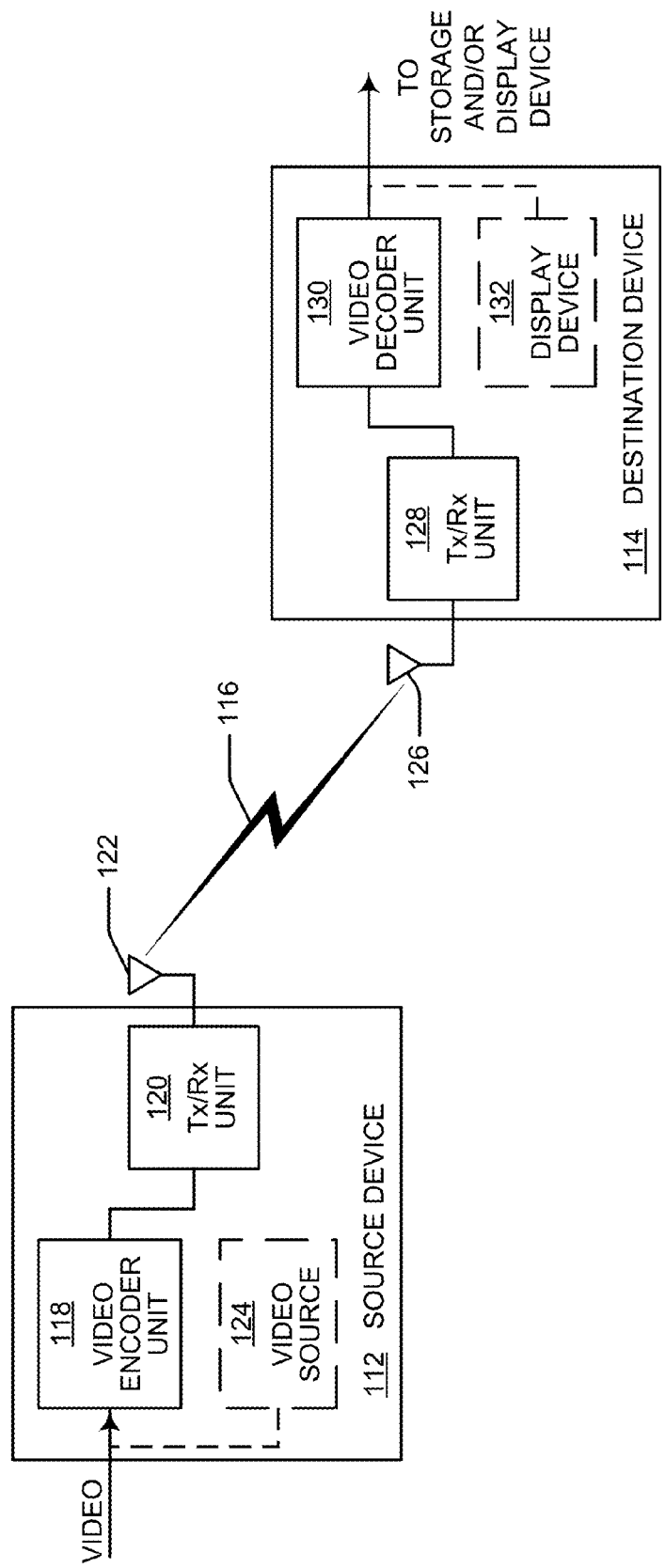
FIG. 1A is a block diagram illustrating an example video encoding and decoding system in which one or more embodiments may be carried out and/or implemented.

FIG. 1A is a block diagram illustrating an example video encoding and decoding system 100 in which one or more embodiments may be carried out and/or implemented. The system 100 may include a source device 112 that may transmit encoded video information to a destination device 114 via a communication channel 116.

The source device 112 and/or destination device 114 may be any of a wide range of devices. In some representative embodiments, the source device 112 and/or the destination device 114 may include wireless transmit and/or receive units (WTRUs), such as wireless handsets or any wireless devices that can communicate video information over the communication channel 116, in which case, communication channel 116 includes a wireless link. The methods, apparatuses and systems described, disclosed or otherwise provided explicitly, implicitly and/or inherently (collectively "provided") herein, however, are not necessarily limited to wireless applications or settings. For example, these techniques may apply to over-the-air television broadcasts, cable television transmissions, satellite television transmissions, Internet video transmissions, encoded digital video that is encoded onto a storage medium, and/or other scenarios. The communication channel 116 may include and/or may be any combination of wireless or wired media suitable for transmission of encoded video data.

The source device 112 may include a video encoder unit 118, a transmit and/or receive (Tx/Rx) unit 120 and/or a Tx/Rx element 122. As shown, the source device 112 may include a video source 124. The destination device 114 may include a Tx/RX element 126, a Tx/Rx unit 128 and/or a video decoder unit 130. As shown, the destination device 114 may include a display device 132. Each of the Tx/Rx units 120, 128 may be or may include a transmitter, a receiver or a combination of a transmitter and a receiver (e.g., a transceiver or transmitter-receiver). Each of the Tx/Rx elements 122, 126 may be, for example, an antenna. In accordance with this disclosure, the video encoder unit 118 of the source device 112 and/or the video decoder unit 130 of the destination device 114 may be configured and/or adapted (collectively "adapted") to apply the coding techniques provided herein.

The source and destination devices 112, 114 may include other elements/components or arrangements. For example, the source device 112 may be adapted to receive video data from an external video source. The destination device 114 may interface with an external display device (not shown) and/or may include and/or use the (e.g., integrated) display device 132. In some embodiments, a data stream generated by the video encoder unit 118 may be conveyed to other devices without modulating the data onto a carrier signal, such as by direct digital transfer and the other devices may or may not modulate the data for transmission.

The techniques provided herein may be performed by any digital video encoding and/or decoding device. Although generally the techniques provided herein are performed by separate video encoding and/or video decoding devices, the techniques may also be performed by a combined video encoder/decoder, typically referred to as a "CODEC." The techniques provided herein may also be performed by a video preprocessor or the like. The source device 112 and the destination device 114 are merely examples of such coding devices in which the source device 112 may generate (and/or may receive video data and may generate) the encoded video information for transmission to the destination device 114. In some representative embodiments, the source and destination devices 112, 114 may operate in a substantially symmetrical manner such that each of the devices 112, 114 may include both video encoding and decoding components and/or elements (collectively "elements"). Hence, the system 100 may support any of one-way and two-way video transmission between the source and destination devices 112, 114 (e.g., for any of video streaming, video playback, video broadcasting, video telephony and/or video conferencing, among others). In certain representative embodiments, the source device 112 may be, for example, a video streaming server adapted to generate (and/or receive the video data and to generate) the encoded video information for one or more destination devices, where the destination devices may be in communication with the source device 112 over wired and/or wireless communication systems.

The external video source and/or the video source 124 may be and/or include a video capture device, such as a video camera, a video archive containing previously captured video, and/or a video feed from a video content provider. In certain representative embodiments, the external video source and/or the video source 124 may generate computer graphics-based data as the source video, or a combination of live video, archived video, and/or computer-generated video. In certain representative embodiments, when the video source 124 is a video camera, the source device 112 and destination device 114 may be or may embody camera phones or video phones.

The captured, pre-captured, computer-generated video, video feed, and/or other type of the video data (collectively "un-encoded video") may be encoded by the video encoder unit 118 to form the encoded video information. The Tx/Rx unit 120 may modulate the encoded video information (e.g., according to a communication standard, to form one or more modulated signals carrying the encoded video information). The Tx/Rx unit 120 may pass the modulated signals to its transmitter for transmission. The transmitter may transmit the modulated signals via the Tx/Rx element 122 to the destination device 114.

At the destination device 114, the Tx/Rx unit 128 may receive the modulated signals from over channel 116 via the Tx/Rx element 126. The Tx/Rx unit 128 may demodulate the modulated signals to obtain the encoded video information. The Tx/RX unit 128 may pass the encoded video information to the video decoder unit 130.

The video decoder unit 130 may decode the encoded video information to obtain decoded video data. The encoded video information may include syntax information defined by the video encoder unit 118. This syntax information may include one or more elements ("syntax elements"); some or all of which may be useful for decoding the encoded video information. The syntax elements may include, for example, characteristics of the encoded video information. The syntax elements may also include characteristics, and/or describe the processing, of the un-encoded video used to form the encoded video information.

The video decoder unit 130 may output the decoded video data for later storage and/or display on the external display (not shown). In certain representative embodiments, the video decoder unit 130 may output the decoded video data to the display device 132. The display device 132 may be and/or may include any individual, multiple, combination, of a variety of display devices adapted to display the decoded video data to a user. Examples of such display devices include a liquid crystal display (LCD), a plasma display, an organic light emitting diode (OLED) display, and/or a cathode ray tube (CRT), among others.

The communication channel 116 may be any wireless or wired communication medium, such as a radio frequency (RF) spectrum or one or more physical transmission lines, or any combination of wireless and wired media. The communication channel 116 may form part of a packet-based network, such as a local area network, a wide-area network, or a global network, such as the Internet. The communication channel 116 generally represents any suitable communication medium, or collection of different communication media, for transmitting video data from the source device 112 to the destination device 114, including any suitable combination of wired and/or wireless media. The communication channel 116 may include routers, switches, base stations, and/or any other equipment that may be useful to facilitate communication from the source device 112 to the destination device 114. Details of an example communications system, which may facilitate such communication between the devices 112, 114, are provided below with reference to FIG. 15A-15E. Details of devices that may be representative of the source and destination devices 112, 114 are provided below, as well.

The video encoder unit 118 and the video decoder unit 130 may operate according to one or more standards and/or specifications, such as, for example, MPEG-2, H.261, H.263, H.264, H.264/AVC, and/or H.264 as extended according to SVC extensions ("H.264/SVC"), among others. One of skill understands that the methods, apparatus and/or systems set forth herein are applicable to other video encoders, decoders, and/or CODECs implemented according to (and/or compliant with) different standards, or to proprietary video encoders, decoders and/or CODECs, including future video encoders, decoders and/or CODECs. The techniques set forth herein are not limited to any particular coding standard.

Relevant portions of H.264/AVC noted above are available from the International Telecommunications Union as ITU-T Recommendation H.264, or more specifically, "ITU-T Rec. H.264 and ISO/IEC 14496-10 (MPEG4-AVC), 'Advanced Video Coding for Generic Audiovisual Services,' v5, March, 2010;" which is incorporated herein by reference, and which may be referred to herein as the H.264 standard, H.264 specification, the H.264/AVC standard and/or specification. The techniques provided herein may be applied to devices that conform to (e.g., generally conform to) the H.264 standard.

Although not shown in FIG. 1A, each of the video encoder and video decoder units 118, 130 may include and/or be integrated with an audio encoder and/or an audio decoder (as appropriate). The video encoder and video decoder units 118, 130 may include appropriate MUX-DEMUX units, or other hardware and/or software, to handle encoding of both audio and video in a common data stream and/or separate data streams. If applicable, the MUX-DEMUX units may conform, for example, to the ITU-T Recommendation H.223 multiplexer protocol and/or other protocols such as the user datagram protocol (UDP).

One or more video encoder and/or video decoder units 118, 130 may be included in one or more encoders and/or decoders; any of which may be integrated as part of a CODEC, and may be integrated and/or combined with a respective camera, computer, mobile device, subscriber device, broadcast device, set-top box and/or server, among others. The video encoder unit 118 and/or the video decoder unit 130 may be implemented as any of a variety of suitable encoder and/or decoder circuitries, respectively, such as one or more microprocessors, digital signal processors (DSPs), application specific integrated circuits (ASICs), field programmable gate arrays (FPGAs), discrete logic, software, hardware, firmware or any combinations thereof. Either or both of the video encoder and video decoder units 118, 130 may be implemented substantially in software, and operations of the elements of the video encoder unit 118 and/or the video decoder unit 130 may be performed by appropriate software instructions executed by one or more processors (not shown). Such an embodiment, in addition to the processor, may contain off-chip components, for example, external storage (e.g., in the form of non-volatile memory) and/or input/output interfaces, among others.

In any embodiment in which operations of elements of the of the video encoder and/or video decoder units 118, 130 may be performed by software instructions executed by one or more processors, the software instructions may be maintained on a computer readable medium including, for example, magnetic disks, optical disks, any other volatile (e.g., Random Access Memory ("RAM")) non-volatile (e.g., Read-Only Memory ("ROM")), and/or mass storage system readable by the CPU, among others. The computer readable medium may include cooperating or interconnected computer readable medium, which may exist exclusively on the processing system and/or are distributed among multiple interconnected processing systems that may be local or remote to the processing system.

Figure 1B:
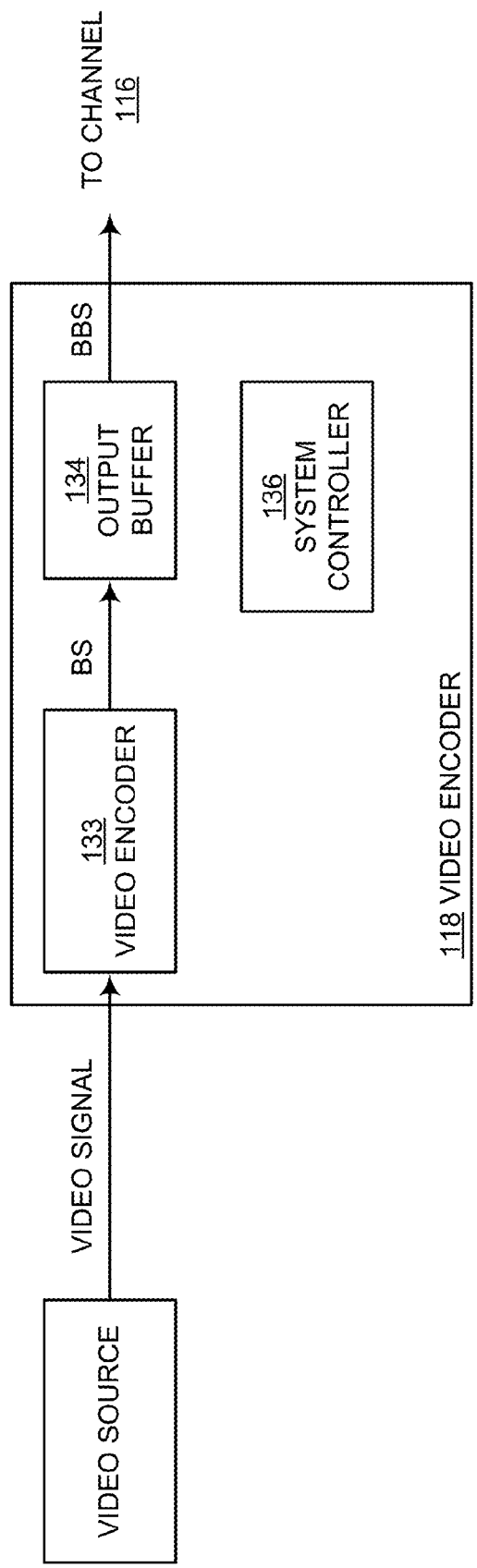
FIG. 1B is a block diagram illustrating an example video encoder unit for use with the video encoding and/or decoding system of FIG. 1A.

FIG. 1B is a block diagram illustrating an example video encoder unit 118 for use with a video encoding and/or decoding system, such as the system 100. The video encoder unit 118 may include a video encoder 133, an output buffer 134, and a system controller 136. The video encoder 133 (or one or more elements thereof) may be implemented according to one or more standards and/or specifications, such as, for example, H.261, H.263, H.264, H.264/AVC, SVC extensions of H.264/AVC (H.264/AVC Annex G), HEVC, and/or scalable extensions of HEVC (SHVC), among others. One of skill understands the methods, apparatus and/or systems provided herein may be applicable to other video encoders implemented according to different standards and/or to proprietary CODECs, including future CODECs.

The video encoder 133 may receive a video signal provided from a video source, such as, the video source 124 and/or the external video source. This video signal may include the un-encoded video. The video encoder 133 may encode the un-encoded video, and provide an encoded (i.e., compressed) video bitstream (BS) at its output.

The encoded video bitstream BS may be provided to an output buffer 134. The output buffer 134 may buffer the encoded video bitstream BS, and may provide such encoded video bitstream BS, as a buffered bitstream (BBS), for transmission via the communication channel 116.

The buffered bitstream BBS output from the output buffer 134 may be sent to a storage device (not shown) for later viewing or transmission. In certain representative embodiments, the video encoder unit 118 may be configured for visual communication in which the buffered bitstream BBS may be transmitted via the communication channel 116 at a specified constant and/or variable bit rate (e.g., with a delay (for example, a very low or minimal delay)).

The encoded video bitstream BS, and in turn, the buffered bitstream BBS may carry bits of the encoded video information. The bits of the buffered bitstream BBS may be arranged as a stream of encoded video frames. The encoded video frames may be intra-coded frames (e.g., I-frames), or inter-coded frames (e.g., B-frames and/or P-frames). The stream of encoded video frames may be arranged, for example, as a series of Groups of Pictures (GOPs), with the encoded video frames of each GOP arranged in a specified order. Generally, each GOP may start with an intra-coded frame (e.g., an I-frame) followed by one or more inter-coded frames (e.g., P-frames and/or B-frames). Each GOP may include only a single intra-coded frame; although any of the GOPs may include multiples. It is contemplated that B-frames might not be used for real-time, low delay applications as, for example, bi-directional prediction may cause extra coding delay compared to uni-directional prediction (P-frames). Additional and/or other frame types may be used and the particular ordering of the encoded video frames may be modified as understood by one skilled in the art.

Each GOP may include syntax data ("GOP syntax data"). The GOP syntax data may be disposed in a header of the GOP, in a header of one or more frames of the GOP, and/or elsewhere. The GOP syntax data may indicate ordering, quantity, or type, and/or describe the encoded video frames of the respective GOP. Each encoded video frame may include syntax data ("encoded-frame syntax data"). The encoded-frame syntax data may indicate and/or describe an encoding mode for the respective encoded video frame.

The system controller 136 may monitor various parameters and/or constraints associated with the channel 116, computational capabilities of the video encoder unit 118, demands by the users, etc., and may establish target parameters to provide an attendant quality of experience (QoE) suitable for the specified constraints and/or conditions of the channel 116. One or more of the target parameters may be adjusted from time to time or periodically depending upon the specified constraints and/or channel conditions. As an example, the QoE may be assessed quantitatively using one or more metrics for assessing video quality, including, for example, a metric commonly referred to as relative perceptive quality of encoded video sequences. The relative perceptive quality of encoded video sequences, measured, for example, using a peak-signal-to-noise ratio ("PSNR") metric, may be controlled by a bit rate (BR) of the encoded bitstream BS. One or more of the target parameters (including, for example, a quantization parameter (QP)) may be adjusted to maximize the relative perceptive quality of video within the constraints associated with the bite rate of the encoded bitstream BS.

Figure 2:
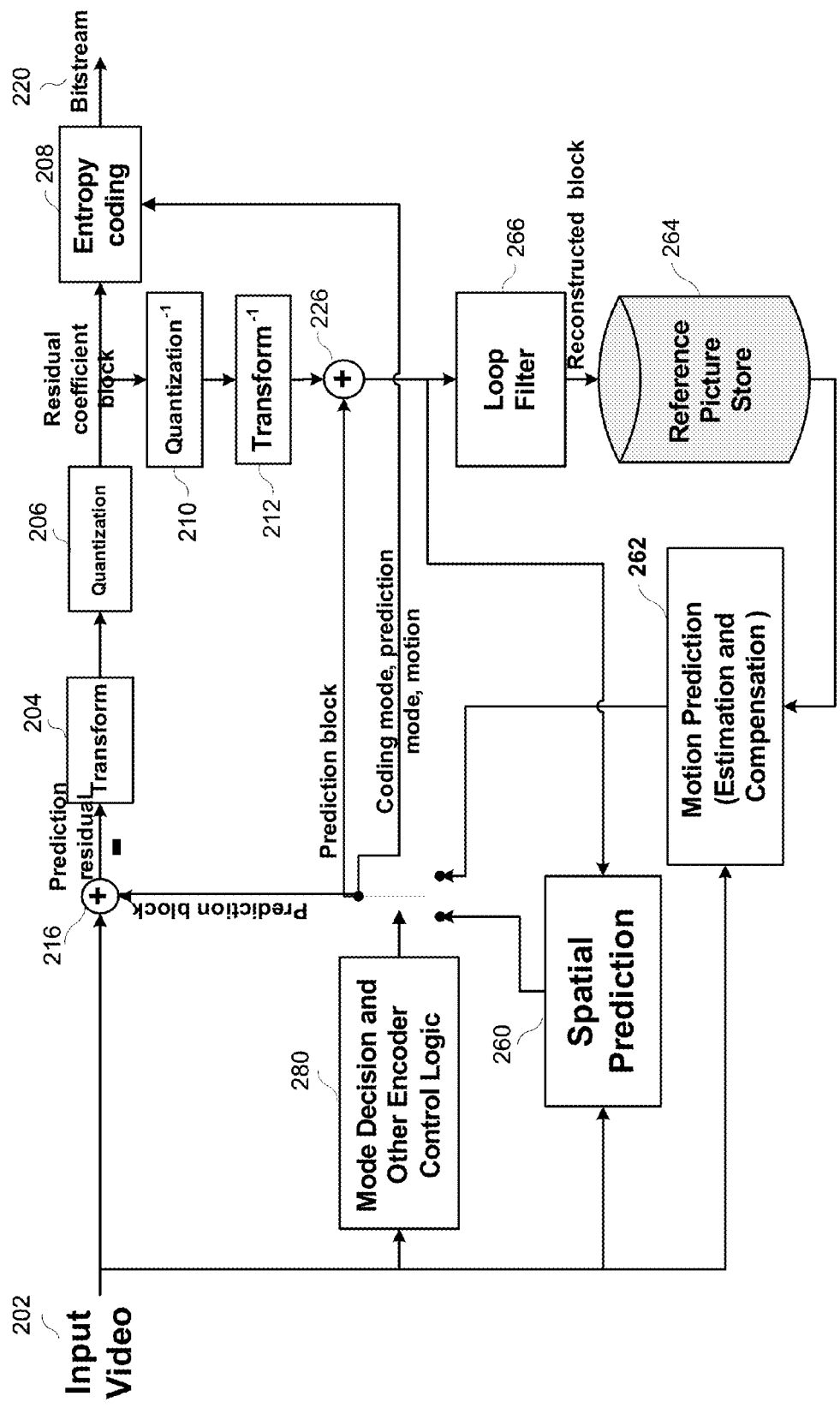
FIG. 2 is a block diagram of a generic block-based hybrid video encoding system.

FIG. 2 is a block diagram of a block-based hybrid video encoder 200 for use with a video encoding and/or decoding system, such as system 100.

Referring to FIG. 2, the block-based hybrid encoding system 200 may include a transform unit 204, a quantization unit 206, an entropy coding unit 208, an inverse quantization unit 210, an inverse transform unit 212, an first adder 216, a second adder 226, a spatial prediction unit 260, a motion prediction unit 262, a reference picture store 264, one or more filters 266 (e.g., loop filters), and/or a mode decision and encoder controller unit 280, among others.

Details of the video encoder 200 are meant merely to be illustrative, and real world implementations may differ. A real world implementation, for example, may include more, fewer, and/or different elements, and/or may be arranged differently from the arrangement shown in FIG. 2. For example, although shown separately, some or all functionality of both of the transform unit 204 and quantization unit 206 may be highly integrated in some of the real-world implementations, such as, for example, implementations that use the core transform of the H.264 standard. Similarly, the inverse quantization unit 210 and inverse transform unit 212 may be highly integrated in some of the real-world implementations (e.g., H.264 or HEVC-standard-compliant implementations), but are likewise illustrated separately for conceptual purposes.

As described above, the video encoder 200 may receive the video signal at its input 202. The video encoder 200 may generate the encoded video information from the received un-encoded video, and output the encoded video information (e.g., any of intra-frames or inter-frames) from its output 220 in the form of the encoded video bitstream BS. The video encoder 200 may operate, for example, as a hybrid video encoder, and employ a block-based coding process for encoding the un-encoded video. When performing such an encoding process, the video encoder 200 may operate on individual frames, pictures, and/or images (collectively "un-encoded pictures") of the un-encoded video.

To facilitate the block-based encoding process, the video encoder 200 may slice, partition, divide, and/or segment (collectively "segment") each un-encoded picture received at its input 202 into multiple un-encoded video blocks. For example, the video encoder 200 may segment the un-encoded picture into multiple un-encoded video segments (e.g., slices) and may (e.g., then may) segment each of the un-encoded video segments into the un-encoded video blocks. The video encoder 200 may pass, supply, send, or provide the un-encoded video blocks to the spatial prediction unit 260, the motion prediction unit 262, the mode decision and encoder controller unit 280 and/or the first adder 216. As described in more detail below, the un-encoded video blocks may be provided on a block-by-block basis.

The spatial prediction unit 260 may receive the un-encoded video blocks, and encode such video blocks in intra-mode. Intra-mode refers to any of several modes of spatial-based compression, and encoding in intra-mode endeavors to provide spatial-based compression of the un-encoded picture. The spatial-based compression, if any, may result from reducing or removing spatial redundancy of video information within the un-encoded picture. In forming the prediction blocks, the spatial prediction unit 260 may perform spatial prediction (or "intra-prediction") of each un-encoded video block relative to one or more video blocks of the un-encoded picture that have been already encoded ("encoded video blocks") and/or reconstructed ("reconstructed video blocks"). The encoded and/or reconstructed video blocks may be neighbors of, adjacent to, or in proximity (e.g., close proximity) to, the un-encoded video block.

The motion prediction unit 262 may receive the un-encoded video blocks from the input 202, and encode them in inter-mode. Inter-mode refers to any of several modes of temporal-based compression, including, for example, P-mode (uni-directional prediction) and/or B-mode (bi-directional prediction). Encoding in inter-mode endeavors to provide temporal-based compression of the un-encoded picture. The temporal-based compression, if any, may result from reducing or removing temporal redundancy of the video information among the un-encoded picture and one or more reference (e.g., adjacent) pictures. The motion/temporal prediction unit 262 may perform temporal prediction (or "inter-prediction") of each un-encoded video block relative to one or more video blocks of the reference pictures ("reference video blocks"). The temporal prediction carried out may be uni-directional prediction (e.g., for P-mode) and/or bi-directional prediction (e.g., for B-mode).

For uni-prediction, the reference video blocks may be from one or more previously encoded and/or reconstructed pictures. The encoded and/or reconstructed picture or pictures may be neighbors of, adjacent to, and/or in proximity to, the un-encoded picture.

For bi-prediction, the reference video blocks may be from one or more previously encoded and/or reconstructed pictures. The encoded and/or reconstructed pictures may be neighbors of, adjacent to, and/or in proximity to, the un-encoded picture.

If multiple reference pictures are used (as may be the case for recent video coding standards such as H.264/AVC and/or HEVC), for each video block, its reference picture index may be sent to the entropy coding unit 208 for subsequent output and/or transmission. The reference index may be used to identify from which reference picture or pictures in the reference picture store 264 the temporal prediction comes.

Although typically highly integrated, functions of the motion/temporal prediction unit 262 for the motion estimation and motion compensation may be carried out by separate entities or units (not shown). Motion estimation may be carried out to estimate motion for each un-encoded video block relative to the reference-picture video blocks, and may involve generating a motion vector for the un-encoded video block. The motion vector may indicate a displacement of a prediction block relative to the un-encoded video block being coded. This prediction block is the reference-picture video block that is found to closely match, in terms of, for example, pixel difference of the un-encoded video block being coded. The matching may be determined by a sum of absolute difference (SAD), a sum of square difference (SSD), and/or other difference metrics. Motion compensation may involve fetching and/or generating the prediction block based on the motion vector determined by the motion estimation.

The motion prediction unit 262 may calculate the motion vector for the un-encoded video block by comparing the un-encoded video block to the reference video blocks from reference pictures stored in the reference picture store 264. The motion prediction unit 262 may calculate values for fractional pixel positions of a reference picture included in reference picture store 264. In some instances, the adder 226 or another unit of the video encoder 200 may calculate the fractional pixel position values for reconstructed video blocks, and may store the reconstructed video blocks, with the calculated values for the fractional pixel positions, in reference picture store 264. The motion prediction unit 262 may interpolate sub-integer pixels of the reference picture (e.g., of an I-frame and/or a P-frame and/or a B-frame).

The motion prediction unit 262 may be configured to encode the motion vector relative to a selected motion predictor. The motion predictor selected by the motion/temporal prediction unit 262 may be, for example, a vector equivalent to a mean of motion vectors of neighboring blocks that have already been encoded. To encode the motion vector for the un-encoded video block, the motion/temporal prediction unit 262 may calculate the difference between the motion vector and the motion predictor to form a motion vector difference value.

H.264 and HEVC refer to a set of potential reference frames as a "list." A set of reference pictures stored in reference picture store 264 may correspond to such a list of reference frames. The motion/temporal prediction unit 262 may compare the reference video blocks of the reference pictures from reference picture store 264 to the un-encoded video block (e.g., of a P-frame or a B-frame). When the reference pictures in reference picture store 264 include values for sub-integer pixels, the motion vector calculated by motion/temporal prediction unit 262 may refer to a sub-integer pixel location of the reference picture. The motion/temporal prediction unit 262 may send the calculated motion vector to the entropy coding unit 208 and to the motion compensation functions of the motion/temporal prediction unit 262. The motion prediction unit 262 (or the motion compensation functions thereof) may calculate error values for the prediction block relative to the un-encoded video block being coded. The motion prediction unit 262 may calculate prediction data based on the prediction block.

The mode decision and encoder controller unit 280 may select one of the coding modes, intra-mode, or inter-mode. The mode decision and encoder controller unit 280 may do so based on a rate-distortion optimization method and/or on error results produced in each mode, for example.

The video encoder 200 may form a block of residuals ("residual video block") by subtracting the prediction data provided from motion prediction unit 262 from the un-encoded video block being coded. The adder 216 represents an element or multiple elements that may perform this subtraction operation.

The transform unit 204 may apply a transform to the residual video block to convert such residual video block from a pixel value domain to a transform domain, such as a frequency domain. The transform may be, for example, any of the transforms provided herein, a discrete cosine transform (DCT), or a conceptually similar transform. Other examples of the transform include those defined in H.264 and/or HEVC, wavelet transforms, integer transforms, and/or sub-band transforms, among others. Application of the transform to the residual video block by the transform unit 204 produces a corresponding block of transform coefficients of the residual video block ("residual-transform coefficients"). These residual-transform coefficients may represent magnitudes of frequency components of the residual video block. The transform unit 204 may forward the residual-transform coefficients to the quantization unit 206.

The quantization unit 206 may quantize the residual-transform coefficients to reduce further the encoded bit rate. The quantization process, for example, may reduce the bit depth associated with some or all of the residual-transform coefficients. In certain instances, the quantization unit 206 may divide the values of residual-transform coefficients by a quantization level corresponding to the QP to form a block of quantized transform coefficients. The degree of quantization may be modified by adjusting the QP value. The quantization unit 206 may apply the quantization to represent the residual-transform coefficients using a desired number of quantization steps; the number of steps used (or correspondingly the value of the quantization level) may determine the number of encoded video bits used to represent the residual video block. The quantization unit 206 may obtain the QP value from a rate controller (not shown). Following quantization, the quantization unit 206 may provide the quantized transform coefficients to the entropy coding unit 208 and to the inverse quantization unit 210.

The entropy coding unit 208 may apply entropy coding to the quantized transform coefficients to form entropy-coded coefficients (i.e., a bitstream). The entropy coding unit 208 may use adaptive variable length coding (CAVLC), context adaptive binary arithmetic coding (CABAC) and/or another entropy coding technique to form the entropy-coded coefficients. CABAC, as understood by those skilled in the art, may require input of contextual information ("context"). This context may be based on neighboring video blocks, for instance.

The entropy coding unit 208 may provide the entropy-coded coefficients along with the motion vectors and one or more reference picture indices in the form of a raw encoded video bitstream to an internal bitstream format (not shown). This bitstream format may form the encoded video bitstream BS provided to the output buffer 134 (FIG. 1B) by appending to the raw encoded video bitstream additional information, including headers and/or other information to enable, for example, the video decoder unit 300 (FIG. 3) to decode the encoded video block from the raw encoded video bitstream. Following the entropy coding, the encoded video bitstream BS provided from the entropy coding unit 208 may be output, for example, to the output buffer 134, and may be transmitted, for example, to the destination device 114 via the channel 116 or archived for later transmission or retrieval.

In certain representative embodiments, the entropy coding unit 208 or another unit of video encoder 133, 200 may be configured to perform other coding functions, in addition to entropy coding. For example, the entropy coding unit 208 may be configured to determine the Code Block Pattern (CBP) values for the video blocks. In certain representative embodiments, the entropy coding unit 208 may perform run length coding of the quantized transform coefficients in a video block. As an example, the entropy coding unit 208 may apply a zigzag scan or other scan pattern to arrange the quantized transform coefficients in a video block and encode runs of zeroes for further compression. The entropy coding unit 208 may construct the header information with appropriate syntax elements for transmission in the encoded video bitstream BS.

The inverse quantization unit 210 and inverse transform unit 212 may apply inverse quantization and inverse transformation, respectively, to reconstruct a residual video block in the pixel domain, e.g., for later use as one of the reference video blocks (e.g., within one of the reference pictures in the reference picture list).

The mode decision and encoder controller unit 280 may calculate the reference video block by adding the reconstructed residual video block to the prediction block of one of the reference pictures stored in the reference picture store 264. The mode decision and encoder controller unit 280 may apply one or more interpolation filters to the reconstructed residual video block to calculate sub-integer pixel values (e.g., for half-pixel positions) for use in motion estimation.

The adder 226 may add the reconstructed residual video block to the motion compensated prediction video block to produce a reconstructed video block for storage in the reference picture store 264. The reconstructed (pixel value domain) video block may be used by the motion prediction unit 262 (or motion estimation functions thereof and/or the motion compensation functions thereof) as one of the reference blocks for inter-coding an un-encoded video block in subsequent un-encoded video.

The filters 266 (e.g., loop filters) may include a deblocking filter. The deblocking filter may operate to remove visual artifacts that may be present in reconstructed macro-blocks. These artifacts may be introduced in the encoding process due to, for example, the use of different modes of encoding such as I-type, P-type or B-type. Artifacts may be present, for example, at boundaries and/or edges of the received video blocks, and the de-blocking filter may operate to smooth the boundaries and/or edges of the video blocks to improve visual quality. The deblocking filter may filter the output of the adder 226. The filters 266 may include other in-loop filters, such as the Sample Adaptive Offset (SAO) filter supported by the HEVC standard.

Figure 3:
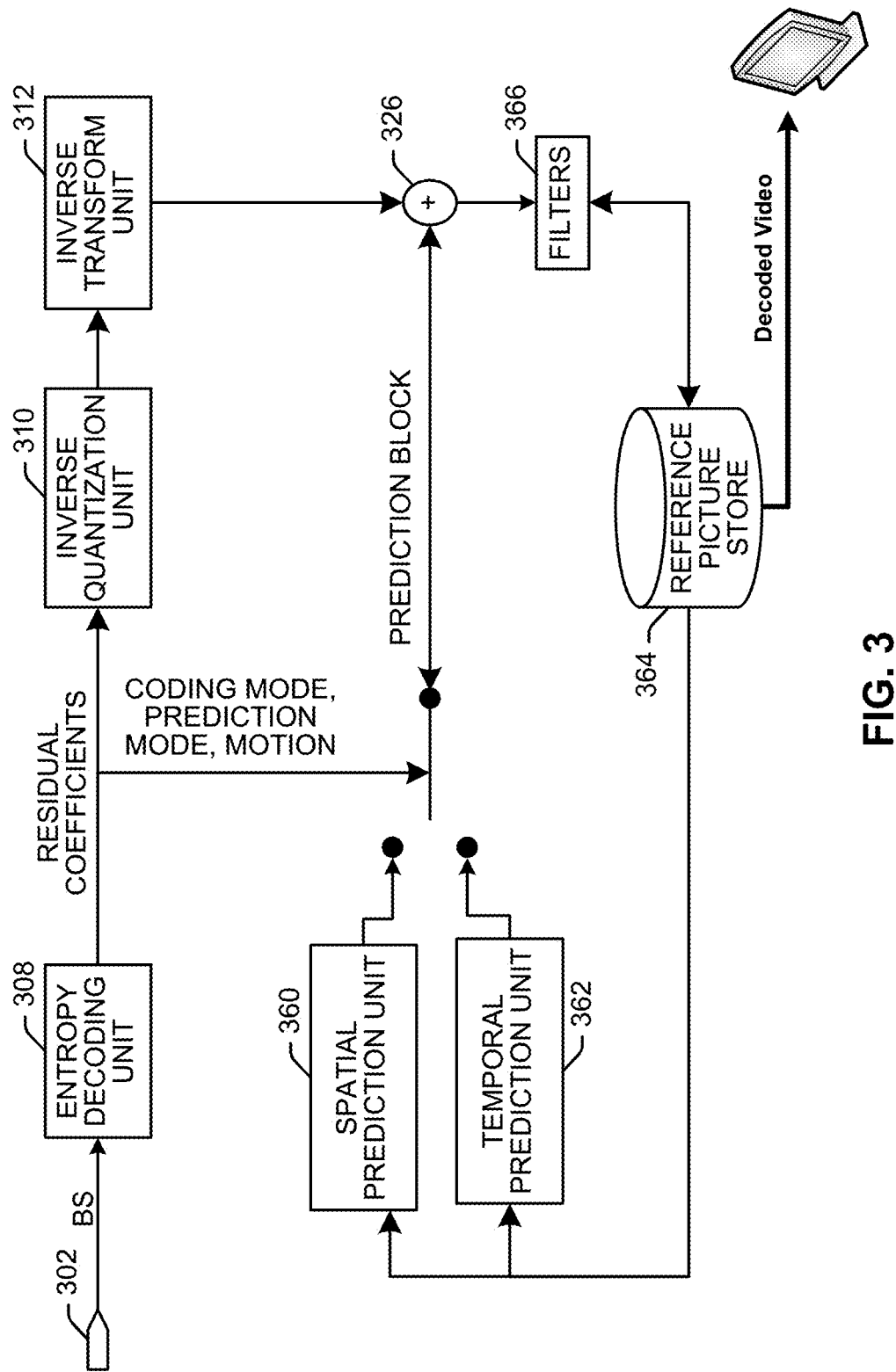
FIG. 3 is a general block diagram of a block-based video decoder.

FIG. 3 is a block diagram illustrating an example of a video decoder 300 for use with a video decoder unit, such as the video decoder unit 130 of FIG. 1A. The video decoder 300 may include an input 302, entropy decoding unit 308, a motion compensated prediction unit 362, a spatial prediction unit 360, an inverse quantization unit 310, an inverse transform unit 312, a reference picture store 364, filters 366, an adder 326, and an output 320. The video decoder 300 may perform a decoding process that is, generally, reciprocal to the encoding process provided with respect to the video encoder 133, 200. This decoding process may be carried out as set forth below.

The motion compensated prediction unit 362 may generate prediction data based on motion vectors received from the entropy decoding unit 308. The motion vectors may be encoded relative to a motion predictor for a video block corresponding to the encoded motion vector. The motion compensated prediction unit 362 may determine the motion predictor, for example, as the median of motion vectors of blocks neighboring the video block to be decoded. After determining the motion predictor, the motion compensated prediction unit 362 may decode the encoded motion vector by extracting a motion vector difference value from the encoded video bitstream BS and adding the motion vector difference value to the motion predictor. The motion compensated prediction unit 362 may quantize the motion predictor to the same resolution as the encoded motion vector. In certain representative embodiments, the motion compensated prediction unit 362 may use the same precision for some or all encoded motion predictors. As another example, the motion compensated prediction unit 362 may be configured to use either of the above methods, and to determine which method to use by analyzing data included in a sequence parameter set, slice parameter set, or picture parameter set obtained from the encoded video bitstream BS.

After decoding the motion vector, the motion compensated prediction unit 362 may extract a prediction video block identified by the motion vector from a reference picture of reference picture store 364. If the motion vector points to a fractional pixel position, such as a half-pixel, the motion compensated prediction unit 362 may interpolate values for the fractional pixel positions. The motion compensated prediction unit 362 may use adaptive interpolation filters or fixed interpolation filters to interpolate these values. The motion compensated prediction unit 362 may obtain indicia of which of the filters 366 to use, and in various representative embodiments, coefficients for the filters 366, from the received encoded video bitstream BS.

The spatial prediction unit 360 may use intra prediction modes received in the encoded video bitstream BS to form a prediction video block from spatially adjacent blocks. Inverse quantization unit 310 may inverse quantize, (e.g., de-quantize, quantized block coefficients provided in the encoded video bitstream BS and decoded by the entropy decoding unit 308). The inverse quantization process may include a conventional process, e.g., as defined by H.264. The inverse quantization process may include use of a quantization parameter QP calculated by the video encoder 133, 200 for each video block to determine a degree of quantization and/or a degree of inverse quantization to be applied.

The inverse transform unit 312 may apply an inverse transform (e.g., an inverse of any of the transforms provided herein, inverse DCT, an inverse integer transform, or a conceptually similar inverse transform process) to the transform coefficients to produce residual video blocks in the pixel domain. The motion compensated prediction unit 362 may produce motion compensated blocks, and may perform interpolation based on interpolation filters. Identifiers for interpolation filters to be used for motion estimation with sub-pixel precision may be included in syntax elements of the video block. The motion compensated prediction unit 362 may use the interpolation filters as used by the video encoder 133, 200 during encoding of the video block to calculate interpolated values for sub-integer pixels of a reference block. The motion compensated prediction unit 362 may determine the interpolation filters used by the video encoder 133, 200 according to received syntax information and use the interpolation filters to produce prediction blocks.

The motion compensated prediction unit 262 may use: (1) the syntax information to determine sizes of the video blocks used to encode one or more pictures of the encoded video sequence; (2) partition information that describes how each video block of a frame of the encoded video sequence is partitioned; (3) modes (or mode information) indicating how each partition is encoded; (4) one or more reference pictures for each inter-encoded video block, and/or (5) other information to decode the encoded video sequence.

The adder 326 may sum the residual blocks with the corresponding prediction blocks generated by the motion compensated prediction unit 362 or the spatial prediction unit 360 to form decoded video blocks. Loop filters 366 (e.g., deblocking filters or SAO filters) may be applied to filter the decoded video blocks to remove blockiness artifacts and/or to improve visual quality. The decoded video blocks may be stored in reference picture store 364, which may provide the reference video blocks for subsequent motion compensation and may produce decoded video for presentation on a display device (not shown).

As each video block undergoes the encoding and/or decoding process, the video information associated with the video block may be represented differently. For example, the video block may include: (i) pixel data in the pixel domain; (ii) residual data ("residuals") representing pixel differences between an un-encoded video blocks and a prediction block; (iii) transform coefficients in the transform domain (e.g., following application of a transform); and (iv) quantized transform coefficients in the quantized transform domain.

Each video block may have given dimensions or, collectively "size". The video block size may depend on the coding standard. As an example, the H.264 standard supports intra prediction in various video block sizes, such as 16×16, 8×8, or 4×4 for luma components, and 8×8 for chroma components, and supports inter prediction in various block sizes, such as 16×16, 16×8, 8×16, 8×8, 8×4, 4×8, and 4×4 for luma components and corresponding scaled sizes for chroma components. In the H.264 standard, a video block of dimensions 16 pixels by 16 pixels is generally referred to as a macroblock (MB), and a video block with less than 16 pixels by 16 pixels is generally referred to as a partition of the MB ("MB partition"). In HEVC, a video block called a "coding unit" or "CU" may be used to compress high resolution (e.g., 1080p and beyond) video signals more efficiently. In HEVC, the CU size is set in a parameter sequence set, and may be set as large as 64×64 pixels or as small as 4×4 pixels. The CU can be further partitioned into prediction units (PUs), for which separate prediction methods may be applied. Each video block (whether a MB, CU, and/or PU, among others) may be processed by using the spatial prediction unit 360 and/or the motion/temporal prediction unit 362.

As used herein, "N×N" and "N by N" may be used interchangeably to refer to a size of the block in terms of components (e.g., pixels, residuals, transform coefficients, and/or quantized transform coefficients, among others) in both vertical and horizontal dimensions. In general, a 16×16 video block has 16 elements in a vertical direction (y=16) and 16 elements in a horizontal direction (x=16). An N×N block, generally, has N elements in a vertical direction and N elements in a horizontal direction, where N represents a nonnegative integer value. The elements in a video block may be arranged in rows and columns. The video blocks may have the same or a different number of pixels in the horizontal direction as in the vertical direction. For example, the video blocks may include N×M pixels, where M is or is not equal to N.

HEVC achieves twice as much compression as H.264/AVC, or equivalently, halves the bit rate used or required at the same video quality. More and more new video applications, such as video chat, mobile video recording and sharing, and video streaming, may use or may require video transmission in heterogeneous environments. The scenarios known as 3-screen and N-screen that consider various consumer devices (e.g., PCs, smart phones, tablets, TVs) may accommodate video consumption on devices with widely varying capabilities in terms of computing power, memory/storage size, display resolution, and/or display frame rate, among others. The network and transmission channels may have widely varying characteristics in terms of packet loss rate, available channel bandwidth, and/or burst error rate, among others. Video data today may be transmitted over a combination of wired networks and wireless networks, which may complicate the underlying transmission channel characteristics. Scalable video coding may improve the quality of experience for video applications running on devices with different capabilities over heterogeneous networks. Scalable video coding may encode the signal once at a highest representation (e.g., temporal resolution, spatial resolution, and/or quality, among others) and may enable decoding from subsets of the video streams depending on conditions (e.g., the specific rate and/or representation used or required by certain applications running on specific client device). In certain representative embodiments, using scalable video coding procedures may enable bandwidth and/or storage saving compared to a non-scalable video coding procedures. International video standards MPEG-2 Video, H.263, MPEG4 Visual, and H.264 have tools and/or profiles that support some modes of scalability.

Scalable Video Coding (SVC) is an extension of H.264 that may enable the transmission and decoding of partial bit streams to provide video services with lower temporal or spatial resolutions or reduced fidelity and may retain a relative high reconstruction quality given the rate of the partial bit streams. Single Loop Decoding (SLD) in SVC refers to a SVC decoder setting up (e.g., only needing to set up) one motion compensation loop at the layer being decoded, and does not or may not have to set up a motion compensation loop or loops at another lower layer or layers. As an example, if the bitstream contains or includes 2 layers (e.g., layer 1 as a base layer and layer 2 as an enhancement layer) and if the decoder wants to reconstruct the layer 2 video, the decoded picture buffer and motion compensated prediction may be setup or may need to be setup for layer 2 (e.g., only for layer 2) but may not for layer 1 (e.g., the base layer that layer 2 depends on). SVC does not use or require reference picture from lower layers to be reconstructed (e.g., fully reconstructed), reducing computational complexity and memory requirement at the decoder. SLD is achieved by constrained inter-layer texture prediction, where, for a current block in a given layer, spatial texture prediction from a lower layer is permitted only if the corresponding lower layer block is coded in intra mode (referred to as restricted intra prediction). When the lower layer block is coded in intra mode, it may be reconstructed without the need for motion compensation operations and a decoded picture buffer. For the enhancement layer, SVC uses additional inter-layer prediction techniques such as motion vector prediction, residual prediction, and mode prediction, among others from the lower layers. Although the SLD of SVC reduces, to some extent, the computational complexity and memory requirements at the decoder, it increases implementation complexity by relying heavily on block-level inter layer prediction to achieve satisfactory performance. To compensate for the performance penalty incurred by imposing the SLD constraint, and still be able to achieve the desired scalable coding performance, encoder design and computation complexity actually increase due to the use of cross layer joint rate distortion optimization. Coding of interlaced content is not supported (e.g., well supported by SVC), which affects its adoption by the broadcasting industry. Complications in the SVC encoder and decoder design and system implementation may be the causes for limited SVC adoptions in the market place.

In certain representative embodiments, scalable coding efficiency may be achieved through (e.g., primarily through) advanced inter-layer processing Standards scalability generally refers to the case of scalability when the base layer is encoded with an earlier standard such as H.264/AVC, or even MPEG2, while the one or more enhancement layers are encoded using a more recent standard, such as the HEVC standard. Standards scalability may enable backward compatibility for legacy content already encoded using previous standards and enhancing the quality of the legacy content with one or more enhancement layers encoded with new standards like HEVC that provides better coding efficiency. Standards scalability is also commonly referred to as hybrid codec scalability. These two terms will be used interchangeably in this disclosure. Requirements of the scalable enhancement of HEVC include spatial scalability, temporal scalability, quality scalability, standards scalability, and the like. Table 1 below lists examples of these scalabilities.

TABLE 1

Different types of scalabilities

| Scalability | Example |
| --- | --- |
| Spatial scalability | 720p→1080p |
| Quality (SNR) scalability | 35 dB→38 dB |
| Temporal scalability | 30 fps→60 fps |
| Standards scalability | H.264/AVC→HEVC |

Figure 4:
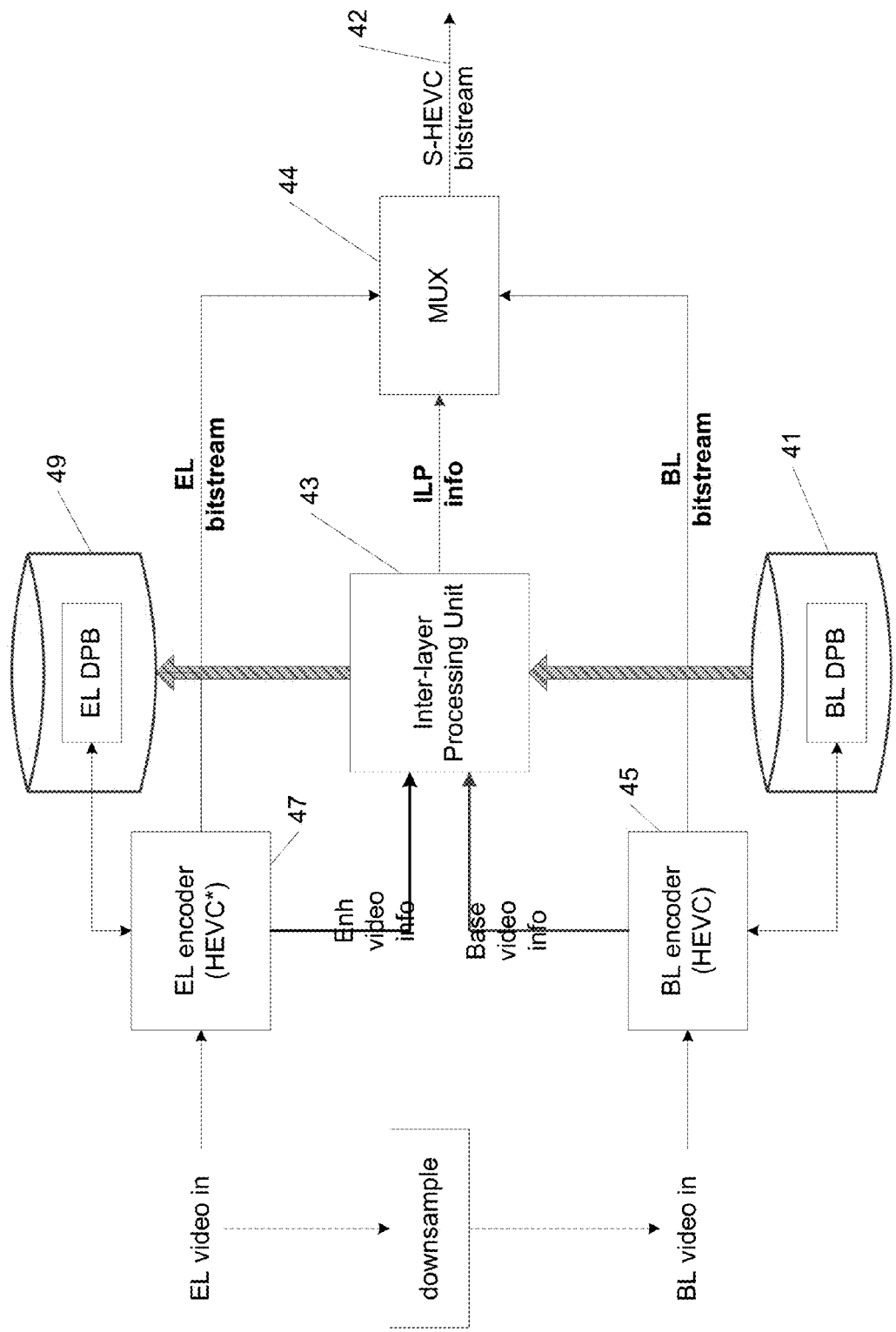
FIG. 4 is a block diagram illustrating a two-layer scalable coding system using picture-level inter layer processing (ILP)
Figure 5:
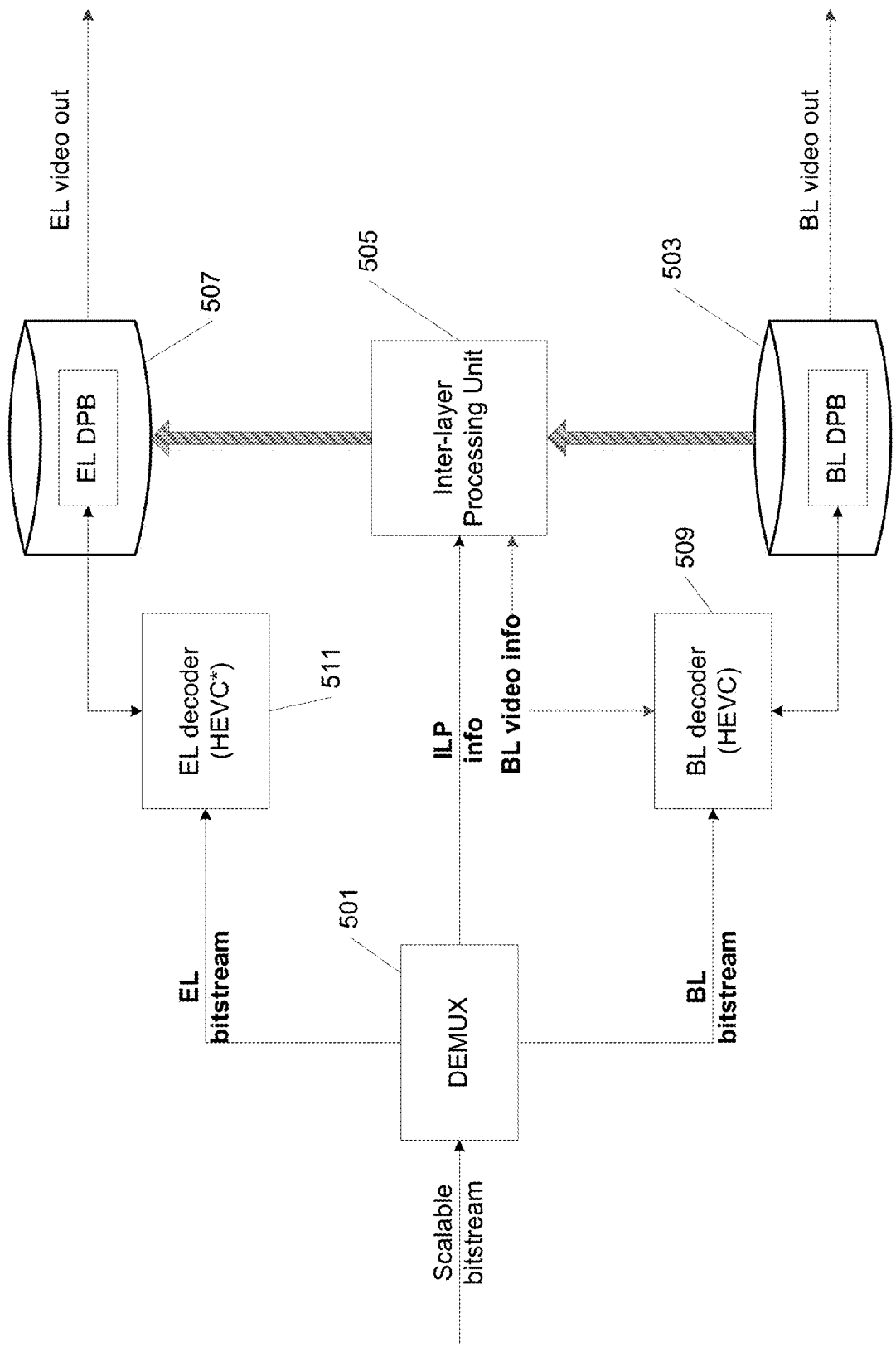
FIG. 5 is a diagram illustrating a two-layer scalable decoding system with picture level ILP.

FIG. 4 is a block diagram illustrating a two-layer scalable coding system (e.g., that uses or relies on picture-level inter layer processing (ILP)) to achieve efficient scalable coding. The BL encoder (an HEVC encoder in this example) in FIG. 4 may encode the BL video input using a combination of spatial and temporal prediction. The BL video input is supported by some or all video coding standards including H.264 and HEVC. The BL encoder 45 may establish a base layer DPB (Decoded Picture Buffer) 41 to store the reference pictures used or needed to perform temporal motion compensated prediction. In the enhancement layer, the EL encoder 47 may operate similarly to the BL encoder 45. The enhancement layer DPB 49 that may provide reference pictures for prediction of the input EL video by the EL encoder may contain or include not only reference pictures from the current enhancement layer, but also some reference pictures from the DPB of the layer from which it depends, (e.g., the BL DPB in FIG. 4). In FIG. 4, an inter-layer processing unit 43 may be used to process the pictures from the BL DPB 41 before the pictures may be used to predict the EL video. After BL and EL bitstreams are generated, a multiplexer 44 is used to combine these bitstreams into the scalable bitstream 42. If the inter-layer processing unit 43 makes use of inter layer processing (ILP) parameters, the ILP information may be multiplexed together into the scalable bitstream. FIG. 5 is a diagram illustrating a two-layer scalable decoding system with picture level ILP that may correspond to the scalable encoding system in FIG. 4. In FIG. 5, a demultiplexer 501 is used to unpack the scalable bitstream into the BL bitstream, the EL bitstream, and/or the ILP information. The BL bitstream may be decoded by the BL decoder 509 to generate base layer reconstructed pictures and place them in the BL DPB 503. The ILP information may be used by the inter-layer processing unit 505 to generate inter-layer reference pictures (e.g., by processing the BL reconstructed pictures and storing them in the EL DPB 507). The EL bitstream may be decoded by the EL decoder 511 using the reference pictures in the EL DPB (which may contain or include temporal reference pictures in the EL and/or inter-layer reference pictures from the BL).

Although the BL and EL encoders 45, 47 are shown in FIG. 4 for a HEVC implementation (e.g., as parts of a HEVC encoder), it is contemplated that other implementations are possible including those follow other video standards such as MPEG-2 Video, H.263, MPEG4 Visual and/or H.264, among others.

Although the BL and EL decoders 509, 511 are shown in FIG. 5 for a HEVC implementation (e.g., as parts of a HEVC decoder), it is contemplated that other implementations are possible including those follow other video standards such as MPEG-2 Video, H.263, MPEG4 Visual and/or H.264, among others.

Because such scalable coding system as depicted in FIGS. 4 and 5 may rely on picture level inter-layer prediction for scalable coding (e.g., efficient scalable coding), such scalable system may maintain high coding efficiency, for example, regardless of which codecs may be used, as the underlying single layer codec in the BL and/or EL coding. For example, the BL codec may be replaced with a H.264/AVC codec (for example, without affecting the overall architecture and efficiency of the scalable coding system).

Referring back to FIG. 2, the block-based hybrid video encoder 200 may provide a generic block-based single layer video encoder that can, for example, be used as the BL encoder and EL encoder in FIG. 4. As shown in FIG. 2, a single layer encoder may employ widely known techniques such as spatial prediction (also referred to as intra prediction) and temporal prediction (also referred to as inter prediction and/or motion compensated prediction) to predict the input video signal, for example to achieve efficient compression. The encoder may have mode decision logic that may choose the most suitable form of prediction, e.g., usually based on certain criteria, for example, one or a combination of rate and/or distortion considerations. The encoder may transform and may quantize the prediction residual (e.g., the difference signal between the input signal and the prediction signal). The quantized residual, together with the mode information (e.g., intra or inter prediction) and prediction information (motion vectors, reference picture indexes, and/or intra prediction modes, among others) may be compressed (e.g., further compressed) at the entropy coder and may be packed into the output video bitstream. As shown in FIG. 2, the encoder may generate the reconstructed video signal by applying an inverse quantization and inverse transform to the quantized residual to obtain the reconstructed residual, and adding it back to the prediction signal. The reconstructed video signal may go through a loop filter process (for example, deblocking filter, Sample Adaptive Offsets, and/or Adaptive Loop Filters), and may be stored in the reference picture store (or DPB) to be used to predict future video signals.

Referring back to FIG. 3, the video decoder 300 may provide a generic block-based single layer decoder that corresponds to the single layer encoder in FIG. 2. The decoder in FIG. 3 may for example be used as the BL and EL decoder in FIG. 5. The single layer decoder in FIG. 5 may receive a video bitstream produced by the encoder in FIG. 2 and may reconstruct the video signal to be displayed. At the video decoder, the bitstream may be parsed by the entropy decoder. The residual coefficients may be inverse quantized and inverse transformed to obtain the reconstructed residual. The coding mode and prediction information may be used to obtain the prediction signal using spatial prediction and/or temporal prediction. The prediction signal and the reconstructed residual may be added together to get the reconstructed video. The reconstructed video may go through loop filtering before being stored in the DPB to be displayed and/or to be used to decode future video signals. The standards scalability feature in Table 1 set forth above for SHVC may allow the video service providers (for example, cable network operators, and/or broadcasters, among others) to continue to serve the legacy customers who have existing receiving devices (for example, Set Top Boxes or STBs) that have (e.g., only have) H.264/AVC capabilities, while new/premium customers may migrate to newer receiving devices (e.g., STBs) with HEVC decoding capabilities and enjoy higher quality representation (e.g., a higher spatial resolution, a higher temporal resolution, and/or a higher picture quality, among others) of the video signals, for example, by subscribing to a premium service.

Figure 6:
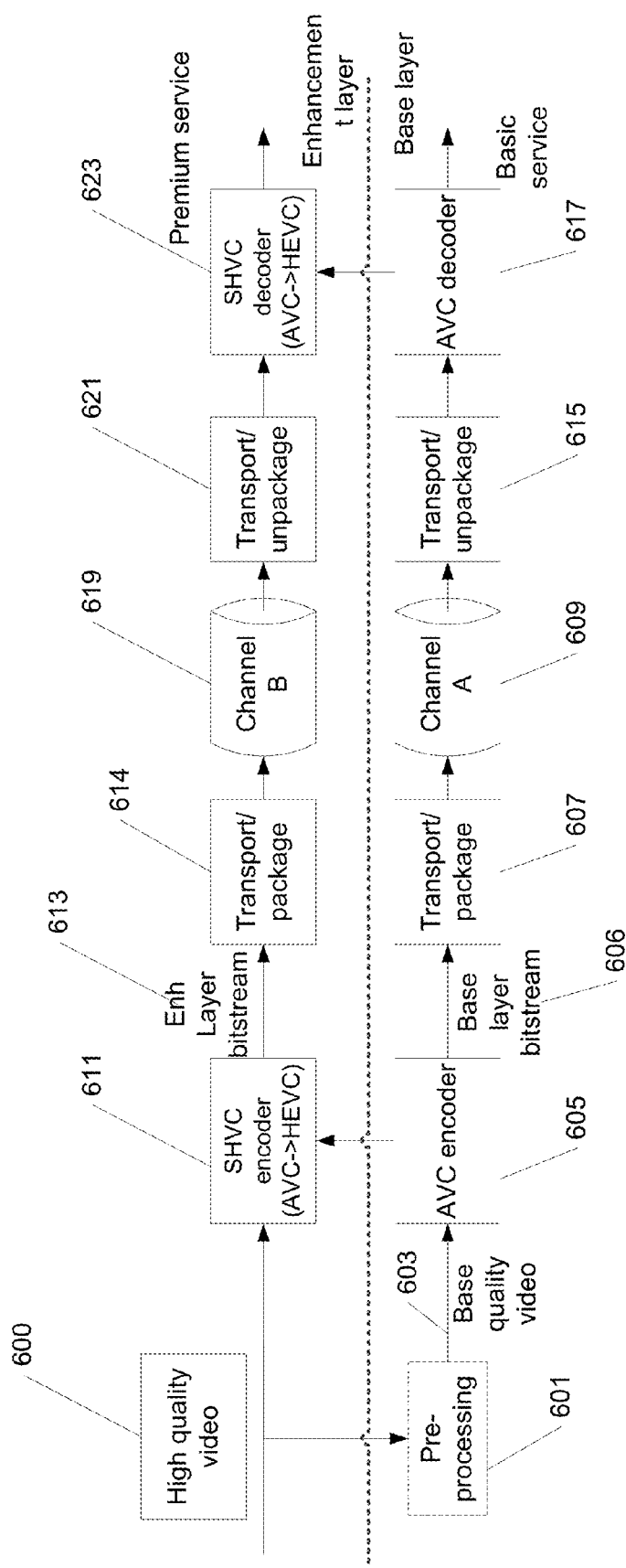
FIG. 6 is a diagram illustrating a representative Video delivery using SHVC codec with hybrid codec scalability support

A representative example of such a delivery system is illustrated in FIG. 6. In FIG. 6, the high quality video 600 is preprocessed in a pre-processing step 601 (e.g., to reduce bandwidth requirements). For example, the pre-processing may be a spatial downsampling of the high quality video, a temporal downsampling (frame rate reduction) of the high quality video, and/or the progressive to interlace conversion process, among others. After preprocessing, the base quality video 603 may be encoded using a legacy codec, for example, the H.264/AVC encoder 605. The H.264/AVC bitstream (base layer bitstream) 606 may be packaged using appropriate transport protocols (step 607), and may be sent via Channel A 609 to customers that subscribe to the basic services, where it is unpackaged (615) and decoded by a legacy decoder (e.g., H.264/AVC decoder 617). The original high quality video 600 may be coded using the scalable codec SHVC 611 that has hybrid codec scalability support, for example, H.264/AVC to HEVC scalability support. The enhancement layer scalable bitstream 613 may be packaged using appropriate transport protocols (614), and delivered via Channel B 619 to premium customers, where it is unpackaged (621) and decoded by a premium decoder (e.g., SHVC decoder 623). At the receiving end, the premium customers with a SHVC decoder 615 may receive and consume the high quality video. Because the reconstructed base layer video is used as inter-layer prediction in the hybrid codec scalability, according to the architecture in FIGS. 4 and 5, the bandwidth used or required to deliver both the higher quality video to the premium customers and the lower quality video to the legacy customers may be reduced compared to simulcasting both a traditional lower quality video stream and a traditional higher quality video stream.

In certain representative embodiments, hybrid codec scalability may be employed for converting video content that is stored/transmitted in interlaced format to progressive format (e.g., without over-burdening the video delivery networks). Although the majority (e.g., vast majority) of internet video content is serviced in progressive scanned format, a significant amount of the video content delivered by broadcasters and/or cable networks is serviced in interlace scanned format. Possible reasons for the use of progressive scanned format may include: (1) the significant cost associated with upgrading the existing video delivery equipment and infrastructure which historically handle mostly interlaced content and/or (2) interlaced content may help reduce bandwidth requirement, and still maintain high frame rate (e.g., which may be useful for sports content delivery).

In certain representative embodiments, a scalable coding system is implemented that relies on picture level inter-layer processing to achieve interlace to progressive scalability (e.g., with high coding efficiency).

Although the hybrid codec system shown in FIG. 6 is used as a representative example, the procedures, processes, and/or techniques disclosed herein are also applicable to other scalable systems, for example, a scalable system that uses the same single layer codec in the BL and in the EL.

Figure 7:
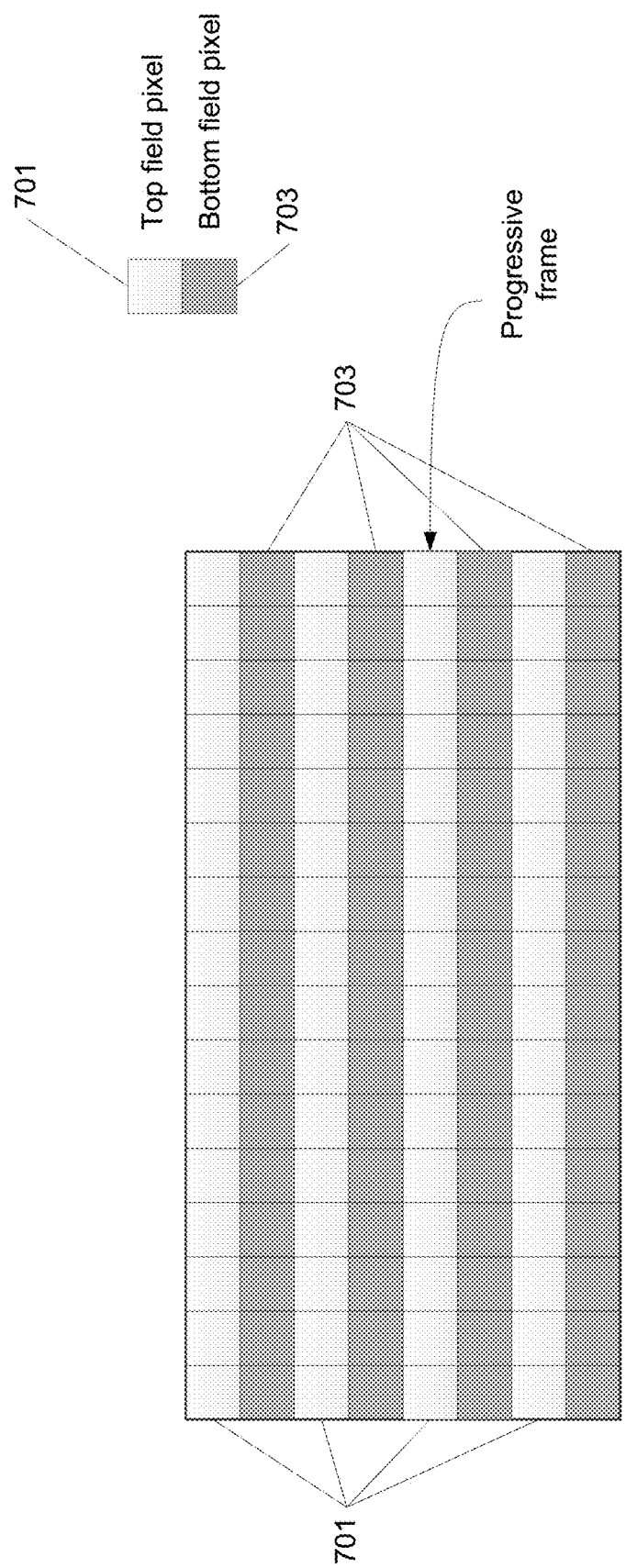
FIG. 7 is a diagram showing a representative progressive frame and illustrating a spatial relationship of pixels in the top field and the bottom field in the interlace video, compared to the progressive frame.
Figure 8:
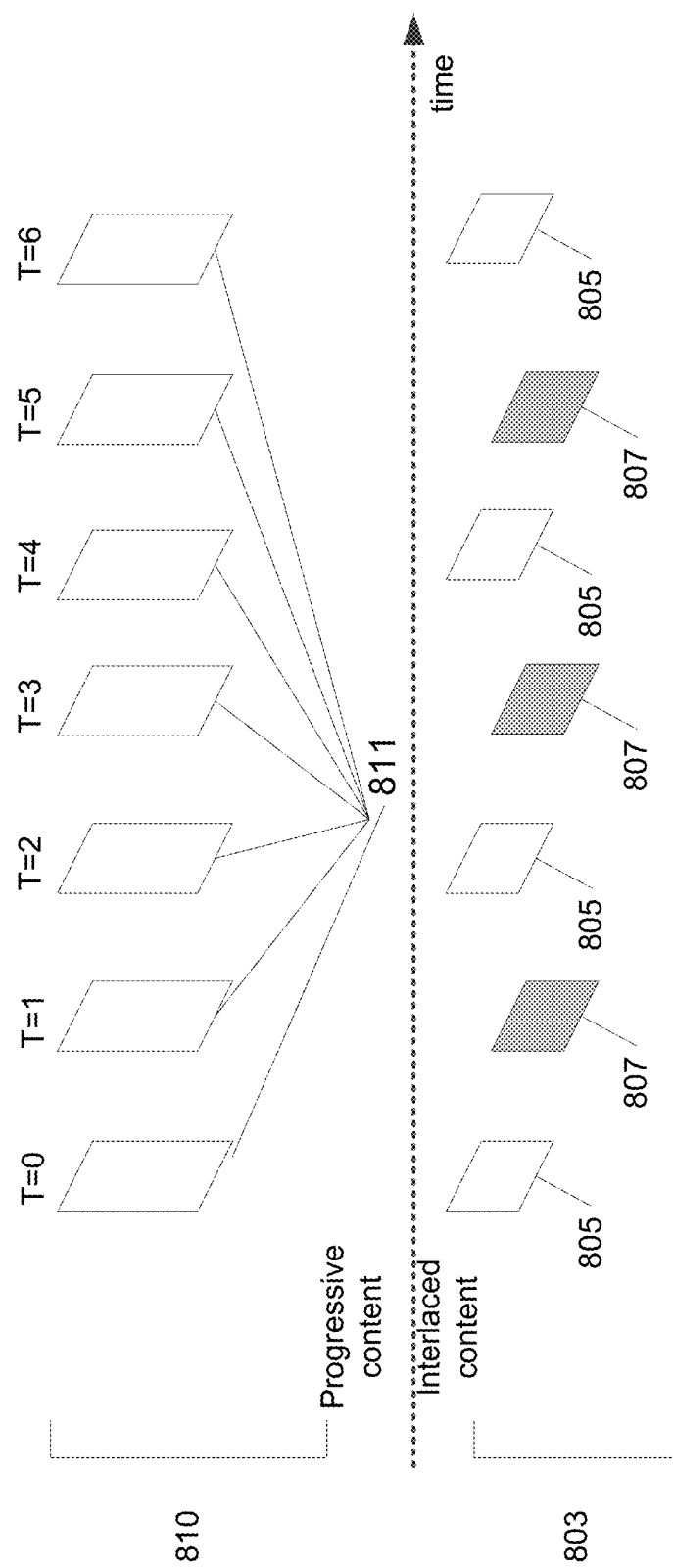
FIG. 8 is a diagram showing a representative interlace video and illustrating an example of the temporal relationship between the top/bottom fields of the interlace video, compared to the frames in its progressive counterpart.

For example, the source video content may be captured in progressive format using a progressive camera and converted to interlace scanned content before delivery. A picture in progressive video format commonly is referred to as a "frame", whereas a picture in the interlace video commonly is referred to as a "field". During progressive to interlace conversion, a progressive scanned video frame may be split into two fields, (e.g., a top field and a bottom field). FIG. 7 is a diagram of a representative progressive frame and illustrates a spatial relationship of pixels in the top field and the bottom field in the interlace video, compared to or relative to the progressive frame. The light gray shaded pixels in FIG. 7 represent the top field 701, and the dark gray shaded pixels represent the bottom field 703. Because the top field and the bottom field may be spatially downsampled versions of the original progressive frame, certain low pass filtering may be applied during progressive to interlace conversion (e.g., to reduce aliasing in the downsampled signal). FIG. 8 is a diagram of a representative interlace video 803 illustrating an example of the temporal relationship between the top and bottom fields 805, 807 of the interlace video 803, compared to the frames 811 in its progressive counterpart 810. As shown, the interlace video may run at the same picture rate as its progressive counterpart and may have half the number of pixels (e.g., due to the spatial downsampling process during progressive to interlace conversion). FIG. 8 is an example. In practice, the interlace video may start from the bottom field instead of the top field and may not follow the regular pattern of 1 top field followed by 1 bottom field (or vice versa), because other temporal picture rate conversion may occur during content creation. For example, a film to TV (e.g. NTSC) conversion, commonly referred to as a 3:2 pulldown, may be applied during content creation, and may cause 2 consecutive bottom fields to follow 1 top field. Whether the current field picture is a top field or bottom field is signaled (e.g., usually signaled) in the video bitstream.

For example, in the H.264/AVC standard, the slice header of an interlace video bitstream may contain or include a flag called a "bottom_field_flag", which when set to 1 indicates that the current slice codes a bottom field, and when set to 0 indicates that the current slice codes a top field. To use the interlace content coded in the base layer for efficient inter-layer prediction according to the scalable architecture depicted in FIGS. 4 and 5, the BL interlace content may be spatially upsampled (e.g., to match the resolution of the progressive video in the EL). The SHVC draft standard supports arbitrary spatial ratios between two layers. The SHVC draft standard does not take into account the specific pixel line relationship between the top/bottom fields and the progressive video as shown in FIG. 7. The use of chroma subsampling in the widely deployed YUV4:2:0 video format may add other considerations when aligning the chroma phase between the top/bottom fields and the progressive frame. In certain representative embodiments, processes, procedures and/or techniques are implemented to enable interlace to progressive scalability (e.g., efficient interlace to progressive scalability). For example, high level syntax signaling in Video Parameter Set (VPS) and slice header (SH) may be provided to indicate that interlace to progressive scalability is used. As another example, a modified luma and chroma upsampling process may be provided that may be based on field parity. As a third example, region based adaptive frame/field upsampling may be provided (e.g., for efficient scalable coding) when the base layer video is coded using block level adaptive frame field coding.

VPS and SH Signaling Modified for Interlace to Progressive Scalability Support

Table 2 below shows a modified VPS extension syntax to support interlace video in base layer. The modification includes the following.

(1) A flag (e.g., a new flag) base_layer_frame_pic_only_flag may be added to indicate whether or not the base layer coded video sequence may contain or include interlace content. In Table 2, the flag may be conditioned on avc_base_layer_flag, (conditioned on the base layer being coded using H.264/AVC codec). For example, the interlace video is allowed (e.g., only allowed) in the base layer when the base layer is coded using an H.264/AVC codec. In certain representative embodiments, the flag may be allowed without other conditions and/or even when the base layer is coded using other codecs.

(2) A signaling of a flag cross_layer_phase_alignment_flag may be conditioned on base_layer_field_pic_flag. The flag cross_layer_phase_alignment_flag may be used to indicate a downsampling filter phase alignment between two layers, and the downsampling filter may be top-left corner aligned and/or center aligned. This flag may not or does not apply to the progressive to interlace conversion process, and may not or is not signaled when the base layer is interlaced video and the enhancement layer is progressive video.

TABLE 2

Modified VPS extension

| vps_extension( ) { | Descriptor |
|---|---|
| avc_base_layer_flag | u(1) |
| if (avc_base_layer_flag) | |
|   base_layer_frame_pic_only_flag | u(1) |
| vps_vui_present_flag | u(1) |
| .... | |
| if(base_layer_frame_pic_only_flag) | |
|   cross_layer_phase_alignment_flag | u(1) |
| .... | |
| } | |

In one embodiment, the base_layer_frame_pic_only_flag equal to 1 specifies that the coded pictures of the base layer coded video sequence contain or includes code frames (e.g., only coded frames). The base_layer_frame_pic_only_flag equal to 0 specifies that the coded pictures of the base layer coded video sequence may be either coded fields or coded frames. When base_layer_frame_pic_only_flag is not present, it may be inferred to be equal to 1.

Table 3 shows the modified slice segment header to support interlace video in the base layer. The modification includes the following.

(1) A new flag base_layer_frame_pic_flag may be added to indicate whether the collocated base layer coded video picture used for inter-layer prediction is a frame picture.

(2) Conditioned on the value of the base_layer_frame_pic_flag, a flag (e.g., a new flag) base_layer_bottom_field_flag may be added to indicate whether the collocated base layer coded video picture used for inter-layer prediction is a bottom field picture or a top field picture.

In Table 3, the presence of these two new flags may be conditioned on any of three conditions or the three conditions being simultaneously true: (1) the current layer is an enhancement layer; (2) the current layer uses the base layer for inter-layer sample prediction; and/or (3) the base layer coded video sequence contains or includes code frames and at least some coded fields (e.g., not only coded frames, but also at least some coded fields).

TABLE 3

Modified slice segment header

| slice_segment_header( ) { | Descriptor |
|---|---|
|   first_slice_segment_in_pic_flag | u(1) |
|   ... | |
|   if( !dependent_slice_segment_flag ) { | |
|     ... | |
|     for( ; i < num_extra_slice_header_bits; i++ ) | |
|       slice_reserved_flag[ i ] | u(1) |
|     if (nuh_layer_id > 0 && | |
| VpsInterLayerSamplePredictionEnabled[ LayerIdxInVPS [nuh_layer_id ] ][ LayerIdxInVPS [ 0 ] ] && | |
| !base_layer_frame_pic_only_flag ) { | |
|       base_layer_frame_pic_flag | u(1) |
|       If (! base_layer_frame_pic_flag ) | |
|         base_layer_bottom_field_flag | u(1) |
|     } | |
|     slice_type | ue(v) |
|     ... | |
|   } | |
|   byte_alignment( ) | |
| } | |

The base_layer_frame_pic_flag equal to 1 may specify that the base layer picture used in inter-layer sample prediction is a frame picture. The base_layer_frame_pic_flag equal to 0 may specify that the base layer picture used in inter layer sample prediction is a top or bottom field picture. When the base_layer_frame_pic_flag is not present, it may be inferred to be 1.

The base_layer_bottom_field_flag equal to 1 may specify that the base layer picture used in inter-layer sample prediction is a bottom field picture. The base_layer_bottom_field_flag equal to 0 may specify that the base layer picture used in inter-layer sample prediction is a top field picture. When base_layer_bottom_field_flag is not present, it may be inferred to be 0.

Field Parity Based Upsampling of Luma Samples

As shown in FIG. 7, the interlace top/bottom field may have half the resolution of the progressive frame in the vertical direction, and may have the same resolution in the horizontal direction. Thus, vertical upsampling (e.g., only vertical upsampling) is to be or may need to be applied to the reconstructed field in the BL to generate the inter-layer reference picture for coding of the progressive frame in the EL.

Table 5 below shows the 16-phase 8-tap upsampling filters for the luma component for SHVC. It is contemplated that the upsampling process for the top/bottom field may use the same upsampling filters as the SHVC filters, although the process described contemplates that other upsampling filters may be used in lieu of the SHVC filters.

The following pseudo code describes the upsampling process of the luma samples based on field parity:

Pseudo code 1:

```
if (base_layer_bottom_field_flag == 0) // upsample the top field in BL
{
  for (y = 0; y < frame height; y++)
  {
    y0 = y >> 1;
    for (x = 0; x < frame width; x++)
    {
      if(y0 << 1 == y) { // derive the even lines in the EL frame with
        copying copy pixel from the top field located at line y0
      }
```

-continued

Pseudo code 1:

```
    else { // derive the odd lines in the EL frame using vertical
       interpolation
       fetch pixels at lines y0-3, y0-2, y0-1, y0, y0+1, y0+2, y0+3,
  y0+4 from the base layer top field
       perform interpolation using phase-8 filter from Table 5
       }
  }
  else // upsample the bottom field in BL
  {
    for (y = 0; y < frame height; y++)
    {
      y0 = y >> 1;
      for (x = 0; x < frame width; x++)
      {
        if(y0 << 1 == y) { // derive the even lines in the EL frame with
          vertical interpolation
          fetch pixels at lines y0-4, y0-3, y0-2, y0-1, y0, y0+1, y0+2,
  y0+3 from the base layer bottom field
          perform interpolation using phase-8 filter from Table 5
        }
        else { // derive the odd lines in the EL frame with copying
          copy pixel from the bottom field located at line y0
        }
      }
  }
```

Field Parity Based Upsampling of Chroma Samples

Figure 9:
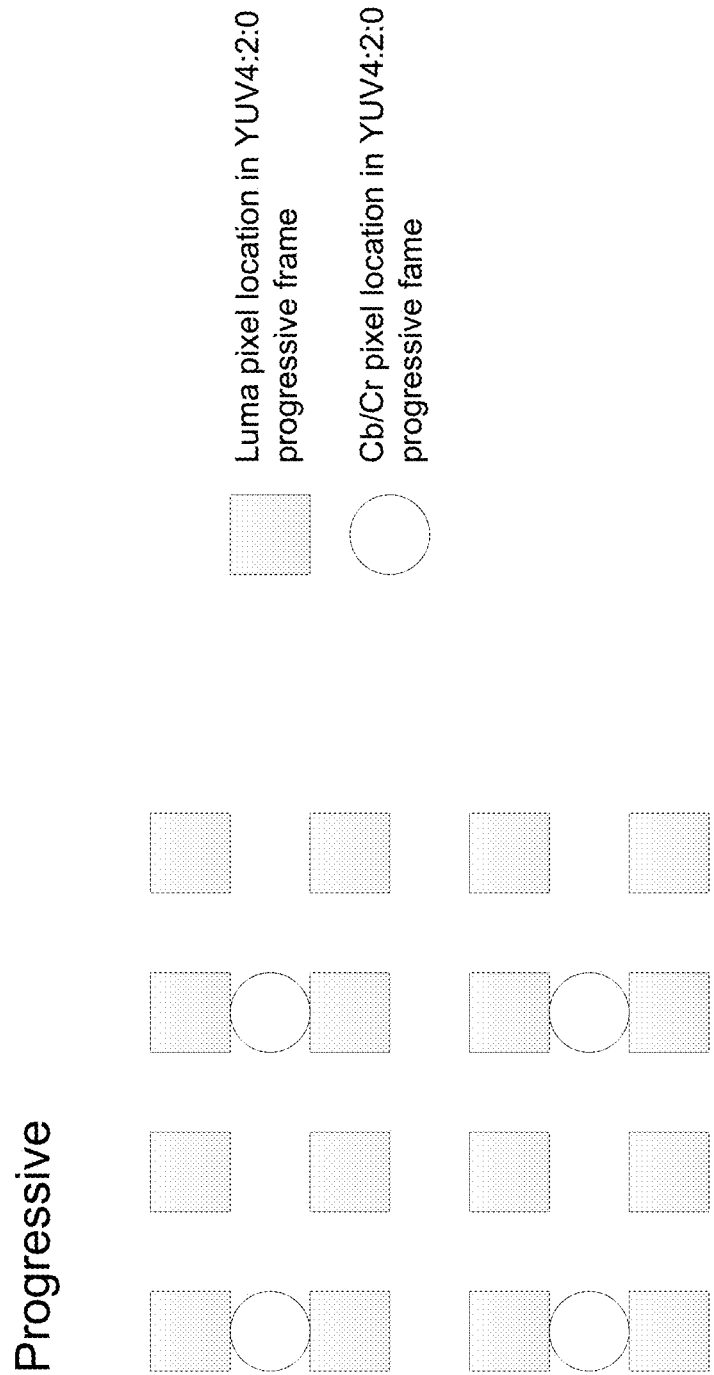
FIG. 9 is a diagram illustrating the default relative locations of chroma samples and luma samples in the YUV4:2:0 video format for a progressive scanned video frame.

The spatial alignment between frame and top/bottom field of the chroma samples may be, for example more complicated than the luma samples due to chroma subsampling in YUV4:2:0 video. FIG. 9 is a diagram illustrating the default relative locations of chroma samples (represented as circles in FIG. 9) and luma samples (represented as squares in FIG. 9) in the YUV4:2:0 video format (e.g., commonly used YUV4:2:0 video format) for a progressive scanned video frame. As shown in FIG. 9, for every 2×2 luma samples, 1 chroma sample (e.g., only 1 chroma sample) per chroma channel (that is, Cb and Cr) may be available. According to the default chroma sample location shown in FIG. 9, relative to the 2×2 luma neighboring samples, the chroma sample may be aligned to the even luma positions in the horizontal direction. In certain representative embodiments, the chroma sample may be off by half a pixel in between the even and odd luma positions in the vertical direction.

Figure 10:
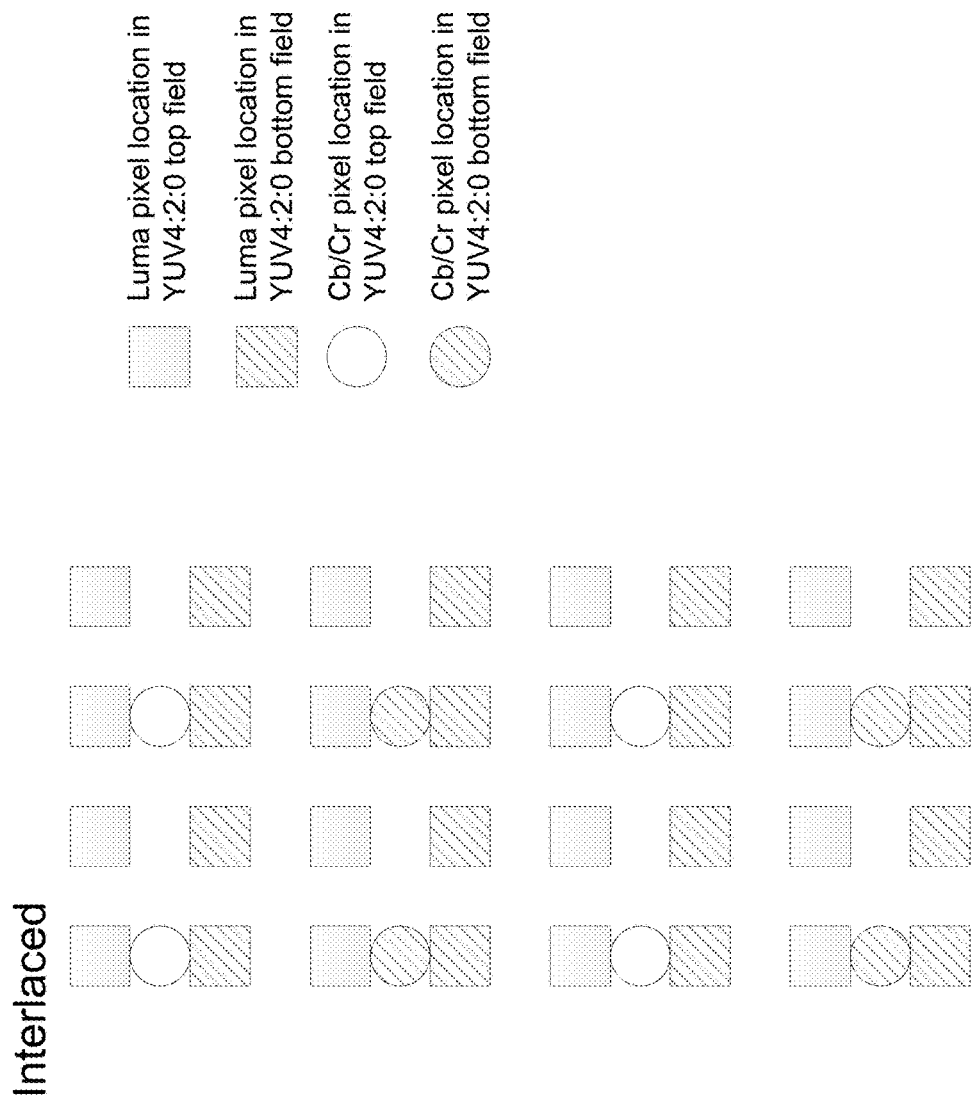
FIG. 10 is a diagram illustrating the default relative locations of chroma samples and luma samples in the YUV4:2:0 video format for an interlace scanned video top field and bottom field.

FIG. 10 is a diagram illustrating the default relative locations of chroma samples (represented as circles in FIG. 10) and luma samples represented as squares in FIG. 10) in the YUV4:2:0 video format for an interlace scanned video top field (represented as solid pixels in FIG. 10) and bottom field (represented as shaded pixels in FIG. 10). In the same way as the progressive video arrangement, for every 2×2 luma samples, 1 chroma sample (e.g., only 1 chroma sample) per chroma channel (that is, Cb or Cr) may be available. In the default chroma sample location of an interlace field, relative to the 2×2 luma neighboring samples, the chroma sample may be aligned to the even luma positions in the horizontal direction (this may be the same as the progressive arrangement). In certain representative embodiments, the chroma sample may be off by a quarter pixel in between the even and the odd luma positions in the vertical direction (this may not be the same as the progressive arrangement).

TABLE 5

16-phase luma resampling filter in SHVC interpolation filter coefficients

| phase p | $f_L[p, 0]$ | $f_L[p, 1]$ | $f_L[p, 2]$ | $f_L[p, 3]$ | $f_L[p, 4]$ | $f_L[p, 5]$ | $f_L[p, 6]$ | $f_L[p, 7]$ |
|---|---|---|---|---|---|---|---|---|
| 0 | 0 | 0 | 0 | 64 | 0 | 0 | 0 | 0 |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

TABLE 6

16-phase chroma resampling filter in SHVC interpolation filter coefficients

| phase p | $f_C[p, 0]$ | $f_C[p, 1]$ | $f_C[p, 2]$ | $f_C[p, 3]$ |
|---|---|---|---|---|
| 0 | 0 | 0 | 64 | 0 | 0 |
| 1 | −2 | 62 | 4 | 0 |
| 2 | −2 | 58 | 10 | −2 |
| 3 | −4 | 56 | 14 | −2 |
| 4 | −4 | 54 | 16 | −2 |
| 5 | −6 | 52 | 20 | −2 |
| 6 | −6 | 46 | 28 | −4 |
| 7 | −4 | 42 | 30 | −4 |
| 8 | −4 | 36 | 36 | −4 |
| 9 | −4 | 30 | 42 | −4 |
| 10 | −4 | 28 | 46 | −6 |
| 11 | −2 | 20 | 52 | −6 |
| 12 | −2 | 16 | 54 | −4 |
| 13 | −2 | 14 | 56 | −4 |
| 14 | −2 | 10 | 58 | −2 |
| 15 | 0 | 4 | 62 | −2 |

In most video applications that use YUV4:2:0 (which may include consumer video applications), the default chroma sample location may be used. For example, the chroma samples may be located as shown in FIG. 9 for progressive video and as shown in FIG. 10 for interlace video. Compared to the progressive to progressive spatial scalability currently specified in SHVC draft 4, for interlace to progressive spatial upsampling, different phase filters may be used or needed to correctly perform chroma upsampling. Table 6 above shows the 4-tap 16-phase chroma upsampling filters specified in SHVC draft 4. For progressive-to-progressive scalability with 2× ratio in the vertical direction, the phase-6 and phase-14 filters may be used to upsample chroma. In comparison, for interlace to progressive with 2× ratio in the vertical direction, the phase-0 and phase-8 filters may be the correct filters to choose or select for chroma upsampling. For example, for interlace to progressive scalability, upsampling filter phases for luma and for chroma may be the same. If the SHVC chroma upsampling filters in Table 6 are used, the following pseudo code may describe the chroma upsampling process. It is contemplated that, similar to the luma upsampling process discussed herein, the following pseudo code may be used for other chroma upsampling filters.

---

Pseudo code 2:

```
if (base_layer_bottom_field_flag == 0) // upsample the top field in BL
{
  for (y = 0; y < chroma frame height; y++)
  {
    y0 = y >> 1;
    for (x = 0; x < chroma frame width; x++)
    {
      if(y0 << 1 == y) { // derive the even lines in the EL frame with
      copying copy chroma pixel from the top field located at line y0
      }
      else { // derive the odd lines in the EL frame using vertical
      interpolation
        fetch chroma pixels at lines y0−1, y0, y0+1, y0+2 from the base
        layer top field
        perform interpolation using phase-8 filter from Table 6
      }
    }
  }
}
else // upsample the bottom field in BL
{
  for (y = 0; y <chroma frame height; y++)
  {
    y0 = y >> 1;
    for (x = 0; x < chroma frame width; x++)
    {
      if(y0 << 1 == y) { // derive the even lines in the EL frame with
      vertical interpolation
        fetch chroma pixels at lines y0−2, y0−1, y0, y0+1 from the base
        layer bottom field
        perform interpolation using phase-8 filter from Table 6
      }
      else { // derive the odd lines in the EL frame with copying
      copy chroma pixel from the bottom field located at line y0
      }
    }
  }
}
```

---

The process for chroma upsampling in pseudo code 2 is specified when the default chroma sample locations are used for both the interlace video in the BL and the progressive video in the EL. Other non-default chroma sample locations (other than those shown in FIGS. 9 and 10) may be allowed, and may be signaled as part of the video bitstream using the Video Usability Information (VUI) in the H.264/AVC standard and/or the version 1 HEVC standard. For example, the value of the "chroma_sample_loc_type" may be used to define or set the location of the chroma sample relative to its luma neighbors. If non-default chroma sample locations are used (in the interlace video, the progressive video, or both), explicit chroma phase signaling may be used and/or added to the scalable bitstream to describe the chroma locations of the interlace and/or the progressive video layers. Such explicitly signaled chroma phase information may be used to derive the correct phase filters for chroma upsampling.

In SHVC draft 4, selection of the reference pixels and the phase filter used in interpolation is performed (e.g., in subclause H.6.2), using the following.

The variables phaseX, phaseY, addX and addY are derived as follows:

$$\text{phase}X = (c\text{Idx} == 0)?(\text{cross\_layer\_phase\_alignment\_flag} << 1): \text{cross\_layer\_phase\_alignment\_flag} \quad \text{(H-5)}$$

$$\text{phase}Y = (c\text{Idx} == 0)?(\text{cross\_layer\_phase\_alignment\_flag} << 1): \text{cross\_layer\_phase\_alignment\_flag} + 1 \quad \text{(H-6)}$$

$$\text{add}X = (\text{ScaleFactor}X * \text{phase}X + 2) >> 2 \quad \text{(H-7)}$$

$$\text{add}Y = (\text{ScaleFactor}Y * \text{phase}Y + 2) >> 2 \quad \text{(H-8)}$$

The variables xRef16 and yRef16 are derived as follows:

$$x\text{Ref}16 = (((xP - \text{offset}X) * \text{ScaleFactor}X + \text{add}X + (1 << 11)) >> 12) - (\text{phase}X << 2) \quad \text{(H-9)}$$

$$y\text{Ref}16 = (((yP - \text{offset}Y) * \text{ScaleFactor}Y + \text{add}Y + (1 << 11)) >> 12) - (\text{phase}Y << 2) \quad \text{(H-10)}$$

In one embodiment for implementation within the framework of the SHVC draft, the field parity based luma and chroma upsampling for interlace to progressive scalability as described in pseudo code 1 and pseudo code 2, adjustments may be made to equation (H-6) as follows:

$$phaseY = (\text{base\_layer\_frame\_pic\_flag} == 0)?4 * \text{base\_layer\_bottom\_field}$$
$$\_\text{flag}(c\text{Idx} == 0)?(\text{cross\_layer\_phase\_alignment\_flag} << 1)$$
$$: \text{cross\_layer\_phase\_alignment\_flag} + 1$$

Region-Based Adaptive Frame/Field Upsampling

Both H.264/AVC and HEVC allow adaptive frame field coding for interlaced video sequences. Three types of adaptive frame field (AFF) coding may be used.

(1) Sequence AFF (SAFF) may be used. For example, frame coding and/or field coding may be adapted at the sequence level. Frame coding may be used for pictures (e.g., all pictures) in one video sequence, and field coding may be used for pictures (e.g., all pictures) in another video sequence. In this case, a video sequence may be defined as a set of pictures between two random access points marked by Instantaneous Decoding Refresh (IDR) pictures, for example rather than the entire video signal in full length.

(2) Picture AFF (PAFF) may be used. For example, frame coding and/or field coding may be adapted at the picture level. Within a video sequence, frame coding may be used for one picture, and field coding may be used for another picture.

(3) Block level AFF (MBAFF) may be used. For example, frame coding and/or field coding may be adapted at the block level. In, for example, H.264/AVC, the basic block coding unit is called a macroblock or MB, and has a dimension of 16×16 pixels (in terms of the luma component). The frame and/or field signaling in MBAFF may be based on MB pair (16×32). The signaling may allow one macroblock pair in the picture to be coded in the frame mode and another macroblock pair, for example in the same picture, to be coded in the field mode. When field mode is used, the MB pair may be split into the top field MB and the bottom field MB and separately coded.

Figure 11:
FIG. 11 is a picture illustrating an example where the top field and the bottom field are combined into one picture.

HEVC allows only sequence adaptive frame field coding (SAFF) for interlace content, and H.264/AVC allows all three types of AFF (e.g., SAFF, PAFF, and MBAFF). Compared to SAFF and PAFF, MBAFF may be useful when some parts of the video sequence remain static (for example, the static background) and other parts of the video sequence are moving (for example, the moving foreground). FIG. 11 is a picture illustrating an example where the top field and the bottom field are combined into one picture. In FIG. 11, the hands and arms of the person are the moving parts (and the corresponding region of the picture has very noticeable "interlace artifacts" or "combing artifacts"), whereas the background wall and the head of the person are substantially static (with the corresponding region of the picture looking like a normal progressive frame). The picture in FIG. 11 may be coded as one composite frame (e.g., where top and bottom fields may be combined into one frame with the same resolution as a progressive frame) using MBAFF (e.g., the macroblocks covering or corresponding to the moving hands may be coded (e.g., better coded) as field macroblocks, and the macroblocks covering or corresponding to the static wall and head may be coded (e.g., better coded) as frame macroblocks). Such an arrangement may be used to code the BL interlace video using the H.264/AVC standard. To achieve efficient inter-layer prediction when the BL video is coded using block level adaptive frame field coding such as MBAFF, a region based adaptive frame-field upsampling process may be applied.

Figure 12:
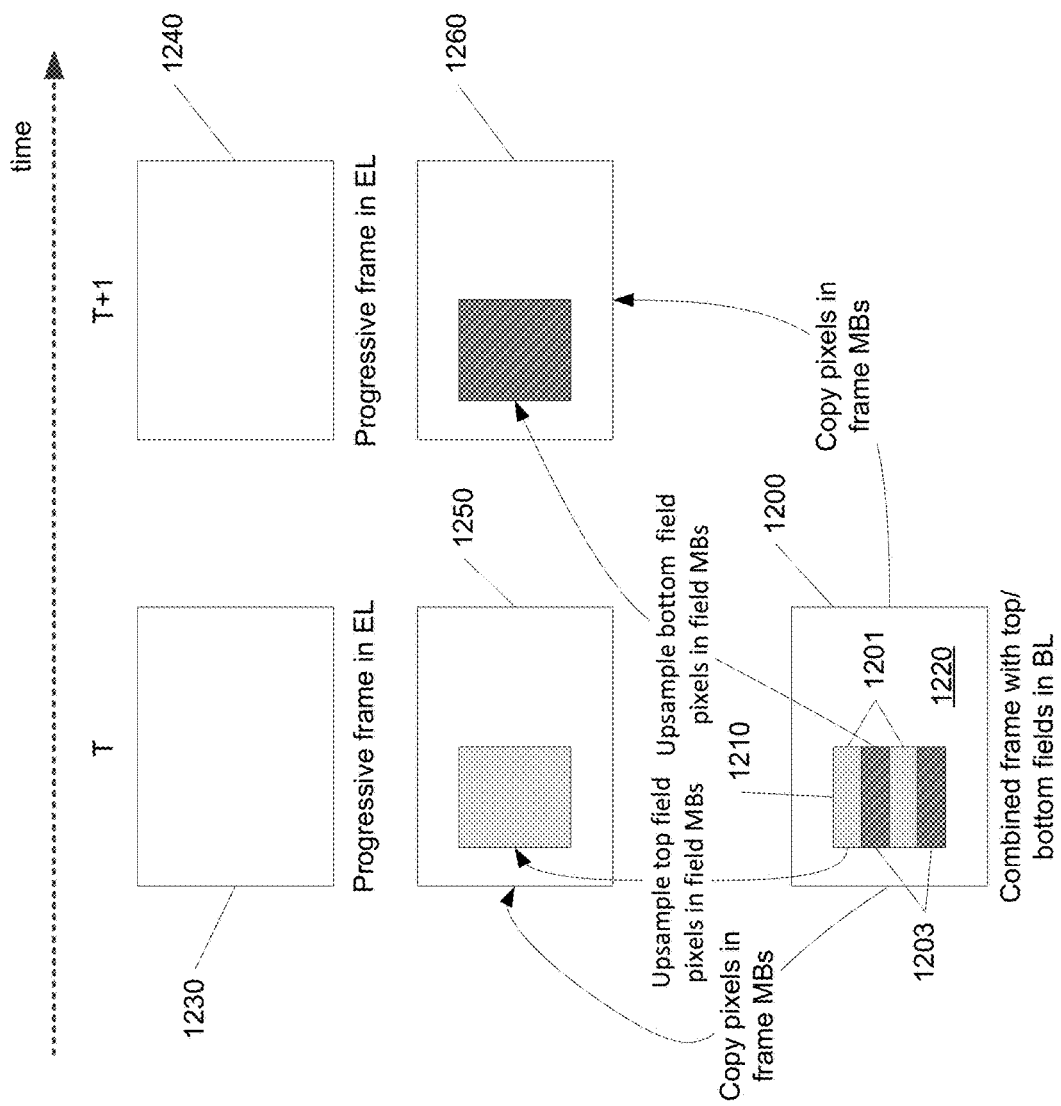
FIG. 12 is a diagram illustrating an example of region based adaptive frame-field upsampling.

FIG. 12 is a diagram illustrating an example of region based adaptive frame-field upsampling. Looking first at the bottommost row in FIG. 12, the coded BL frame may include or consist of two fields. A first part 1210 of the BL frame 1200 may be coded using two field MBs, as shown represented in FIG. 12 by the shaded areas 1201 and cross-hatched areas 1203, respectively. The top field 1201 in the part 1210 where MBs are coded in field mode is represented as shaded, and the bottom field 1203 in the part 1210 where MBs are coded in field mode is represented as cross-hatched. The other part 1220 of the BL frame 1200 is coded using frame MBs, as represented by solid white area. The two progressive frames 1230 and 1240 in the EL at time instances T and T+1 correspond to the top field and the bottom field in the BL, respectively.

The following steps may be applied to produce the inter-layer reference picture 1250 that is to be used, for example, to efficiently predict the EL progressive frame at time instance T (which corresponds to the top field 1201 in the BL)):
  (1) pixels in the static region(s) 1220 are copied;
  (2) top field 1201 pixels (e.g., only top field pixels) from the moving region 1210 in the BL picture 1200 are copied;
  (3) field parity based 2× upsampling is performed in the vertical direction in accordance with the disclosure herein to fill in the interleaved lines in the moving region 1220 in the inter-layer reference picture 1250 for time T.

The following steps may be applied to produce the inter-layer reference picture 1240 that is to be or may be used to predict the EL progressive frame 1240 at time instance T+1 (which corresponds to the bottom field 1203 in the BL):
  (1) pixels in the static region(s) 1220 are copied;
  (2) bottom field 1203 pixels (e.g., only the bottom field pixels) from the moving region 1210 in the BL picture 1200 are copied;
  (3) field parity based 2× upsampling is performed in the vertical direction in accordance with the disclosure herein to fill in the interleaved lines in the moving region 1220 in the inter-layer reference picture 1260 for time T+1.

The region based adaptive frame-field upsampling procedure may effectively use those pixels in the coded BL frame 1200 that correspond to the correct time instances in the EL for inter-layer prediction.

Parameters specifying which regions in the picture may or should use field parity based upsampling may be decided by the encoder and may be signaled as part of the bitstream, for example, in the EL slice header. Because the BL picture may be coded as a composite frame, rather than 2 fields, the flag base_layer_frame_pic_flag in Table 3 may be set to 1. Although FIG. 12 shows one region 1220 (e.g., only one region) where MBs in the BL are coded in field mode and where field parity based upsampling may be applied, more than one region (e.g., any number of such regions) may exist and may be signaled in the bitstream. The one or more regions may be signaled by specifying the location (e.g., by specifying a corner coordinate, for example the top left coordinates) and the dimension (e.g. width and height) and/or specifying a second diagonal corner location. In certain representative embodiments, the one or more regions may be signaled by indicating which macroblocks in the BL are coded using field mode (e.g., the beginning MB index and the ending MB index in raster scan order).

In other representative embodiments, the upsampling (frame and/or field) procedures for each region may be decided or determined implicitly. The encoder and the decoder may determine the appropriate upsampling procedure to be applied to each region in the same way, for example, by detecting the amount of movement between a top field and a bottom field within that region. To determine the amount of movement between the top and bottom fields, difference metrics such as Sum of Absolute Difference (SAD) or Sum of Square Error (SSE) between the top field and the bottom field may be applied. The encoder may determine an appropriate threshold value of SAD or SSE and may transmit the threshold to the decoder. If the value of SAD/SSE between the top and bottom fields is greater than the threshold, the particular region may be regarded as a moving region and field parity based upsampling may be applied. Otherwise (e.g., if the value of SAD/SSE between the top and bottom fields is not greater than the threshold), the particular region may be regarded as a static region and pixel copying may instead be applied.

In the region-based adaptive frame/field upsampling process described herein, pixel copying may be applied to the static region (where MBs may be coded in the frame mode). Pixel copying is merely as an example. More sophisticated inter-layer processing technologies, such as de-noising filtering or de-artifacting filter, also may be applied to these pixels that belong to the frame-mode MBs. Further, the above described methods to form the inter layer reference pictures for EL coding can instead also be used as de-interlacing techniques. For example, the display may detect the regions with fast motion (e.g. by extracting from the bitstream information about which blocks are coded using MBAFF as field blocks), and may perform de-interlacing to produce progressive frames using the same steps as discussed above in connection with FIG. 12 for producing the inter layer reference pictures at time T and time T+1. In other embodiments, special parameters may be sent by the encoder, for example, as part of a Supplemental Enhancement Information (SEI) message, to improve de-interlacing at the display. Such special parameters may include those discussed above, such as signaling of the dimension and the location of the regions with fast motion, and/or signaling and/or using predetermined threshold values for the display to determine the fast-motion regions.

Reference Picture Based on Field Combination

Field combination techniques and procedures may be used when converting interlaced video to a progressive format (e.g., for display). The conversion process may be referred to as "de-interlacing". For example, a broadcaster may perform de-interlacing of interlaced content and then transmit such content in a progressive digital format. As another example, a modern digital television set may have a display that is progressive by nature, and such a set may need to de-interlace received interlaced content before displaying the content in progressive format. Such de-interlacing techniques and procedures may combine information from different fields (e.g., to produce a progressive frame for display). In certain representative embodiments, procedures may be implemented to adapt field combination techniques to the task of inter-layer prediction.

Figure 13:
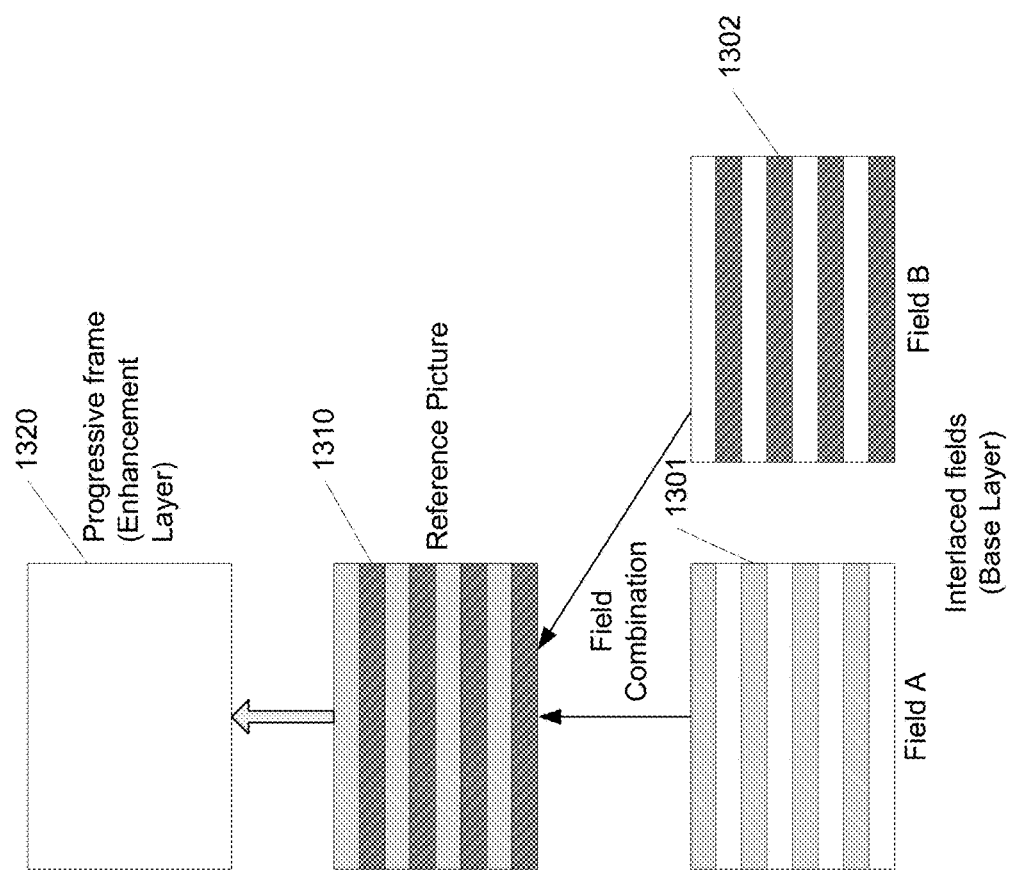
FIG. 13 is a diagram illustrating a representative procedure for inter-layer prediction using field combination

FIG. 13 illustrates one representative procedure. A base layer may be coded using interlaced fields. These are illustrated in the figure as "Field A" 1301 and "Field B" 1302. A field combination technique may be used to combine the base layer fields to produce a reference picture 1310, which may be used as an inter-layer reference picture for prediction of a progressive frame 1320 in the enhancement layer. By combining fields from the base layer, it may be possible to construct a better reference picture than may be possible from a single field (e.g., only a single field). For example, field combination may allow the reference picture to preserve details of the full vertical resolution, where such detail may be lost if the reference picture were instead formed from a single field upsampled in the vertical direction, such as discussed herein.

The field combination technique may take various forms. In one representative embodiment, content from a first field (e.g. "Field A") may be copied to the even lines of the inter-layer reference picture, and content from a second field (e.g. "Field B") may be copied to the odd lines of the inter-layer reference picture. In this way, the lines from one field may be woven together with the lines from another field to produce the reference picture.

In another representative embodiment, content from a first field (e.g. "Field A") may be averaged with content from a second field (e.g. "Field B") to produce lines of the reference picture. Such averaging may be performed using, for example, a weighted average technique. For example, an even line of the reference picture may be produced by a weighted average that combines a line from a top field of the base layer and a corresponding line of a bottom field from the base layer. The weight for the top field line may be greater than, equal to, or less than the weight for the bottom field line (e.g., the top field line may be combined with a weight of 0.8 and the bottom field line may be combined with a weight of 0.2). In this way, the base layer fields may be blended together, and 'combing' artifacts may be reduced in the resulting reference picture.

In yet another representative embodiment, content from a first field (e.g. "Field A") may be combined with content from a second field (e.g. "Field B") using a motion compensation technique. In this way, motion that occurred during the time difference between the time corresponding to the EL progressive frame and the time corresponding to each of the base layer fields may be compensated for, and 'combing' artifacts may be reduced or substantially eliminated in the resulting reference picture. For example, in accordance with FIG. 13, if Field A 1301 of the base layer is collocated (e.g., has the same display time) with the progressive enhancement layer frame to be predicted 1320, Field B 1302 of the base layer may have a different display time relative to Field A 1301 and relative to the progressive enhancement layer frame 1320. For example, Field B may be $\frac{1}{30}$ of a second later than Field A. In this case, the reference picture may be constructed by copying the lines of Field A into the reference picture (e.g., into the even lines of the reference picture, if Field A is a top field) and by copying motion-compensated versions of the lines of Field B into the reference picture (e.g., into the odd lines of the reference picture, if Field B is a bottom field). The motion compensation of Field B may be performed relative to Field A to better align the picture data of Field B with that of Field A when constructing the reference picture 1310. In this way, the reference picture may preserve details of the full vertical resolution, and may reduce or substantially eliminate 'combing' artifacts.

The motion compensation may be carried out on one field (e.g., 'Field B') relative to another field (e.g., 'Field A'), where both fields are available at both the encoder and decoder sides. For example, the encoder and the decoder may each perform an identical motion estimation and compensation procedure between fields, and so the same reference picture may be constructed at both the encoder side and the decoder side (e.g., without the need to transmit motion information (e.g., motion mode information) and/or motion vectors from the encoder to the decoder (e.g., in the bitstream). The overall field combination procedure and/or technique (including any motion compensation process and/or procedure) may be fixed and may be preset (e.g., agreed in advance) between the encoder side and the decoder side. In certain representative embodiments, it is contemplated that variation on the process/procedure may be possible, with appropriate signaling sent from the encoder to the decoder to define (e.g., set or establish) the process. As an example, the encoder may signal per reference picture whether the field combination used to construct the reference picture is based on field copying (e.g., fields may be 'woven together' as described herein), or based on motion compensation of one field relative to another. As another example, the encoder may signal different field combination procedures and/or techniques to be used to construct different regions of the reference picture such that some blocks of the reference picture may be constructed using one field combination procedure/technique, and other blocks of the reference picture may be constructed using a different field combination procedure/technique.

Although FIG. 13 shows Field A 1301 of the base layer as collocated with the EL progressive frame 1320 to be predicted, and Field B 1302 of the base layer as a temporally later field, other configurations are possible. For example, the reference picture may be constructed as a combination of a first base layer field collocated with the EL progressive frame to be predicted and a second base layer field temporally earlier than the first base layer field. As another example, the reference picture may be constructed as a combination of two base layer fields where neither of the two base layer fields is collocated with the EL progressive frame to be predicted.

Figure 14A:
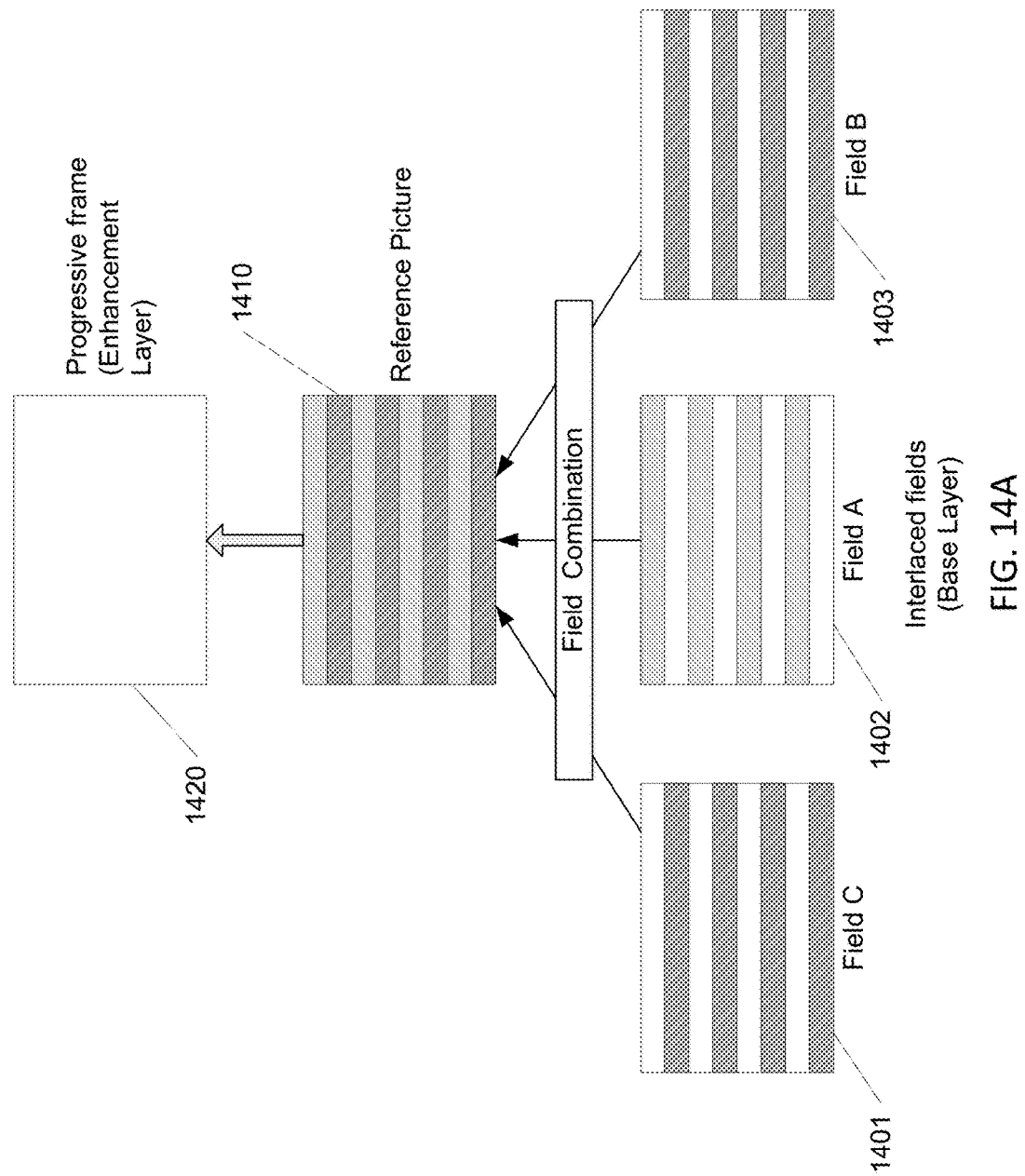
FIG. 14A is a diagram illustrating a representative procedure for inter-layer prediction using field combination with more than two fields.

As a further example, the reference picture may be constructed as a combination of more than two base layer fields (e.g., as a combination of a first base layer field (e.g., "Field A") collocated with the EL progressive frame to be predicted 1420, a second base layer field (e.g. "Field B") temporally later than the first base layer field, and a third base layer field (e.g. "Field C") temporally earlier than the first base layer field. The representative procedure/process is illustrated in FIG. 14A. In certain representative embodiments, the reference picture 1410 may be constructed as a weighted combination of the first 1401, second 1402, and/or third 1403 base layer fields. In other representative embodiments, the reference picture 1410 may be constructed using motion compensation of the second base layer field 1402 and third base layer field 1403 relative to the first base layer field 1401, where motion compensated data for each local area (e.g., each block) of the reference picture may be selected from the second and/or third base layer fields depending on which one or ones provide a better match for (e.g., better alignment with) the data in the first base layer field. The same process may be executed identically at the encoder side and the decoder side such that, for example, there may be no need to transmit motion information (e.g., mode information and/or motion vectors) to describe the motion compensation process/procedure for construction of the inter-layer reference picture.

Each interlaced field shown in FIGS. 13 and 14A may represent a complete picture coded as a field, or may represent a field-coded subset of a picture (e.g., one or more macroblock fields coded using MBAFF).

Layer Adaptive and Picture Adaptive Resampling Phase Selection

Appropriate phase filters may be chosen in resampling (e.g., upsampling) to improve coding efficiency when a base layer picture is, for instance, used for resampling to predict an enhancement layer picture. In one non-limiting example, the most appropriate phase filters may depend on whether the base layer data that is being used is a top interlaced field or a bottom interlaced field. In certain representative embodiments one or more of the following may be implemented:

(1) add SPS signaling, vert_phase_position_present_flag, to indicate whether vertical phase filter adjustment at picture level may or may not be enabled for one or more reference layers;
(2) add slice header signaling, phase_position_flag, to indicate the vertical phase position, for those reference layers where vertical phase filter adjustment is enabled;
(3) if appropriate or needed, adjust the vertical phase filter selection during resampling according to the value of phase_position_flag in slice header; and/or
(4) add a VPS VUI indication, vps_vui_phase_adjustment_flag, to indicate whether picture-based phase filter adjustment is necessary for the decoding of at least one picture in the scalable bitstream. This VPS VUI indication flag may not affect the normative decoding process. By informing the decoder of whether picture based phase filter adjustment is necessary, this flag may allow some decoder implementations to pre-load fixed phase filters at the beginning (e.g., very beginning) of decoding a video sequence, if picture based phase filter adjustment is not appropriate or needed.

If the above-mentioned slice level signaling is a 1-bit flag (e.g., only a 1-bit flag) for a specific reference layer, it would only allow toggling between the top field and the bottom field (e.g., in a vertical direction only), but may not allow changing vertical and horizontal phase filters at the picture level. Additional flexibility for picture based phase filter selection for both horizontal and/or vertical upsampling may be appropriate and/or implemented (for example for the following use cases):

(1) different downsampling filters (e.g., with different phase characteristics and/or different sampling grid alignment) may be used to downsample and to generate the video pictures at different layers, as discussed in U.S. Published Patent Application No. 2014/0037015, the contents of which are incorporated by reference herein;
(2) regular downsampling filters may be combined with the progressive to interlace conversion process, for example, to directly convert 4 k×2 k progressive video to 1080i interlaced video;
(3) for chroma subsampling, the non-default chroma sample location (e.g., chroma sample phases relative to luma samples) in interlaced and/or progressive YUV 420 or YUV422 may be used. The default chroma sample locations for YUV 420 progressive and interlace video were shown in FIG. 9 and FIG. 10, respectively. However, video standards such as HEVC and H.264/AVC may allow using other chroma sample locations. Chroma phase filter selection may be or may need to be decoupled from luma phase filter selection.

In certain representative embodiment, procedures to signal sampling grid parameters may be implemented, which may be used to select the upsampling phase filters. When the sampling grid is signaled at the sequence level, the representative procedures may not allow picture-based phase filter adaptation. When the sampling grid is signaled at $1/16$-th pixel precision, the representative procedures may use or require more bits for the representation.

Certain representative procedures to signal sampling grid parameters such as those disclosed in aforementioned U.S. Published Patent Application No. 2014/0037015, may be implemented for signaling of phase information that may be generic, may provide more efficient signaling, and may have the capability of picture level phase filter adaptation.

For example, phase filters may be selected based on the following variables:

$$phaseX = cross\_layer\_phase\_alignment\_flag << 1$$

$$phaseXC = cross\_layer\_phase\_alignment\_flag$$

$$phaseY = VertPhasePositionAdjustFlag?(VertPhasePositionFlag << 2): (cross\_layer\_phase\_alignment\_flag << 1)$$

$$phaseYC = VertPhasePositionAdjustFlag?phaseY: (cross\_layer\_phase\_alignment\_flag + 1)$$

It is contemplated that phaseX and phaseXC may be used to select the horizontal phase filters for resampling of the luma and chroma components, respectively. PhaseY and phaseYC may be used to select the vertical phase filters for resampling of the luma and chroma components, respectively.

As shown above in Tables 5 and 6, 16-phase filters may be used to perform upsampling. For each sample (e.g., each luma or chroma sample) location (xP, yP) in the resampled picture, a phase filter from Table 5 and/or Table 6 is selected. Using the luma component as an example, the following may be used to choose one out of the 16 phase filters (luma or chroma) for resampling:

$$addX = (ScaleFactorX * phaseX + 2) >> 2$$

$$addY = (ScaleFactorY * phaseY + 2) >> 2$$

$$xRef16 = \left(\left\lfloor\frac{(xP - offsetX) * ScaleFactorX + addX + (1 << 11)}{}\right\rfloor >> 12\right) - (phaseX << 2)$$

$$yRef16 = \left(\left\lfloor\frac{(yP - offsetY) * ScaleFactorY + addY + (1 << 11)}{}\right\rfloor >> 12\right) - (phaseY << 2)$$

$$\text{x\_phase\_filter\_idx} = xRef16 \text{ modular } 16$$

$$\text{y\_phase\_filter\_idx} = yRef16 \text{ modular } 16$$

where ScaleFactorX and ScaleFactorY are the scaling ratios represented with 16-bit fixed point precision, (xP, yP) is the sample location in the resampled picture, and offsetX and offsetY are the cropping offsets from the top-left corner of the resampled picture.

The above process uses luma filter selection as one representative example, and the process is equally applicable to chroma filter selection.

The values of phaseX, phaseY, phaseXC, and phaseYC may be reduced precision representations of the sampling grid. For example, rather than $1/16$-pixel precision, they may be equivalent to $1/4$-pixel precision approximations of the phase information. Table 7 lists values of phaseX, phaseY, phaseXC, and phaseYC for a few representative use cases discussed herein. The left column shows representative use cases and representative (e.g., corresponding) values of syntax elements and variables (e.g., cross_layer_phase_alignment_flag, VertPhasePositionAdjustFlag, and/or VertPhasePositionFlag). The right columns show the values of the phase parameters to signal. The last row of Table 7 gives a use case that cannot be represented using the current signaling procedures (e.g., certain current signaling procedures). In this use case, the chroma sample location is not the default chroma sample location shown in FIG. 9. The chroma sample location may need to be a new set of values of phase X, phaseY, phaseXC, and/or phaseYC that cannot be derived using state of the art signaling procedures.

phaseYC, the values of these variables may be directly signaled to allow the full range of possible values to be signaled. Each phase parameter set may include or consist of phaseX, phaseY, phaseXC, and/or phaseYC, and may replace the current flag-based signaling. To allow picture level phase filter adaptation, multiple sets of these phase parameter values may be signaled. Each picture may use an index to indicate which one of the sets of the phase parameter values should be used to perform resampling for decoding of the current picture. Since these values may have lower precision (e.g., $1/4$-pixel rather than $1/16$-pixel), the values may use or require fewer bits for representation; and the values may be suitable (e.g., more suitable) for use to enable picture level adaptive resampling phase selection.

Table 8 shows an example syntax table that may be used to send multiple sets of phaseX, phaseY, phaseXC, and/or phaseYC values. This syntax table may be included as part of the Video Parameter Set (VPS), Sequence Parameter Set (SPS), and/or Picture Parameter Set (PPS).

TABLE 8

Example of syntax table for resample_phase_parameter_sets( )

| | Descriptor |
|---|---|
| resample_phase_parameter_sets( ) { | |
|   resample_phase_parameter_set_present_flag | u(1) |
|   if ( resample_phase_parameter_set_present_flag ) { | |
|     num_resample_phase_parameter_set_minus1 | ue(v) |
|     for ( i = 0; i <= | |
|     num_resample_phase_parameter_set_minus1; i ++ ) { | |
|       resample_phase_x_luma [ i ] | u(3) |
|       resample_phase_y_luma [ i ] | u(3) |
|       resample_phase_x_chroma [ i ] | u(3) |
|       resample_phase_y_chroma [ i ] | u(3) |
|     } | |
|   } | |
| } | | resample_phase_parameter_set_present_flag equal to 1 may be used to indicate that the resampling phase information syntax elements num_resample_phase_parameter_set_minus1, resample_phase_x_luma[i], resample_phase_y_luma[i], resample_phase_x_chroma[i], and resample_phase_y_chroma[i] are present in the bitstream. resample_phase_parameter_set_present_flag equal to 0 indi-

TABLE 7

Values of phaseX, phaseY, phaseXC, and phaseYC in example use cases

| Example use cases | phaseX | phaseY | phaseXC | phaseYC |
|---|---|---|---|---|
| Top-left aligned downsampling filter (cross_layer_phase_alignment_flag =0, VertPhasePositionAdjustFlag = 0) | 0 | 0 | 0 | 1 |
| Center aligned downsampling filter (cross_layer_phase_alignment_flag = 1, VertPhasePositionAdjustFlag = 0) | 2 | 2 | 1 | 2 |
| Interlace to progressive, top field (cross_layer_phase_alignment_flag = 0, VertPhasePositionAdjustFlag = 1, VertPhasePositionFlag = 0) | 0 | 0 | 0 | 0 |
| Interlace to progressive, bottom field (cross_layer_phase_alignment_flag = 0, VertPhasePositionAdjustFlag = 1, VertPhasePositionFlag = 1) | 0 | 4 | 0 | 4 |
| Non-default chroma sample location | 0 | 0 | 0 | 0 |

Instead of using a set of flags (cross_layer_phase_alignment_flag, VertPhasePositionAdjustFlag, and/or VertPhasePositionFlag) to derive a subset (e.g., a limited subset) of the possible values of phaseX, phaseY, phaseXC, and/or cates that the resampling phase information syntax elements num_resample_phase_parameter_set_minus1, resample_phase_x_luma[i], resample_phase_y_luma[i], resample_phase_x_chroma[i], resample_phase_y_chroma[i] may not or are not present in the bitstream and their values may be inferred. When resample_phase_parameter_set_present_flag is not present, it may be infered to be equal to 0.

num_resample_phase_parameter_set_minus1+1 may be used to specify the number of resample phase parameter sets that are being signaled, a set comprising the four syntax elements resample_phase_x_luma[i], resample_phase_y_luma[i], resample_phase_x_chroma[i], and resample_phase_y_chroma[i]. When num_resample_phase_parameter_set_minus1 is not present, it may be inferred to be equal to 0.

resample_phase_x_luma [i] may be used to specify the i-th horizontal resampling phase adjustment value used to select the luma resampling filter in the horizontal direction. When resample_phase_x_luma [i] is not present, it may be inferred to be equal to 0.

resample_phase_y_luma [i] may be used to specify the i-th vertical resampling phase adjustment value used to select the luma resampling filter in the vertical direction. When resample_phase_y_luma [i] is not present, it may be inferred to be equal to 0.

resample_phase_x_chroma [i] may be used to specify the i-th horizontal resampling phase adjustment value used to select the chroma resampling filter in the horizontal direction. When resample_phase_x_chroma [i] is not present, it may be inferred to be equal to 0.

resample_phase_y_chroma [i] may be used to specify the i-th vertical resampling phase adjustment value used to select the chroma resampling filter in the vertical direction. When resample_phase_x_chroma [i] is not present, it may be inferred to be equal to 1.

The variables NumResamplePhaseParamSets, ResamplePhaseXLuma, ResamplePhaseYLuma, ResamplePhaseXChroma, and/or ResamplePhaseYChroma may be derived as follows:

```
NumResamplePhaseParamSets = resample_phase_parameter_set_present_flag ?
num_resample_phase_parameter_set_minus1 + 1 : 1
if (resample_phase_parameter_set_present_flag )
{
  for ( i = 0; i < NumResamplePhaseParamSets; i ++)
  {
    ResamplePhaseXLuma [ i ] = resample_phase_x_luma [ i ]
    ResamplePhaseYLuma [ i ] = resample_phase_y_luma [ i ]
    ResamplePhaseXChroma [ i ] = resample_phase_x_chroma [ i ]
    ResamplePhaseYChroma [ i ] = resample_phase_y_chroma [ i ]
  }
}
else
{
  ResamplePhaseXLuma [ 0 ] = 0
  ResamplePhaseYLuma [ 0 ] = 0
  ResamplePhaseXChroma [ 0 ] = 0
  ResamplePhaseYChroma [ 0 ] = 1
}
```

As noted above, the syntax element resample_phase_parameter_set_present_flag may be used to indicate whether the resampling phase adjustment values are explicitly signaled in the bitstream or not. If resampling phase adjustment values are not explicitly signaled, a default set may be used. In certain use cases (e.g., the most typical use case), for example, progressive to progressive spatial scalability where the downsampling filter used to generate the lower resolution video (e.g. in the downsampling unit in FIG. 4) is aligned at the top-left sample (e.g., for cross_layer_phase_alignment_flag=0), the value of resample_phase_parameter_set_present_flag may be set to 0, and the values of the resampling phase parameters, including ResamplePhaseXLuma[0], ResamplePhaseYLuma[0], ResamplePhaseXChroma[0], and/or ResamplePhaseYChroma[0], may be inferred (e.g., according to the values listed in the top row in Table 7).

In the example of Table 8, the syntax elements resample_phase_x_luma, resample_phase_y_luma, resample_phase_x_chroma, and/or resample_phase_y_chroma may be signaled using 3-bit fixed length coding (although other entropy coding procedures such as ue(v) or Exp-Golomb coding may be used) and their values may be in the range of 0 to 7, inclusive. In practice, the range of these values may be adjusted, for example, to be in another range (e.g., the range of −3 to 4, inclusive). In this case, the pseudo code above may be modified as follows:

```
ResamplePhaseXLuma [ i ] = resample_phase_x_luma [ i ] − 3
ResamplePhaseYLuma [ i ] = resample_phase_y_luma [ i ] − 3
ResamplePhaseXChroma [ i ] = resample_phase_x_chroma [ i ] − 3
ResamplePhaseYChroma [ i ] = resample_phase_y_chroma [ i ] − 3
```

If more than one set of resampling phase parameter set is signaled at the sequence level (for example, in VPS, SPS and/or PPS), such that the value of NumResamplePhaseParamSets is greater than 1, an additional syntax element may be used to indicate which one of these sets may be used to resample one or more reference layer pictures for decoding of the current picture. An example of this slice header syntax element, called resample_phase_parameter_set_idx, is given in Table 9. As shown in the example in Table 9, one index (e.g., only one index) may be or is sent in the slice segment header (e.g., although the current slice may have more than one reference layer picture). For example, the Scalable Main profile and Scalable Main 10 profile (e.g., defined in SHVC draft 5) may both be subject to the constraint that, for decoding of any picture in any layer in a conforming scalable bitstream, at most one reference layer picture (also referred to as an inter layer reference picture) may be resampled before being used to decode the current picture. Even if the current picture uses more than one inter layer reference picture, one (e.g., only one) of these inter layer reference pictures may be resampled, and other (e.g., all other) inter layer reference pictures have (e.g., may or must have) the same picture size and are not resampled (e.g., do not need to be resampled). The purpose of this constraint is to bound the complexity of a conforming decoder. Because of this constraint in the Scalable Main and Scalable Main 10 profiles (e.g., defined in SHVC draft 5), one (e.g., only one) resampling phase parameter set index may be sent per slice (as shown in Table 9). If a profile relaxes this constraint, the resample_phase_parameter_set_idx may be sent more than once per slice, and different reference layer pictures may use different resample phase parameters. Similar to many other syntax elements, when a picture is coded in more than one slice, the value of resample_phase_parameter_set_idx may be the same for all slices in the same picture.

TABLE 9

Example of signaling the index of the phase parameter set in slice segment header

| slice_segment_header( ) { | Descriptor |
|---|---|
|     first_slice_segment_in_pic_flag | u(1) |
|     ... | |
|     if (nuh_layer_id > 0 && | |
|     NumResamplePhaseParamSets > 1 ) | |
|         resample_phase_parameter_set_idx | u(v) |
|     if( sample_adaptive_offset_enabled_flag ) { | |
|         slice_sao_luma_flag | u(1) |
|         slice_sao_chroma_flag | u(1) |
|     } | |
|     ... | |
|     } | |
|     byte_alignment( ) | |
| } | | resample_phase_parameter_set_idx may specify the index of the resampling phase parameter set used to resample the reference layer picture for decoding of the current slice. When resample_phase_parameter_set_idx is not present, it may be inferred to be equal to 0. The value of resample_phase_parameter_set_idx may be in the range of 0 and NumResamplePhaseParamSets−1, inclusive.

During the resampling process, the following modifications may be applied to subclause H.6.2 (e.g., derivation process for reference layer sample location used in resampling) to derive the variables phaseX and phaseY:

$$phaseX=(cIdx==0)?ResamplePhaseXLuma[resample\_phase\_parameter\_set\_idx]: ResamplePhaseXChroma[resample\_phase\_parameter\_set\_idx] \quad (H-5)$$

$$phaseY=(cIdx==0)?ResamplePhaseYLuma[resample\_phase\_parameter\_set\_idx]: ResamplePhaseYChroma[resample\_phase\_parameter\_set\_idx] \quad (H-6)$$

Figure 14B:
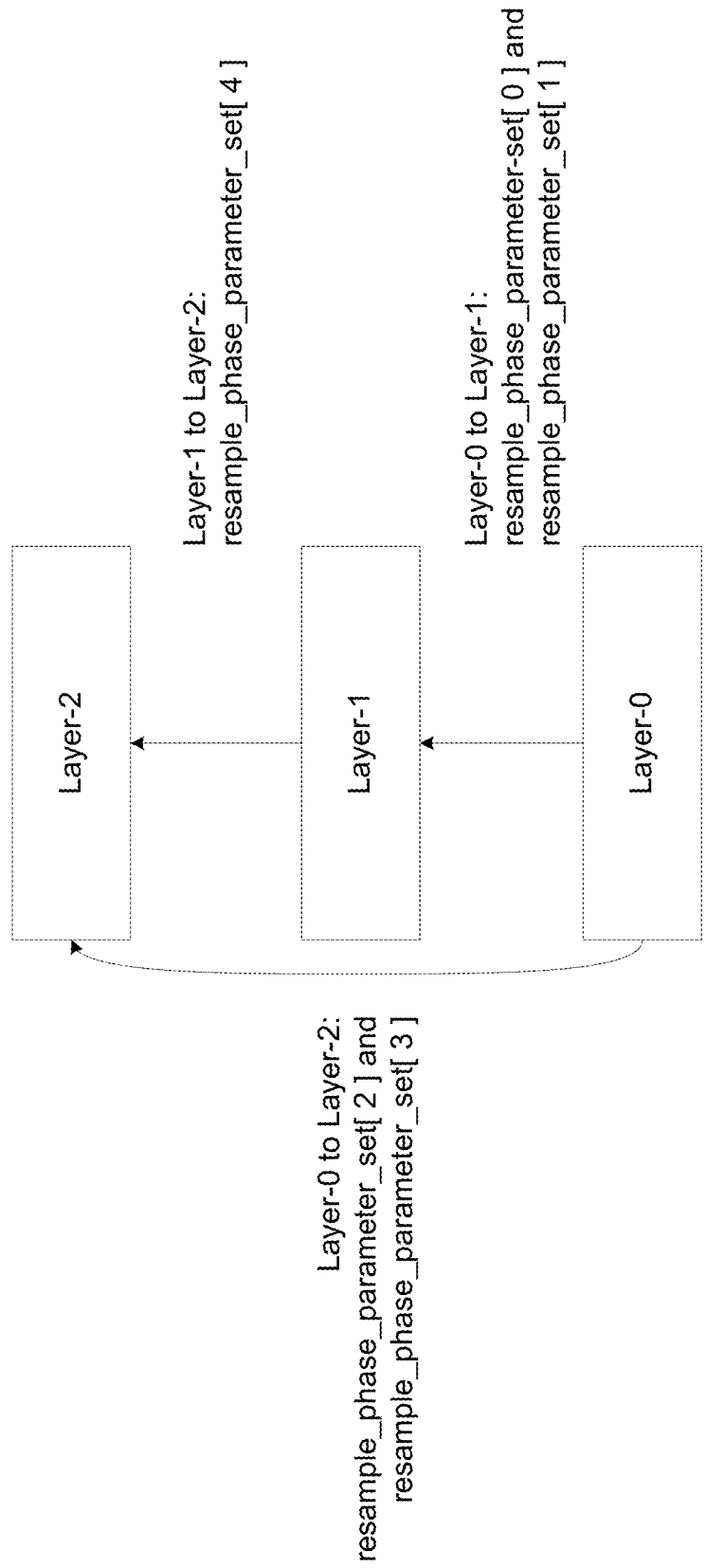
FIG. 14B is a diagram illustrating an example of a 3-layer (e.g., multilayer) scalable bitstream with 5 sets (e.g., plural sets) of resample phase information.

The signaling procedure in Table 8 and/or Table 9 may use and/or may require more bits than necessary in the slice header to signal the resample phase parameter set index. The number of bits used to signal the phase parameter set index may be further reduced by knowing and/or considering the pair of layers involved in the resampling process. FIG. 14B illustrates a 3-layer scalable bitstream, as a representative example, where the 3-layer scalable bitstream may use or may need in total 5 sets of resample phase parameters. In FIG. 14B, resampling of layer-0 pictures for the decoding of layer-1 pictures may use and/or may need 2 sets of resample phase parameters (for example, picture level adaptive resampling phase selection is used or is needed between these two layers). Resampling of layer-0 pictures for the decoding of layer-2 pictures may use or may need 2 sets of resample phase parameters (for example, picture level adaptive resampling phase selection is used and/or needed between these two layers). Resampling of layer-1 pictures for the decoding of layer-2 pictures may use or may need (e.g., may only use or may only need) 1 set of resample phase parameters (for example, no picture level adaptation may be used or may be needed, and layer-1 pictures (e.g., all layer-1 pictures) may use the same set of resampling phases for decoding of layer-2 pictures). Using the above signaling procedure, at sequence level, NumResamplePhaseParameterSets is equal to 5, and each syntax element resample_phase_parameter_set_idx in the slice segment header may use or may require 3 bits (e.g., ceil(log 2(NumResamplePhaseParameterSets)) as fixed length coding may be applied to resample_phase_parameter_set_idx.

At the slice level, before resampling, the two layers that are used to determine the resampling phase (e.g., the current layer and the reference layer) may be known (e.g., already known). This known information may be used to reduce phase parameter set signaling cost in the slice header. For example, out of the total number of resampling phase parameter sets, the phase parameter sets that may be allowed between each pair of two layers where there is direct dependency (e.g., two layers for which sample prediction is allowed) may be specified (e.g., additionally specified) at the sequence level. At the slice level, the resample phase parameter set may be selected from the resampling phase parameter sets that are allowed between the current layer and its reference layer used in resampling, rather than from the overall total of resampling phase parameter sets. In the example of FIG. 14B, if the resampling is applied to a layer-1 picture for decoding of a layer-2 picture, because the 4-th phase parameter set (e.g., only the 4-th phase parameter set) may be used between these two layers, there may be no need to signal the phase parameter set index (e.g., as it can be inferred to be the 4-th parameter set because it is for a layer-1 picture being resampled to predict a layer-2 picture). In another example illustrated by FIG. 14B, if the resampling is applied to a layer-0 picture for decoding of a layer-2 picture, because, in this example, only the $2^{nd}$ or the $3^{rd}$ phase parameter set are possible, 1-bit index signaling (rather than 3-bit index signaling) may be sufficient at the slice level. The current Scalable Main and Scalable Main 10 profiles (e.g., defined in SHVC draft 5) allow one reference layer picture (e.g., only and at most one reference layer picture) to be resampled for the decoding of the current picture.

Although procedures with this one reference layer picture resampling constraint are described herein, it is contemplated that signaling may be extended to support resampling of more than one reference layer picture.

For the current picture, the layer_id of the reference layer picture used in resampling, denoted as ResampleRefLayerId, may be obtained using the following pseudo code:

```
The variable currLayerId is set equal to the value of nuh_layer_id of
the current picture
The variable NumActiveRefLayerPics is set equal to the number of
active reference layers for decoding of the current picture
The array RefPicLayerId stores the values of nuh_layer_id of the active
reference layers for decoding of the current picture
for ( i = 0; i < NumActiveRefLayerPics; i ++)
{
    refLayerId = RefPicLayerId[ i ]
    if (VpsInterLayerSamplePredictionEnabled[ LayerIdxInVps
[ currLayerId ] ] [ LayerIdxInVps[ refLayerId ] ] &&
// sample prediction is enabled
        (picture width or height or luma or chroma sample bit depth
between currLayerId and refLayerId is different ||
        at least one of the cropping parameters between currLayerId and
refLayerId is non-zero ) )
    {
        ResampleRefLayerId = refLayerId
    }
}
```

An example syntax table that establishes the pair-wise phase parameter set signaling is shown in Table 10, and the corresponding phase parameter set index signaling in the slice segment header is shown in Table 11.

TABLE 10

Example of resampling phase parameter signaling for layer pairs

| resample_phase_parameter_set_for_layer_pair( ) { | Descriptor |
|---|---|
|   for ( i = 1; i <= MaxLayersMinus1; i ++ ) { | |
|     for ( j = 0; j < i; j ++ ) { | |
|       if ( VpsInterLayerSamplePredictionEnabled[ i ][ j ] ) { | |
|         num_resample_phase_param_set_layer_pair[ i ] [ j ] | ue(v) |
|         for( k = 0; k < num_resample_phase_param_set_layer_pair[ i ] [ j ] ; k++ ) | |
|           resample_phase_param_set_idx_layer_pair[ i ] [ j ][ k ] | u(v) |
|       } | |
|     } | |
|   } | |
| } | | num_resample_phase_param_set_layer_pair[i][j] may specify the number of resample phase parameter sets between the i-th layer and the j-th layer. When num_resample_phase_param_set_layer_pair[i][j] is not present, it may be inferred to be equal to 0.

resample_phase_param_set_idx_layer_pair[i][j][k] may specify the k-th index of the resampling phase parameter set used to resample between the i-th layer picture and the j-th layer picture. When resample_phase_param_set_idx_layer_pair[i][j][k] is not present, it may be inferred to be equal to 0. The value of resample_phase_param_set_idx_layer_pair[i][j][k] may be in the range of 0 and NumResamplePhaseParamSets−1, inclusive.

TABLE 11

Example of resample phase parameter set index signaling in slice segment header

| slice_segment_header( ) { | Descriptor |
|---|---|
|   first_slice_segment_in_pic_flag | u(1) |
|   ... | |
|   if (nuh_layer_id > 0 && | |
|   num_resample_phase_param_set_layer_pair | |
|   [LayerIdxInVps[nuh_layer_id]] | |
|   [LayerIdxInVps[ResampleRefLayerId]] > 1 ) | |
|     resample_phase_param_set_idx | u(v) |
|   if( sample_adaptive_offset_enabled_flag ) { | |
|     slice_sao_luma_flag | u(1) |
|     slice_sao_chroma_flag | u(1) |
|   } | |
|   ... | |
|   byte_alignment( ) | |
| } | | resample_phase_param_set_idx may specify the index of the resampling phase parameter set used to resample the reference layer picture with layer_id equal to ResampleRefLayerId for decoding of the current slice. When resample_phase_param_set_idx is not present, it may be inferred to be equal to 0. The value of resample_phase_param_set_idx may be in the range of 0 and num_resample_phase_param_set_layer_pair[LayerIdxInVps[nuh_layer_id]][LayerIdxInVps[ResampleRefLayerId]]−1, where nuh_layer_id is the layer_id of the current slice, and ResampleRefLayerId is the layer_id of the reference layer picture to which resampling is applied, inclusive.

Compared to Table 9, the value of resample_phase_parameter_set_idx in Table 11 has a reduced dynamic range, and may use or may require fewer bits to represent. During the resampling process, the following modifications may be applied (e.g., to H.6.2, the derivation process for reference layer sample location used in resampling) to derive the variables phaseX and phaseY:

resamplePhaseParamSetIdx=resample_phase_param_set_idx_layer_pair[LayerIdxInVps[nuh_layer_id]][LayerIdxInVps[ResampleRefLayerId]][resample_phase_param_set_idx]

phase$X$=($c$Idx==0)?ResamplePhase$X$Luma[resamplePhaseParamSetIdx]: ResamplePhase$X$Chroma[resamplePhaseParamSetIdx]  (H-5)

phase$Y$=($c$Idx==0)?ResamplePhase$Y$Luma[resamplePhaseParamSetIdx]: ResamplePhase$Y$Chroma[resamplePhaseParamSetIdx]  (H-6)

Embodiments

In one embodiment, a method is implemented for decoding a video signal comprising: storing one or more sets of phase parameters for use in resampling a video picture; receiving video content including base layer video content and enhancement layer video content; and assembling one or more inter-layer reference (ILR) pictures for use in predicting at least one picture in the enhancement layer based on a picture in the base layer and one or more of the sets of stored phase parameters.

The preceding embodiment may further comprise predicting an enhancement layer picture using the ILR reference picture.

One or more of the preceding embodiments may further comprise wherein each of the stored one or more sets of phase parameters comprises: phaseX information that is used to select horizontal phase filters for a luma component of the one or more ILR reference pictures; phaseXC information that is used to select horizontal phase filters for at least one of the chroma components of the one or more ILR reference pictures; phaseY information that is used to select vertical phase filters for the luma component of the one or more ILR reference pictures; and/or phaseYC information that is used to select vertical phase filters for at least one of the chroma components of the one or more ILR reference pictures.

One or more of the preceding embodiments may further comprise receiving a number indicator indicating a number of sets of phase values that are being transmitted.

One or more of the preceding embodiments may further comprise receiving at least one index indicator indicating at least one set of phase parameters from among the stored one or more sets of phase parameters to be used in assembling the at least one ILR picture.

One or more of the preceding embodiments may further comprise wherein the at least one index indicator is received in a slice segment header.

One or more of the preceding embodiments may further comprise wherein the assembling of the one or more ILR pictures includes selecting the phase filters for resampling of at least one of the luma and/or chroma components based on the at least one set of phase parameters indicated by the received at least one index indicator.

One or more of the preceding embodiments may further comprise wherein the at least one index indicator is associated with a slice of the video content, and the method further comprises adjusting at least one of horizontal phase filters and vertical phase filters for a slice in the base layer of the received video content for use in assembling the ILR picture in accordance with the index indicator associated with the slice.

One or more of the preceding embodiments may further comprise receiving via signaling the one or more sets of phase parameters to be stored.

One or more of the preceding embodiments may further comprise wherein the one or more sets of phase parameters to be stored are received in a Video Parameter Set (VPS).

One or more of the preceding embodiments may further comprise wherein the one or more sets of phase parameters to be stored are received in a Picture Parameter Set (PPS).

One or more of the preceding embodiments may further comprise receiving via signaling a flag indicator indicating whether the at least one index indicator is being signaled.

One or more of the preceding embodiments may further comprise receiving a flag indicator that indicates whether the one or more sets of phase parameters are signaled.

One or more of the preceding embodiments may further comprise wherein a first state of the flag indicator that indicates whether the one or more sets of phase parameters are signaled indicates that the one or more set of phase parameters are not signaled and indicates that the one or more sets of phase parameters are to be inferred.

One or more of the preceding embodiments may further comprise wherein the inferred one or more sets of phase parameters is a set comprising: phaseX information that is used to select horizontal phase filters for a luma component of the one or more ILR reference pictures is 0; phaseXC information that is used to select horizontal phase filters for at least one of the chroma components of the one or more ILR reference pictures is 0; phaseY information that is used to select vertical phase filters for the luma component of the one or more ILR reference pictures is 0; and phaseYC information that is used to select vertical phase filters for at least one of the chroma components of the one or more ILR reference pictures is 1.

One or more of the preceding embodiments may further comprise wherein the base layer pictures are interlace scanned and the enhancement layer pictures are progressive scanned.

One or more of the preceding embodiments may further comprise wherein base layer pictures comprise interlaced fields and the enhancement layer pictures comprise progressive frames.

In another embodiment, a video decoding system may comprise a processor configured to: store one or more sets of phase parameters for use in resampling a video picture; receive video content including base layer video content and enhancement layer video content; and assemble an inter-layer reference (ILR) picture for use in predicting at least one picture in the enhancement layer based on a picture in the base layer and one or more of the sets of stored phase parameters.

The preceding embodiment may further comprise wherein the processor is further configured to predict an enhancement layer picture using the ILR reference picture.

One or more of the preceding embodiments may further comprise wherein each of the stored one or more sets of phase parameters comprises: phaseX information that is used to select horizontal phase filters for a luma component of the ILR reference picture; phaseXC information that is used to select horizontal phase filters for at least one of the chroma components of the ILR reference picture; phaseY information that is used to select vertical phase filters for the luma component of the ILR reference picture; and/or phaseYC information that is used to select vertical phase filters for at least one of the chroma components of the ILR reference picture.

One or more of the preceding embodiments may further comprise wherein the processor is further configured to receive at least one index indicator indicating at least one set of phase parameters from among the stored one or more sets of phase parameters to be used in assembling the ILR picture.

One or more of the preceding embodiments may further comprise wherein the at least one index indicator is received in a slice segment header.

One or more of the preceding embodiments may further comprise wherein the processor is further configured to assemble the one or more ILR pictures by selecting the phase filters for resampling of at least one of the luma and/or chroma components based on the at least one set of phase parameters indicated by the received at least one index indicator.

One or more of the preceding embodiments may further comprise wherein the at least one index indicator is associated with a slice of the video content, and wherein the processor is further configured to adjust at least one of horizontal phase filters and vertical phase filters for a slice in the base layer of the received video content for use in assembling the ILR picture in accordance with the index indicator associated with the slice.

One or more of the preceding embodiments may further comprise wherein the processor is further configured to receive via signaling the one or more sets of phase parameters to be stored.

One or more of the preceding embodiments may further comprise wherein the one or more sets of phase parameters to be stored are received in a Picture Parameter Set (PPS).

One or more of the preceding embodiments may further comprise wherein the processor is further configured to receive via signaling a flag indicator indicating whether the at least one index indicator is being signaled.

One or more of the preceding embodiments may further comprise receiving a flag indicator that indicates whether the one or more sets of phase parameters are signaled or inferred.

One or more of the preceding embodiments may further comprise wherein the inferred one or more sets of phase parameters is a set comprising: phaseX information that is used to select horizontal phase filters for a luma component of the one or more ILR reference pictures is 0; phaseXC information that is used to select horizontal phase filters for at least one of the chroma components of the one or more ILR reference pictures is 0; phaseY information that is used to select vertical phase filters for the luma component of the one or more ILR reference pictures is 0; and phaseYC information that is used to select vertical phase filters for at least one of the chroma components of the one or more ILR reference pictures is 1.

One or more of the preceding embodiments may further comprise wherein the base layer pictures are interlace scanned and the enhancement layer pictures are progressive scanned.

In another embodiment, a video encoding method may be implemented in a video encoder comprising: transmitting video content including base layer video content and enhancement layer video content; and transmitting one or more sets of phase parameters for use in resampling a video picture in the base layer for use by a video decoder in assembling one or more inter-layer reference (ILR) pictures for predicting at least one picture in the enhancement layer based on a picture in the base layer and one or more of the sets of phase parameters.

The preceding embodiment may further comprise wherein each of the one or more sets of phase parameters comprises: phaseX information that is used to select horizontal phase filters for a luma component of the ILR reference picture; phaseXC information that is used to select horizontal phase filters for at least one of chroma components of the ILR reference picture; phaseY information that is used to select vertical phase filters for the luma component of the ILR reference picture; and/or phaseYC information that is used to select vertical phase filters for at least one of the chroma components of the ILR reference picture.

One or more of the preceding embodiments may further comprise transmitting a number indicator indicating a number of sets of phase values that are being transmitted.

One or more of the preceding embodiments may further comprise transmitting at least one index indicator indicating at least one set of phase parameters from among the one or more sets of phase parameters to be used in assembling the ILR picture.

One or more of the preceding embodiments may further comprise wherein the at least one index indicator is transmitted in a slice segment header.

One or more of the preceding embodiments may further comprise wherein the plurality of sets of phase parameters are transmitted in a Picture Parameter Set (PPS).

One or more of the preceding embodiments may further comprise transmitting a flag indicator indicating whether the at least one index indicator is being signaled.

One or more of the preceding embodiments may further comprise wherein the base layer pictures are interlace scanned and the enhancement layer pictures are progressive scanned.

One or more of the preceding embodiments may further comprise transmitting a flag indicator that indicates whether the one or more sets of phase parameters are signaled or inferred.

One or more of the preceding embodiments may further comprise wherein the inferred one or more sets of phase parameters is a set comprising: phaseX information that is used to select horizontal phase filters for a luma component of the one or more ILR reference pictures is 0; phaseXC information that is used to select horizontal phase filters for at least one of the chroma components of the one or more ILR reference pictures is 0; phaseY information that is used to select vertical phase filters for the luma component of the one or more ILR reference pictures is 0; and phaseYC information that is used to select vertical phase filters for at least one of the chroma components of the one or more ILR reference pictures is 1.

In another embodiment, a video coding system may comprise a processor configured to: transmit a plurality of sets of phase parameters for use in resampling a video picture at a video decoder; transmit video content including a base layer and an enhancement layer, each layer comprising a plurality of pictures; and transmit data for use by the video decoder in assembling one or more inter-layer reference (ILR) pictures for predicting at least one picture in the enhancement layer based on a picture in the base layer and one or more of the sets of phase parameters.

The preceding embodiments may further comprise wherein each of the one or more sets of phase parameters comprises: phaseX information that is used to select horizontal phase filters for a luma component of the ILR reference picture; phaseXC information that is used to select horizontal phase filters for at least one of the chroma components of the ILR reference picture; phaseY information that is used to select vertical phase filters for the luma component of the ILR reference picture; and/or phaseYC information that is used to select vertical phase filters for at least one of the chroma components of the ILR reference picture.

One or more of the preceding embodiments may further comprise transmitting a number indicator indicating a number of sets of phase values that are being transmitted.

One or more of the preceding embodiments may further comprise wherein the processor is further configured to transmit at least one index indicator indicating at least one set of phase parameters from among the one or more sets of phase parameters to be used in assembling the ILR picture.

One or more of the preceding embodiments may further comprise wherein the processor is configured to transmit the at least one index indicator in a slice segment header.

One or more of the preceding embodiments may further comprise wherein the processor is configured to transmit the plurality of sets of phase parameters in a Picture Parameter Set (PPS).

One or more of the preceding embodiments may further comprise wherein the processor is further configured to transmit a flag indicator indicating whether the at least one index indicator is being signaled.

One or more of the preceding embodiments may further comprise wherein the base layer pictures are interlace scanned and the enhancement layer pictures are progressive scanned.

One or more of the preceding embodiments may further comprise wherein the processor is further configured to transmit a flag indicator that indicates whether the one or more sets of phase parameters are signaled or inferred.

One or more of the preceding embodiments may further comprise wherein the inferred one or more sets of phase parameters is a set comprising: phaseX information that is used to select horizontal phase filters for a luma component of the one or more ILR reference pictures is 0; phaseXC information that is used to select horizontal phase filters for at least one of the chroma components of the one or more ILR reference pictures is 0; phaseY information that is used to select vertical phase filters for the luma component of the one or more ILR reference pictures is 0; and phaseYC information that is used to select vertical phase filters for at least one of the chroma components of the one or more ILR reference pictures is 1.

In another embodiment, a video decoding method may comprise: receiving, by a decoder, video content including a first, second, third and fourth layers of a plurality of layers; receiving, by the decoder, a plurality of phase parameter sets; receiving, by the decoder, first phase parameter selection information indicating a first set of one or more allowable phase parameter sets of the plurality of phase parameter sets to be used for predicting the first layer from the second layer; receiving, by the decoder, second phase parameter selection information indicating a second set of one or more allowable phase parameter sets of the plurality of phase parameter sets to be used for predicting the third layer from the fourth layer; identifying a reference layer and a current layer wherein the decoder resamples a picture from the reference layer; selecting a set of allowable phase parameter sets from one of the indicated first set or the indicated second set of allowable phase parameter sets based on the identification of the reference layer and the current layer; receiving, by the decoder, an index indicator selecting a phase parameter set from the selected set of allowable phase parameter sets based on the index indicator; selecting at least one of horizontal phase filters and vertical phase filters for resampling of any of luma and/or chroma components based on the selected phase parameter set; and assembling one or more inter-layer reference (ILR) pictures.

The preceding embodiment may further comprise wherein any of the first, second, third and/or fourth layers are the same layer or are different layers.

One or more of the preceding methods may be implemented in a video decoder comprising a memory and/or a processor configured to perform the enumerated actions.

In another embodiment, a video decoding method may comprise: receiving, by a decoder, first and second slices of video content, the first slice of the video content including at least a base layer (BL), an enhancement layer (EL) and first phase information indicating a first group of one or more sets of phase parameters from among plural sets of phase parameters, the second slice of the video content including at least the base layer (BL), the enhancement layer (EL) and second phase information indicating a second group of one or more sets of phase parameters from among the plural sets of phase parameters; for each respective slice of the first and second slices: assembling the BL into an inter-layer reference (ILR) picture based on the respective slice of the video content and the received phase information associated with the respective slice; selecting one or both of the assembled ILR picture or an EL reference picture associated with the respective slice; and predicting an EL picture associated with the respective slice using the received phase information associated with the respective slice and one or more of the selected ILR picture or the selected EL reference picture associated with the respective slice.

The preceding embodiment may further comprise wherein the predicting of the EL picture includes: selecting horizontal phase filters for resampling of luma and chroma components based or phaseX information and phaseXC information indicated by the received phase information; and selecting vertical phase filters for resampling of the luma and chroma components, based on phaseY information and phaseYC information indicated by the received phase information.

One or more of the preceding embodiments may further comprise wherein the predicting of the EL picture includes: selecting (1) a first set of horizontal phase filters for resampling of luma and chroma components based on phaseX information and phaseXC information indicated by the first phase information for the first slice of the video content, and (2) a second, different set of horizontal phase filters for resampling of the luma and chroma components based on phaseX information and phaseXC information indicated by the second phase information for the second slice of the video content; and selecting (1) a first set of vertical phase filters and for resampling of luma and chroma components based on phaseY information and phaseYC information indicated by the first phase information for the first slice of the video content, and (2) a second, different set of vertical phase filters for resampling of the luma and chroma components based on phaseY information and phaseYC information indicated by the second phase information for the second slice of the video content.

One or more of the preceding embodiments may further comprise wherein the phase information includes or indicates the one or more of sets of phase parameters including any of: (1) phaseX information; (2) phaseXC information; (3) phaseY information and/or (4) phaseYC information for each set.

One or more of the preceding embodiments may further comprise wherein the phase information includes any of: (1) allowed phaseX information; (2) allowed phaseXC information; (3) allowed phaseY information and/or (4) allowed phaseYC information.

One or more of the preceding embodiments may further comprise indexing the plural sets of phase parameters such that the phase information includes one or more values each indicating a particular set of the phase parameters of the indexed plural sets of phase parameters.

One or more of the preceding embodiments may further comprise dynamically adjusting at least one of horizontal and vertical phase filters for each slice of the video content in accordance with the phase information associated with the respective slice.

One or more of the preceding methods may be implemented in a video decoder comprising a memory and/or a processor configured to perform the enumerated actions.

In another embodiment, a video decoding method using two or more layers may comprising: receiving, by a decoder, video content and index information indicating one or more sets of phase parameters and layer information indicating at least two layers of the two or more layers that are included in the bitstream; assembling a first one of the at least two layers into an inter-layer reference (ILR) picture based on the video content using the layer information and the index information; and predicting the current picture using the selected ILR picture, a second one of the at least two layers, and one or more sets of phase parameters selected based on the layer information and the index information.

The preceding method may be implemented in a video decoder comprising a memory and/or a processor configured to perform the enumerated actions.

In another embodiment, a video decoding method may comprise: receiving, by a decoder, video content and phase parameter selection information indicating one or more allowable sets of phase parameters to be used for predicting a current picture; selecting one or more phase filters based on the allowed sets of phase parameters; and upsampling the received video content using the selected phase filters to predict the current picture.

The preceding method may further comprise wherein the received information includes paired layer information indicating which ones of the plural sets of phase parameters are allowed for deriving horizontal and vertical phase filters for upsampling.

One or more of the preceding embodiments may further comprise wherein: the allowable sets of phase parameters are a subset of plural sets of phase parameters; the allowable sets of phase parameters are represented by a first index; the plural sets of phase parameters are represented by a second index; and the parameter selection information includes a value for lookup via the first index, the value being a bit segment having a length smaller than a length of a bit segment associated with another value for lookup via the second index.

One or more of the preceding embodiments may further comprise wherein the decoder is configured to access a table, the table having at least two indices, a first index of the table being associated with allowable sets of phase parameters and a second index of the table being associated with layers used for the upsampling, the method further comprising: selecting one or more sets of phase parameters stored in the table in accordance with values derived from the parameter selection information matched to the first and second indices, as the allowed sets of phase parameters; wherein the selecting of the one or more phase filters includes selecting any of: horizontal and/or vertical phase filters for upsampling of the received video content based on the allowed sets of phase parameters; and the upsampling of the received video content includes upsampling the received video content in any of a horizontal direction and/or a vertical direction using the selected horizontal and/or vertical phase filters.

One or more of the preceding embodiments may be embodied in a decoder having a memory and/or a processor configured to perform the enumerated actions.

In another embodiment, a method of decoding a video may comprise: receiving, by a decoder, video content including a current layer, one or more reference layers of the current layer, and one or more sets of phase parameters; and assembling one or more inter-layer reference (ILR) pictures based on the video content from the one or more reference layers and one or more sets of the received phase parameters.

The preceding embodiment may further include predicting a current layer picture using one or more of the ILR pictures.

One or more of the preceding embodiments may further include receiving, by a decoder, an index indicator indicating at least one set of phase parameters from among the one or more sets of phase parameters.

One or more of the preceding embodiments may further include wherein the one or more sets of phase parameters comprise at least one of the following: phaseX information that is used to select horizontal phase filters for the luma component; phaseXC information that is used to select horizontal phase filters for at least one of the chroma components; phaseY information that is used to select vertical phase filters for the luma component; phaseYC information that is used to select vertical phase filters for at least one of the chroma components.

One or more of the preceding embodiments may further comprise wherein the index indicator is signaled in the slice segment header.

One or more of the preceding embodiments may further comprise wherein the assembling of the one or more ILR pictures includes selecting at least one of horizontal phase filters and vertical phase filters for resampling of at least one of the luma and chroma components based on the at least one set of phase parameters indicated by the received index indicator.

One or more of the preceding embodiments may further comprise adjusting at least one of horizontal and vertical phase filters for at least one slice in the received video content in accordance with the index indicator associated with the respective slice.

One or more of the preceding embodiments may further comprise a flag indicator that indicates that the one or more sets of phase parameters are inferred rather than explicitly signaled.

One or more of the preceding embodiments may be embodied in a video decoder having a memory and/or a processor configured to perform the enumerated actions.

In yet another embodiment, a video decoding method may comprise: receiving, by a decoder, video content including a current layer and one or more reference layers of the current layer; receiving, by a decoder, a plurality of phase parameter sets; receiving, by a decoder, phase parameter selection information indicating one or more allowable phase parameter sets of the plurality to be used for predicting the current layer from a first reference layer of the one or more reference layers of the current layer; and assembling one or more inter-layer reference (ILR) pictures based on the first reference layer and the one or more allowable received phase parameter sets.

The preceding embodiment may further comprise receiving, by a decoder, an index indicator indicating at least one phase parameter set from among the one or more allowable phase parameter sets to be used for predicting the current layer from the first reference layer.

One or more of the preceding embodiments may further comprise wherein the index indicator is signaled in the slice segment header of the current layer.

One or more of the preceding embodiments may further comprise wherein the phase parameter selection information indicating one or more allowable sets of phase parameters to be used for predicting a current layer from a reference layer is received only if resampling is necessary between the current layer and the reference layer.

One or more of the preceding embodiments may be embodied in a decoder having a memory and/or a processor configured to perform the enumerated actions.

In yet a further embodiment, a video decoding method may comprise: receiving, by a decoder, video content including a plurality of layers; receiving, by the decoder, a plurality of phase parameter sets; receiving, by the decoder, first phase parameter selection information indicating a first set of one or more allowable phase parameter sets of the plurality to be used for predicting a first layer from a second layer; receiving, by the decoder, second phase parameter selection information indicating a second set of one or more allowable phase parameter sets of the plurality to be used for predicting a third layer from a fourth layer; identifying a reference layer and a current layer wherein the decoder resamples a picture from the reference layer; selecting a set of allowable phase parameter sets from either the first or the second set of allowable phase parameter sets based on the identification of the reference layer and the current layer; receiving, by the decoder, an index indicator; selecting a phase parameter set from the set of allowable phase parameter sets based on the index indicator; selecting at least one of horizontal phase filters and vertical phase filters for resampling of at least one of the luma and chroma components based on the selected phase parameter set; and assembling one or more inter-layer reference (ILR) pictures.

The preceding embodiment may be embodied in a decoder having a memory and/or a processor configured to perform the enumerated actions.

In yet one further embodiment, a video decoding method, which may also be implemented in a video decoder having a memory and a processor configured to perform the enumerated actions, may comprise: receiving, by a decoder, video content including at least a base layer (BL), an enhancement layer (EL) and indicator information, which includes a sequence indicator indicating whether the BL is in an interlaced format and an alignment indicator indicating the alignment between the BL and the EL; assembling the BL into an inter-layer reference (ILR) picture based on the received indicator information; selecting one or both of the processed ILR picture or an EL reference picture; and predicting a current EL picture using one or more of the selected ILR picture or the EL reference picture.

The preceding embodiment may further comprise wherein the assembling of the ILR picture is based on the indicator information conditioned on: (1) a current layer being an EL; (2) the EL using the BL for inter-layer sample prediction; and/or (3) the BL including at least one coded field.

The preceding embodiment may be embodied in a decoder having a memory and/or a processor configured to perform the enumerated actions.

In another embodiment, which may also be implemented in a video coder having a memory and/or a processor configured to perform the enumerated actions, a video coding method may comprise: receiving a video signal; generating, by an encoder from the video signal, at least two layers including a base layer (BL) and an enhancement layer (EL); setting, by the encoder, a sequence indicator indicating whether the BL is generated in an interlaced format and an alignment indicator indicating an alignment between the BL and the EL, as indicator information; and sending, by the encoder, video content including the at least two layers and the set indicator information.

The preceding embodiment may further comprise wherein the setting and sending of the indicator information is conditioned on: (1) a current layer being an EL; (2) the EL using the BL for inter-layer sample prediction; and/or (3) the BL including at least one coded field.

One or more of the preceding embodiments may further comprise wherein the sequence indicator information is included in the Video Parameter Set, and the alignment indicator is included in the slice segment header.

In another embodiment, which may also be implemented in a video decoder having a memory and/or a processor configured to perform the enumerated actions, a video decoding method may comprise: receiving, by a decoder, video content including at least an interlaced base layer (IBL), an enhancement layer (EL) and at least a field parity indicator for the IBL; upsampling the IBL based on the received field parity indicator for the IBL; generating an inter-layer reference (ILR) picture using the upsampled IBL; and predicting a current progressive EL picture using the generated ILR picture.

The preceding embodiment may further comprise wherein the generating of the ILR picture for luma samples and/or chroma samples includes: on condition that the received field parity indicates a first value, upsampling a top field in the BL; and on condition that the received field parity indicates a second value, upsampling a bottom field in the BL.

One or more of the preceding embodiments may further comprise wherein the upsampling of the top field in the BL includes deriving a first set of either even lines or odd lines of the upsampled IBL by copying and deriving a second set of a remainder of the even lines or the odd lines of the upsampled IBL by vertical interpolation.

One or more of the preceding embodiments may further comprise performing the vertical interpolation using a phase-8 filter according to values in Table 5 and Table 6.

One or more of the preceding embodiments may further comprise wherein the upsampling of the bottom field in the BL includes deriving a first set of either even lines or odd lines of the upsampled IBL by copying and deriving a second set of a remainder of the even lines or the odd lines of the upsampled IBL by vertical interpolation.

One or more of the preceding embodiments may further comprise performing the vertical interpolation using a phase-8 filter according to values in Table 5 and Table 6.

One or more of the preceding embodiments may further comprise wherein the receiving of the video signal further includes receiving chroma location information indicating locations of the chroma samples; the method further comprising deriving phase filters for chroma upsampling based on the chroma location information.

In another embodiment, which may also be implemented in a video decoder having a memory and/or a processor configured to perform the enumerated actions, a video decoding method may comprise: receiving, by a decoder, video content including at least an interlaced base layer (IBL) and an enhancement layer (EL), wherein the IBL includes BL frames, each BL frame being defined by a set of a top field and a corresponding bottom field, each BL frame including one portion of the BL frame where Macro Blocks (MBs) are coded as field MBs and a remaining portion of the BL frame where MBs are coded as frame MBs; assembling the interlaced BL into a first inter-layer reference (ILR) picture by: copying pixels of the BL frame associated with the frame MBs to generate a first portion of the first ILR picture, and for pixels of the top field of the BL frame associated with the field MBs, performing 2× upsampling in a vertical direction to generate a remaining portion of the first ILR picture; and predicting a first EL picture using the first ILR picture.

The preceding embodiment may further comprise: further assembling the interlaced BL into a second, consecutive ILR picture in a series of ILR pictures by: copying pixels of the BL frame associated with the frame MBs to generate a first portion of the second ILR picture, and for pixels of the bottom field of the BL frame associated with the field MBs, performing 2× upsampling in the vertical direction to generate a remaining portion of the second ILR picture; and predicting a second, consecutive EL picture using the second ILR picture.

In another embodiment, which may also be implemented in a video decoder having a memory and/or a processor configured to perform the enumerated actions, a video decoding method may comprise: receiving, by a decoder, video content including at least an interlaced base layer (IBL) and an enhancement layer (EL), wherein the IBL includes BL frames, each BL frame defining a set of a top field and a corresponding bottom field, each BL frame including portions coded based on motion; assembling the interlaced BL into a first inter-layer reference (ILR) picture by: copying pixels of the BL frame associated with no motion to generate a first portion of the first ILR picture, and, for pixels of the top field of the BL frame associated with motion, performing 2× upsampling in a vertical direction to generate a remaining portion of the first ILR picture; and predicting a first EL picture using the first ILR picture.

The preceding embodiment may further comprise further assembling the IBL into a second, consecutive ILR picture in a series of ILR pictures by: copying pixels of the BL frame associated with no motion to generate a first portion of the second ILR picture, and, for pixels of the bottom field associated with motion, performing 2× upsampling in the vertical direction to generate a remaining portion of the second ILR picture; and predicting a second EL picture using the second ILR picture.

The preceding embodiment may further comprise obtaining, from the encoder, information regarding pixels of the BL frame associated with motion.

One or more of the preceding embodiments may further comprise determining, based on predetermined criteria, information regarding pixels of the BL frame associated with motion.

One or more of the preceding embodiments may further comprise wherein the determining of information regarding the pixels of the BL frame associated with motion includes determining an amount of movement between the top field and the corresponding bottom field of a BL frame within a plurality of regions using a comparison of any of: Sum of Absolute Difference (SAD) and/or Sum of Square Error (SSE) between the top field and the bottom field of the BL frame to a threshold.

In another embodiment, which may also be implemented in a video decoder having a memory and/or a processor configured to perform the enumerated actions, a video decoding method may comprise: receiving, by a decoder, video content including at least an interlaced base layer (IBL) and an enhancement layer (EL), wherein the IBL includes one or more consecutive top fields and one or more consecutive bottom fields; assembling the IBL into an inter-layer reference (ILR) picture by combining the one or more top fields and one or more bottom fields to generate the ILR picture; and predicting a current progressive EL picture using the generated ILR picture and the enhancement layer.

The preceding embodiment may further comprise wherein the combining of the one or more top fields and one or more bottom fields to generate the ILR picture includes any of: (1) copying content from a first field to one of even lines or odd lines of the ILR picture, and content from a second field to a remaining one of the even lines or the odd lines of the ILR picture; (2) content from the first field is averaged or is weighted and averaged with content from the second field to produce lines of the ILR picture; (3) content from the first field is combined with content from the second field using motion compensation; (4) content from the first field, the second and at least one further field is weighted and combined to produce lines of the ILR picture; or (5) using motion compensation of the second and third fields relative to the first field to produce lines of the ILR picture, wherein motion compensated data for each area of the ILR picture is selected from the second or third fields depending on which one or ones provide a better alignment with the data in the first field.

Representative Network and Hardware Infrastructure

Representative systems and methods described herein may be well-suited for video communications involving all types of communication including wired and wireless networks. An overview of various types of wireless devices and infrastructure is provided with respect to FIGS. 15A-15E, where various elements of the network may utilize the systems and methods described herein. For brevity, wireless networks are described, but, as one of skill in the art understands, various embodiments apply equally as well to wired networks, mixed networks (e.g., wired and wireless), and/or ad hoc networks, among others. More specifically, base stations such as base transceiver station (BTS), a Node-B, an eNode B, a Home Node B, a Home eNode B, a site controller, an access point (AP), a wireless router, a media aware network element (MANE), including a wireless transmit/receive units (WTRUs) may utilize the methods described herein to convey coded video data from one entity to another.

Figure 15A:
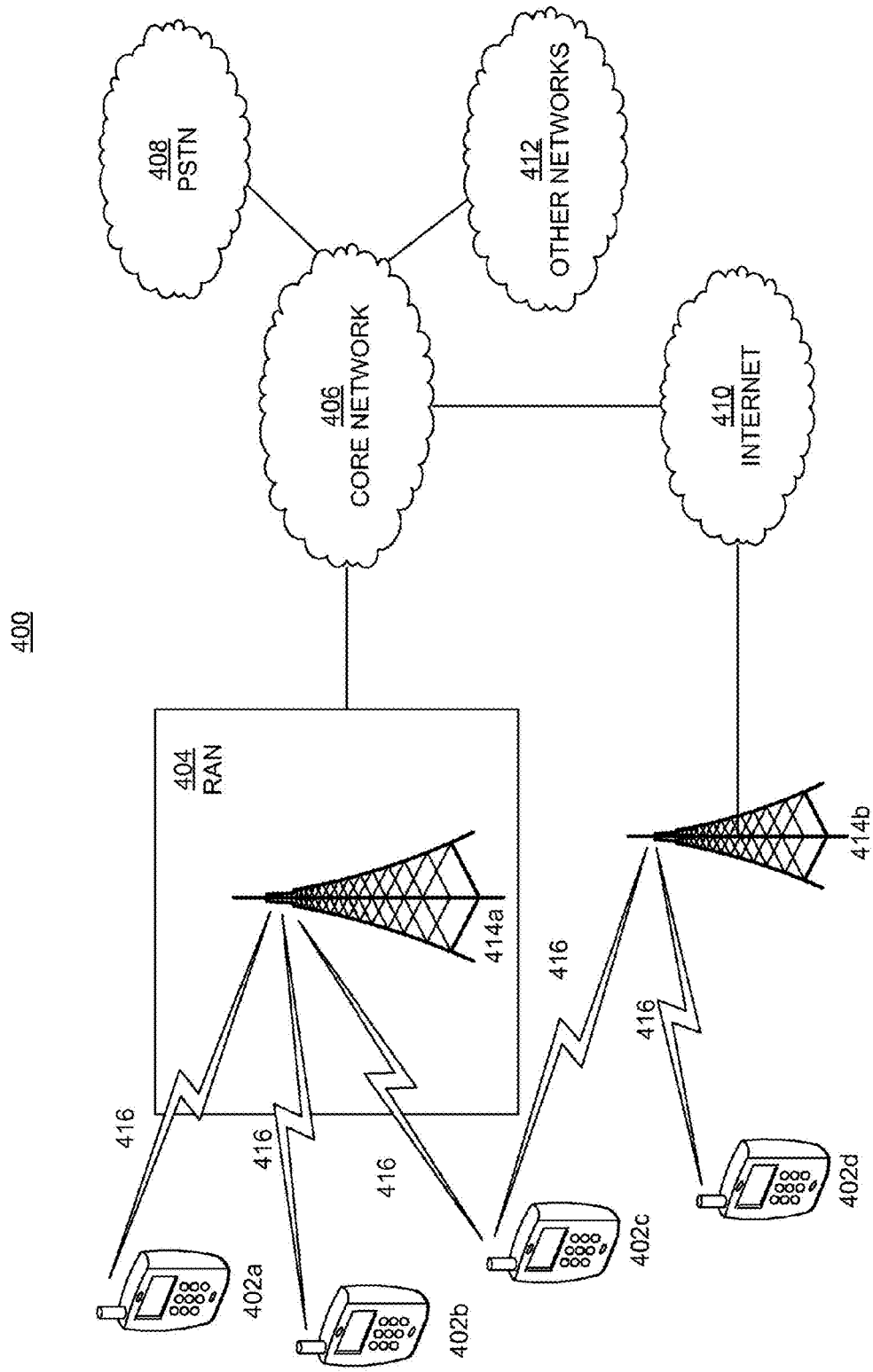
FIG. 15A is a diagram of an example communications system in which one or more disclosed embodiments may be implemented.

FIG. 15A is a diagram of an example communications system 400 in which one or more disclosed embodiments may be implemented. The communications system 400 may be a multiple access system that provides content, such as voice, data, video, messaging, broadcast, etc., to multiple wireless users. The communications system 400 may enable multiple wireless users to access such content through the sharing of system resources, including wireless bandwidth. For example, the communications systems 900 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 15A, the communications system 400 may include wireless transmit/receive units (WTRUs) 402a, 402b, 402c, 402d, a radio access network (RAN) 404, a core network 406, a public switched telephone network (PSTN) 408, the Internet 410, and other networks 412, though it will be appreciated that the disclosed embodiments contemplate any number of WTRUs, base stations, networks, and/or network elements. Each of the WTRUs 402a, 402b, 402c, 402d may be any type of device configured to operate and/or communicate in a wireless environment. By way of example, the WTRUs 402a, 402b, 402c, 402d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, or any other terminal capable of receiving and processing compressed video communications.

The communications systems 400 may also include a base station 414a and a base station 414b. Each of the base stations 414a, 414b may be any type of device configured to wirelessly interface with at least one of the WTRUs 402a, 402b, 402c, 402d to facilitate access to one or more communication networks, such as the core network 406, the Internet 410, and/or the networks 412. By way of example, the base stations 414a, 414b may be a base transceiver station (BTS), a Node-B, an eNode B, a Home Node B, a Home eNode B, a site controller, an access point (AP), a wireless router, and the like. While the base stations 414a, 414b are each depicted as a single element, it will be appreciated that the base stations 414a, 414b may include any number of interconnected base stations and/or network elements.

The base station 414a may be part of the RAN 404, which may also include other base stations and/or network elements (not shown), such as a base station controller (BSC), a radio network controller (RNC), relay nodes, etc. The base station 414a and/or the base station 414b may be configured to transmit and/or receive wireless signals within a particular geographic region, which may be referred to as a cell (not shown). The cell may further be divided into cell sectors. For example, the cell associated with the base station 414a may be divided into three sectors. Thus, in one embodiment, the base station 414a may include three transceivers, i.e., one for each sector of the cell. In another embodiment, the base station 414a may employ multiple-input multiple output (MIMO) technology and, therefore, may utilize multiple transceivers for each sector of the cell.

The base stations 414a, 414b may communicate with one or more of the WTRUs 402a, 402b, 402c, 402d over an air interface 416, which may be any suitable wireless communication link (e.g., radio frequency (RF), microwave, infrared (IR), ultraviolet (UV), visible light, etc.). The air interface 416 may be established using any suitable radio access technology (RAT).

More specifically, as noted above, the communications system 400 may be a multiple access system and may employ one or more channel access schemes, such as CDMA, TDMA, FDMA, OFDMA, SC-FDMA, and the like. For example, the base station 414a in the RAN 404 and the WTRUs 402a, 402b, 402c may implement a radio technology such as Universal Mobile Telecommunications System (UMTS) Terrestrial Radio Access (UTRA), which may establish the air interface 416 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 414a and the WTRUs 402a, 402b, 402c may implement a radio technology such as Evolved UMTS Terrestrial Radio Access (E-UTRA), which may establish the air interface 416 using Long Term Evolution (LTE) and/or LTE-Advanced (LTE-A).

In other embodiments, the base station 414a and the WTRUs 402a, 402b, 402c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 45 (IS-95), Interim Standard 856 (IS-856), Global System for Mobile communications (GSM), Enhanced Data rates for GSM Evolution (EDGE), GSM EDGE (GERAN), and the like.

The base station 414b in FIG. 15A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 414b and the WTRUs 402c, 402d may implement a radio technology such as IEEE 802.11 to establish a wireless local area network (WLAN). In another embodiment, the base station 414b and the WTRUs 402c, 402d may implement a radio technology such as IEEE 802.15 to establish a wireless personal area network (WPAN). In yet another embodiment, the base station 414b and the WTRUs 402c, 402d may utilize a cellular-based RAT (e.g., WCDMA, CDMA2000, GSM, LTE, LTE-A, etc.) to establish a picocell or femtocell. As shown in FIG. 15A, the base station 414b may have a direct connection to the Internet 410. Thus, the base station 414b may not be required to access the Internet 410 via the core network 406.

The RAN 404 may be in communication with the core network 406, which may be any type of network configured to provide voice, data, applications, and/or voice over internet protocol (VoIP) services to one or more of the WTRUs 402a, 402b, 402c, 402d. For example, the core network 406 may provide call control, billing services, mobile location-based services, pre-paid calling, Internet connectivity, video distribution, etc., and/or perform high-level security functions, such as user authentication. Although not shown in FIG. 15A, it will be appreciated that the RAN 404 and/or the core network 406 may be in direct or indirect communication with other RANs that employ the same RAT as the RAN 404 or a different RAT. For example, in addition to being connected to the RAN 404, which may be utilizing an E-UTRA radio technology, the core network 406 may also be in communication with another RAN (not shown) employing a GSM radio technology.

The core network 406 may also serve as a gateway for the WTRUs 402a, 402b, 402c, 402d to access the PSTN 408, the Internet 410, and/or other networks 412. The PSTN 408 may include circuit-switched telephone networks that provide plain old telephone service (POTS). The Internet 410 may include a global system of interconnected computer networks and devices that use common communication protocols, such as the transmission control protocol (TCP), user datagram protocol (UDP) and the internet protocol (IP) in the TCP/IP internet protocol suite. The networks 412 may include wired or wireless communications networks owned and/or operated by other service providers. For example, the networks 412 may include another core network connected to one or more RANs, which may employ the same RAT as the RAN 404 or a different RAT.

Some or all of the WTRUs 402a, 402b, 402c, 402d in the communications system 400 may include multi-mode capabilities, i.e., the WTRUs 402a, 402b, 402c, 402d may include multiple transceivers for communicating with different wireless networks over different wireless links. For example, the WTRU 402c shown in FIG. 15A may be configured to communicate with the base station 414a, which may employ a cellular-based radio technology, and with the base station 414b, which may employ an IEEE 802 radio technology.

Figure 15B:
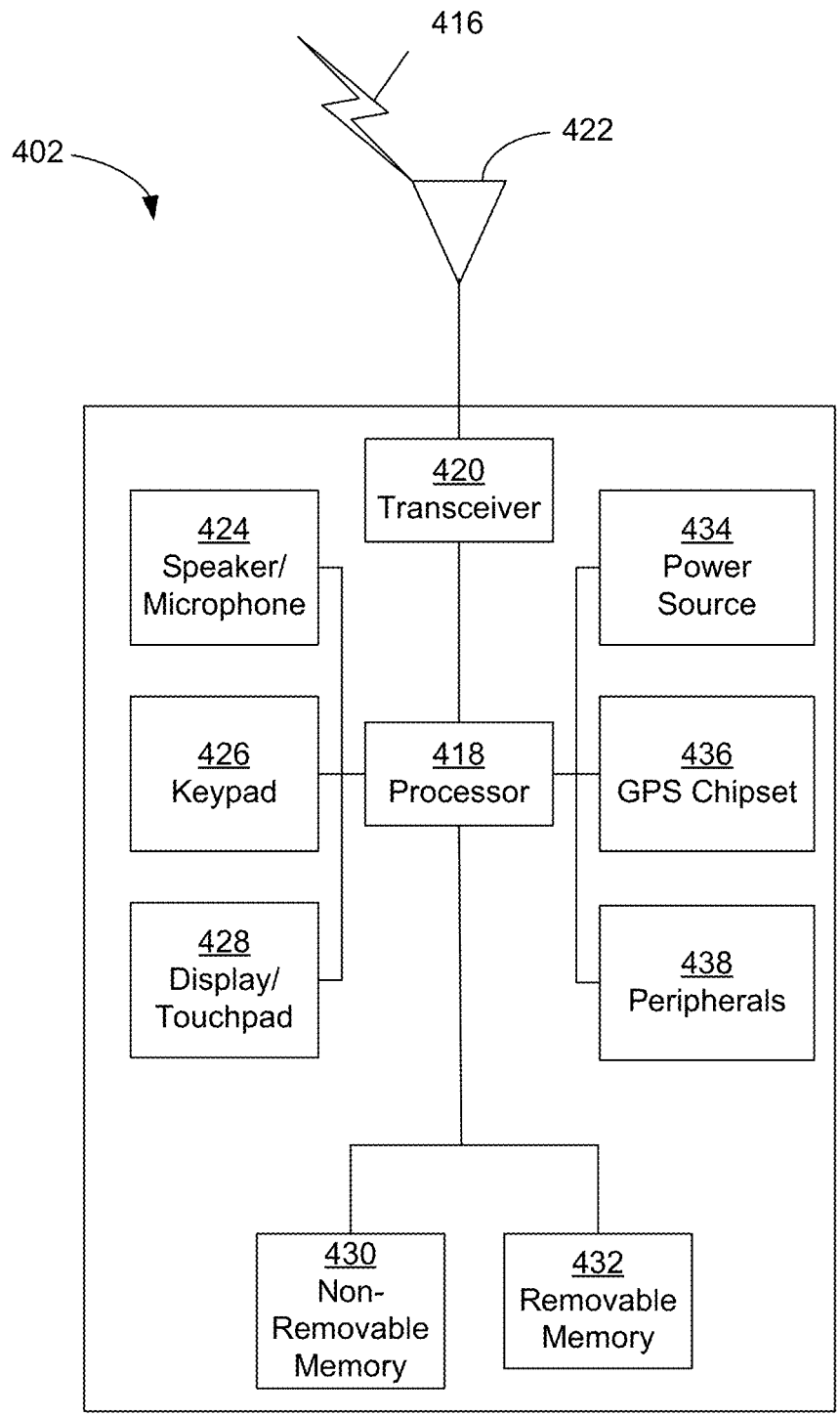
FIG. 15B is a diagram of an example wireless transmit/receive unit (WTRU) that may be used within the communications system illustrated in FIG. 15A.

FIG. 15B is a system diagram of an example WTRU 402. As shown in FIG. 15B, the WTRU 402 may include a processor 418, a transceiver 420, a transmit/receive element 422, a speaker/microphone 424, a keypad 426, a display/touchpad 428, non-removable memory 430, removable memory 432, a power source 434, a global positioning system (GPS) chipset 436, and other peripherals 438. It will be appreciated that the WTRU 402 may include any sub-combination of the foregoing elements while remaining consistent with an embodiment.

The processor 418 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 418 may perform signal coding, data processing, power control, input/output processing, and/or any other functionality that enables the WTRU 402 to operate in a wireless environment. The processor 418 may be coupled to the transceiver 420, which may be coupled to the transmit/receive element 422. While FIG. 15B depicts the processor 418 and the transceiver 420 as separate components, it will be appreciated that the processor 418 and the transceiver 420 may be integrated together in an electronic package or chip.

The transmit/receive element 422 may be configured to transmit signals to, or receive signals from, a base station (e.g., the base station 414a) over the air interface 416. For example, in one embodiment, the transmit/receive element 422 may be an antenna configured to transmit and/or receive RF signals. In another embodiment, the transmit/receive element 422 may be an emitter/detector configured to transmit and/or receive IR, UV, or visible light signals, for example. In yet another embodiment, the transmit/receive element 422 may be configured to transmit and receive both RF and light signals. It will be appreciated that the transmit/receive element 422 may be configured to transmit and/or receive any combination of wireless signals.

In addition, although the transmit/receive element 422 is depicted in FIG. 15B as a single element, the WTRU 402 may include any number of transmit/receive elements 422. More specifically, the WTRU 402 may employ MIMO technology. Thus, in one embodiment, the WTRU 402 may include two or more transmit/receive elements 422 (e.g., multiple antennas) for transmitting and receiving wireless signals over the air interface 416.

The transceiver 420 may be configured to modulate the signals that are to be transmitted by the transmit/receive element 422 and to demodulate the signals that are received by the transmit/receive element 422. As noted above, the WTRU 402 may have multi-mode capabilities. Thus, the transceiver 420 may include multiple transceivers for enabling the WTRU 402 to communicate via multiple RATs, such as UTRA and IEEE 802.11, for example.

The processor 418 of the WTRU 402 may be coupled to, and may receive user input data from, the speaker/microphone 424, the keypad 426, and/or the display/touchpad 428 (e.g., a liquid crystal display (LCD) display unit or organic light-emitting diode (OLED) display unit). The processor 418 may also output user data to the speaker/microphone 424, the keypad 426, and/or the display/touchpad 428. In addition, the processor 418 may access information from, and store data in, any type of suitable memory, such as the non-removable memory 430 and/or the removable memory 432. The non-removable memory 430 may include random-access memory (RAM), read-only memory (ROM), a hard disk, or any other type of memory storage device. The removable memory 432 may include a subscriber identity module (SIM) card, a memory stick, a secure digital (SD) memory card, and the like. In other embodiments, the processor 418 may access information from, and store data in, memory that is not physically located on the WTRU 402, such as on a server or a home computer (not shown).

The processor 418 may receive power from the power source 434, and may be configured to distribute and/or control the power to the other components in the WTRU 402. The power source 434 may be any suitable device for powering the WTRU 402. For example, the power source 434 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 418 may also be coupled to the GPS chipset 436, which may be configured to provide location information (e.g., longitude and latitude) regarding the current location of the WTRU 402. In addition to, or in lieu of, the information from the GPS chipset 436, the WTRU 402 may receive location information over the air interface 416 from a base station (e.g., base stations 414a, 414b) and/or determine its location based on the timing of the signals being received from two or more nearby base stations. It will be appreciated that the WTRU 402 may acquire location information by way of any suitable location-determination method while remaining consistent with an embodiment.

The processor 418 may further be coupled to other peripherals 438, which may include one or more software and/or hardware modules that provide additional features, functionality, and/or wired or wireless connectivity. For example, the peripherals 438 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 15C:
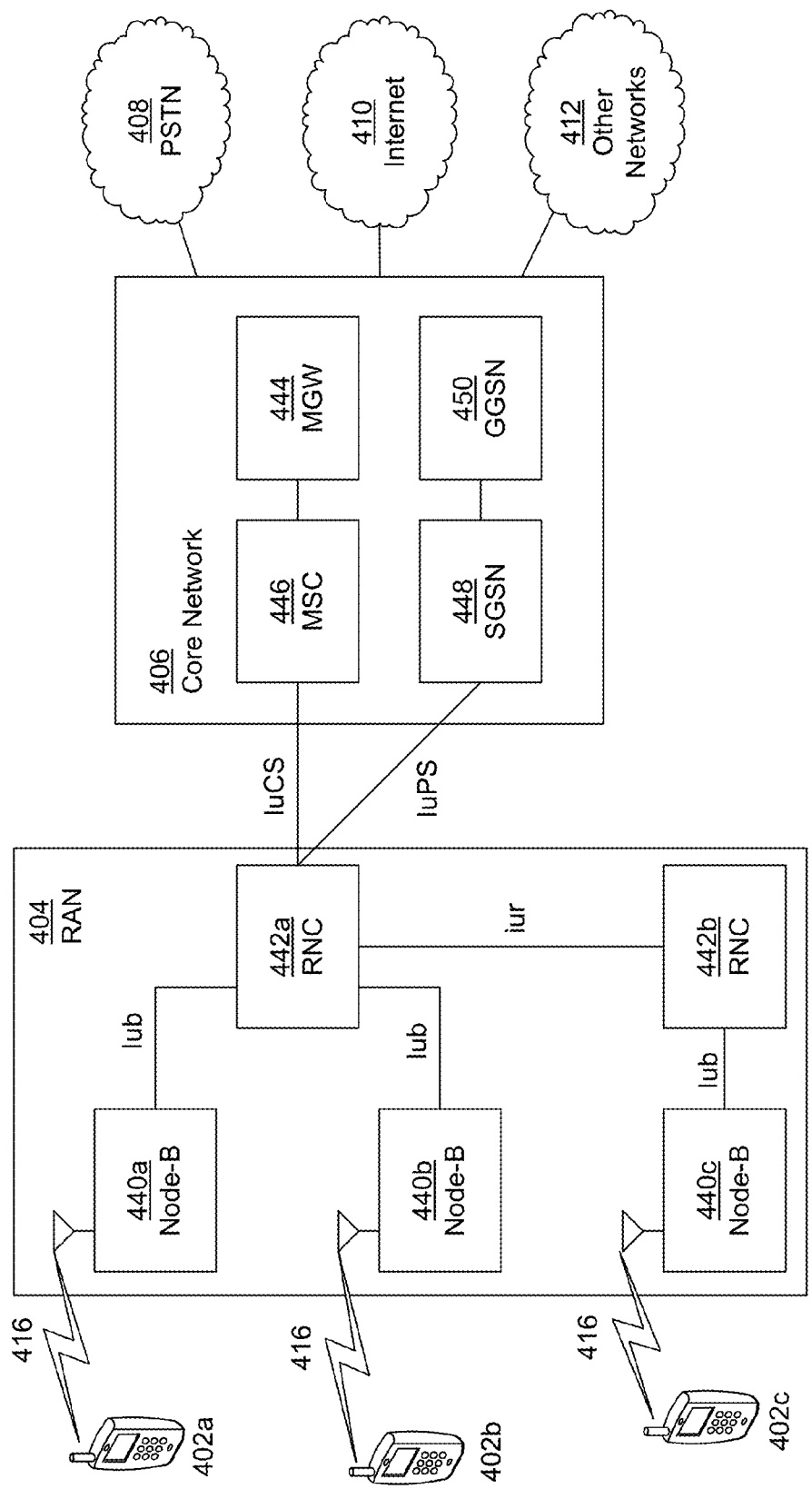
FIGS. 15C, 15D, and 15E are diagrams of example radio access networks and example core networks that may be used within the communications system illustrated in FIG. 15A.

FIG. 15C is a system diagram of the RAN 404 and the core network 406 according to an embodiment. As noted above, the RAN 404 may employ a UTRA radio technology to communicate with the WTRUs 402a, 402b, 402c over the air interface 416. The RAN 404 may also be in communication with the core network 406. As shown in FIG. 15C, the RAN 404 may include Node-Bs 440a, 440b, 440c, which may each include one or more transceivers for communicating with the WTRUs 402a, 402b, 402c over the air interface 416. The Node-Bs 440a, 440b, 440c may each be associated with a particular cell (not shown) within the RAN 404. The RAN 404 may also include RNCs 442a, 442b. It will be appreciated that the RAN 404 may include any number of Node-Bs and RNCs while remaining consistent with an embodiment.

As shown in FIG. 15C, the Node-Bs 440a, 440b may be in communication with the RNC 442a. Additionally, the Node-B 440c may be in communication with the RNC 442b. The Node-Bs 440a, 440b, 440c may communicate with the respective RNCs 442a, 442b via an Iub interface. The RNCs 442a, 442b may be in communication with one another via an Iur interface. Each of the RNCs 442a, 442b may be configured to control the respective Node-Bs 440a, 440b, 440c to which it is connected. In addition, each of the RNCs 442a, 442b may be configured to carry out or support other functionality, such as outer loop power control, load control, admission control, packet scheduling, handover control, macrodiversity, security functions, data encryption, and the like.

The core network 406 shown in FIG. 15C may include a media gateway (MGW) 444, a mobile switching center (MSC) 446, a serving GPRS support node (SGSN) 448, and/or a gateway GPRS support node (GGSN) 450. While each of the foregoing elements are depicted as part of the core network 406, it will be appreciated that any one of these elements may be owned and/or operated by an entity other than the core network operator.

The RNC 442a in the RAN 404 may be connected to the MSC 446 in the core network 406 via an IuCS interface. The MSC 446 may be connected to the MGW 444. The MSC 446 and the MGW 444 may provide the WTRUs 402a, 402b, 402c with access to circuit-switched networks, such as the PSTN 408, to facilitate communications between the WTRUs 402a, 402b, 402c and traditional land-line communications devices.

The RNC 442a in the RAN 404 may also be connected to the SGSN 448 in the core network 406 via an IuPS interface. The SGSN 448 may be connected to the GGSN 450. The SGSN 448 and the GGSN 450 may provide the WTRUs 402a, 402b, 402c with access to packet-switched networks, such as the Internet 410, to facilitate communications between and the WTRUs 402a, 402b, 402c and IP-enabled devices.

As noted above, the core network 406 may also be connected to the networks 412, which may include other wired or wireless networks that are owned and/or operated by other service providers.

Figure 15D:
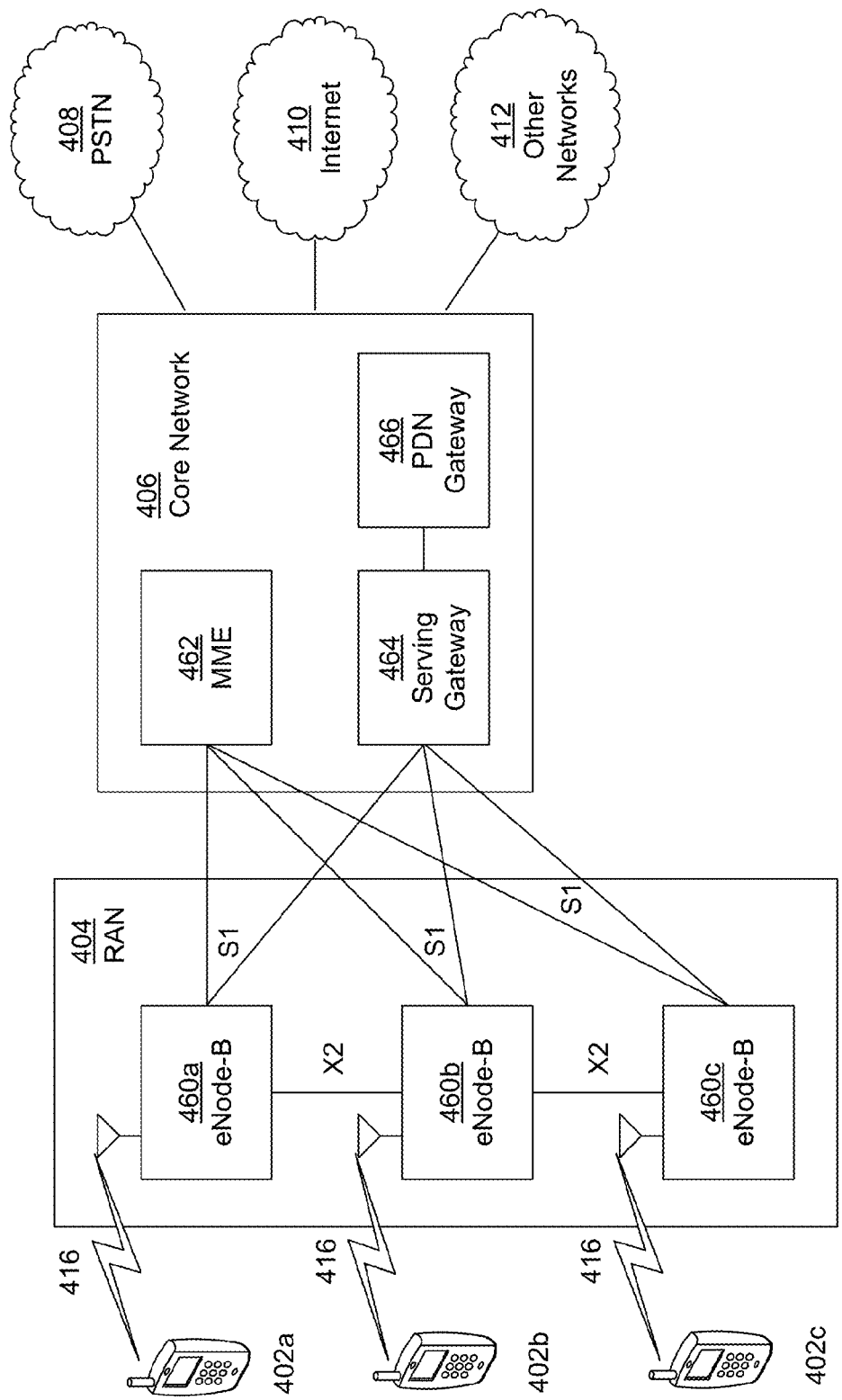

FIG. 15D is a system diagram of the RAN 404 and the core network 406 according to another embodiment. As noted above, the RAN 404 may employ an E-UTRA radio technology to communicate with the WTRUs 402a, 402b, 402c over the air interface 416. The RAN 404 may also be in communication with the core network 406.

The RAN 404 may include eNode-Bs 460a, 460b, 460c, though it will be appreciated that the RAN 404 may include any number of eNode-Bs while remaining consistent with an embodiment. The eNode-Bs 460a, 460b, 460c may each include one or more transceivers for communicating with the WTRUs 402a, 402b, 402c over the air interface 416. In one embodiment, the eNode-Bs 460a, 460b, 460c may implement MIMO technology. Thus, the eNode-B 460a, for example, may use multiple antennas to transmit wireless signals to, and receive wireless signals from, the WTRU 402a.

Each of the eNode-Bs 460a, 460b, 460c may be associated with a particular cell (not shown) and may be configured to handle radio resource management decisions, handover decisions, scheduling of users in the uplink and/or downlink, and the like. As shown in FIG. 15D, the eNode-Bs 460a, 460b, 460c may communicate with one another over an X2 interface.

The core network 406 shown in FIG. 15D may include a mobility management gateway (MME) 462, a serving gateway 464, and a packet data network (PDN) gateway 466. While each of the foregoing elements are depicted as part of the core network 406, it will be appreciated that any one of these elements may be owned and/or operated by an entity other than the core network operator.

The MME 462 may be connected to each of the eNode-Bs 460a, 460b, 460c in the RAN 404 via an S1 interface and may serve as a control node. For example, the MME 462 may be responsible for authenticating users of the WTRUs 402a, 402b, 402c, bearer activation/deactivation, selecting a particular serving gateway during an initial attach of the WTRUs 402a, 402b, 402c, and the like. The MME 462 may also provide a control plane function for switching between the RAN 404 and other RANs (not shown) that employ other radio technologies, such as GSM or WCDMA.

The serving gateway 464 may be connected to each of the eNode Bs 460a, 460b, 460c in the RAN 404 via the S1 interface. The serving gateway 464 may generally route and forward user data packets to/from the WTRUs 402a, 402b, 402c. The serving gateway 464 may also perform other functions, such as anchoring user planes during inter-eNode B handovers, triggering paging when downlink data is available for the WTRUs 402a, 402b, 402c, managing and storing contexts of the WTRUs 402a, 402b, 402c, and the like.

The serving gateway 464 may also be connected to the PDN gateway 466, which may provide the WTRUs 402a, 402b, 402c with access to packet-switched networks, such as the Internet 410, to facilitate communications between the WTRUs 402a, 402b, 402c and IP-enabled devices.

The core network 406 may facilitate communications with other networks. For example, the core network 406 may provide the WTRUs 402a, 402b, 402c with access to circuit-switched networks, such as the PSTN 408, to facilitate communications between the WTRUs 402a, 402b, 402c and traditional land-line communications devices. For example, the core network 406 may include, or may communicate with, an IP gateway (e.g., an IP multimedia subsystem (IMS) server) that serves as an interface between the core network 406 and the PSTN 408. In addition, the core network 406 may provide the WTRUs 402a, 402b, 402c with access to the networks 412, which may include other wired or wireless networks that are owned and/or operated by other service providers.

Figure 15E:
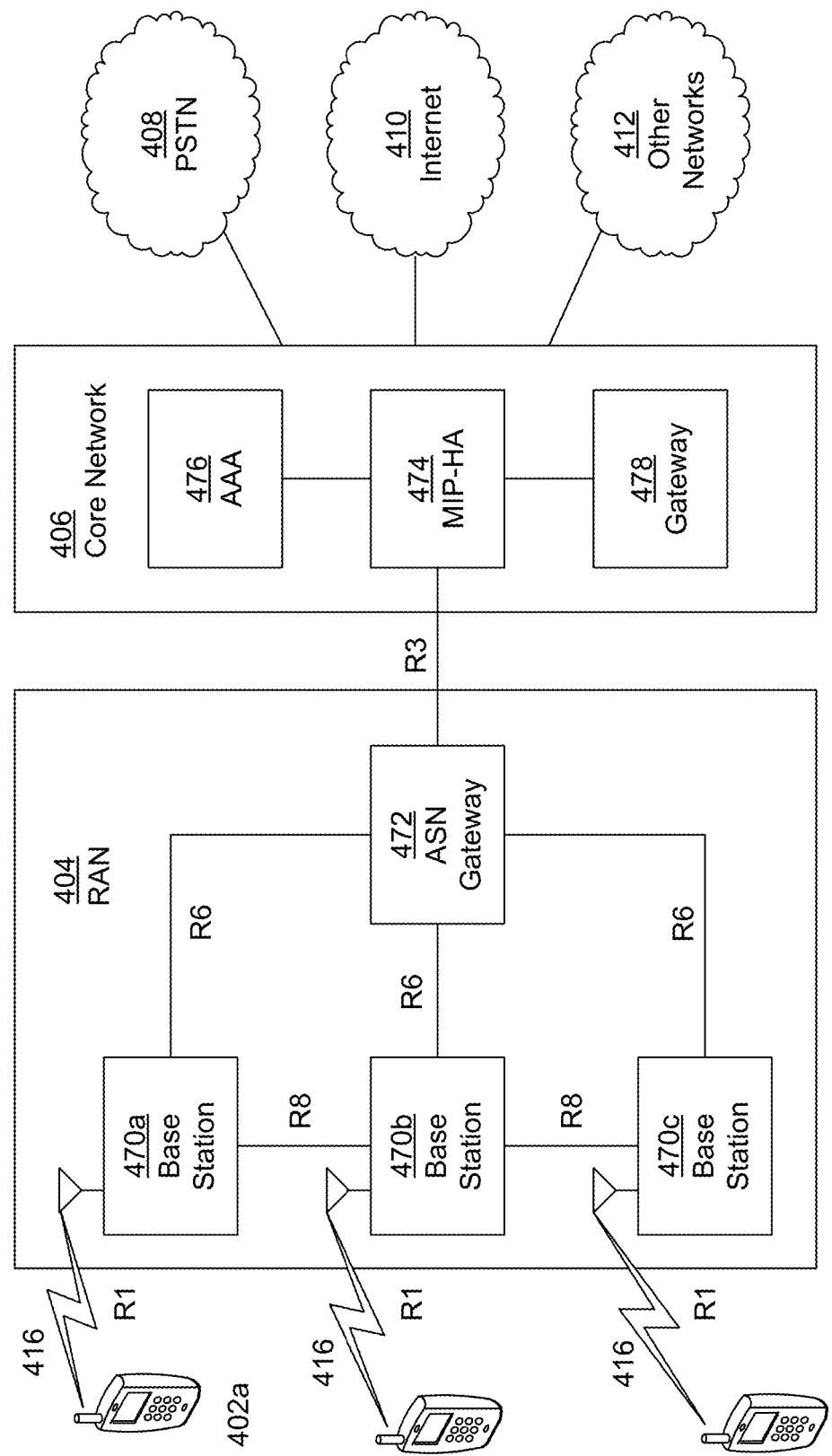

FIG. 15E is a system diagram of the RAN 404 and the core network 406 according to another embodiment. The RAN 404 may be an access service network (ASN) that employs IEEE 802.16 radio technology to communicate with the WTRUs 402a, 402b, 402c over the air interface 416. As will be further discussed below, the communication links between the different functional entities of the WTRUs 402a, 402b, 402c, the RAN 404, and the core network 406 may be defined as reference points.

As shown in FIG. 15E, the RAN 404 may include base stations 470a, 470b, 470c, and an ASN gateway 472, though it will be appreciated that the RAN 404 may include any number of base stations and ASN gateways while remaining consistent with an embodiment. The base stations 470a, 470b, 470c may each be associated with a particular cell (not shown) in the RAN 404 and may each include one or more transceivers for communicating with the WTRUs 402a, 402b, 402c over the air interface 416. In one embodiment, the base stations 470a, 470b, 470c may implement MIMO technology. Thus, the base station 470a, for example, may use multiple antennas to transmit wireless signals to, and receive wireless signals from, the WTRU 402a. The base stations 470a, 470b, 470c may also provide mobility management functions, such as handoff triggering, tunnel establishment, radio resource management, traffic classification, quality of service (QoS) policy enforcement, and the like. The ASN gateway 472 may serve as a traffic aggregation point and may be responsible for paging, caching of subscriber profiles, routing to the core network 406, and the like.

The air interface 416 between the WTRUs 402a, 402b, 402c and the RAN 404 may be defined as an R1 reference point that implements the IEEE 802.16 specification. In addition, each of the WTRUs 402a, 402b, 402c may establish a logical interface (not shown) with the core network 406. The logical interface between the WTRUs 402a, 402b, 402c and the core network 406 may be defined as an R2 reference point, which may be used for authentication, authorization, IP host configuration management, and/or mobility management.

The communication link between each of the base stations 470a, 470b, 470c may be defined as an R8 reference point that includes protocols for facilitating WTRU handovers and the transfer of data between base stations. The communication link between the base stations 470a, 470b, 470c and the ASN gateway 472 may be defined as an R6 reference point. The R6 reference point may include protocols for facilitating mobility management based on mobility events associated with each of the WTRUs 402a, 402b, 402c.

As shown in FIG. 15E, the RAN 404 may be connected to the core network 406. The communication link between the RAN 104 and the core network 406 may defined as an R3 reference point that includes protocols for facilitating data transfer and mobility management capabilities, for example. The core network 406 may include a mobile IP home agent (MIP-HA) 474, an authentication, authorization, accounting (AAA) server 476, and a gateway 478. While each of the foregoing elements are depicted as part of the core network 406, it will be appreciated that any one of these elements may be owned and/or operated by an entity other than the core network operator.

The MIP-HA 474 may be responsible for IP address management, and may enable the WTRUs 402a, 402b, 402c to roam between different ASNs and/or different core networks. The MIP-HA 474 may provide the WTRUs 402a, 402b, 402c with access to packet-switched networks, such as the Internet 410, to facilitate communications between the WTRUs 402a, 402b, 402c and IP-enabled devices. The AAA server 476 may be responsible for user authentication and for supporting user services. The gateway 478 may facilitate interworking with other networks. For example, the gateway 478 may provide the WTRUs 402a, 402b, 402c with access to circuit-switched networks, such as the PSTN 408, to facilitate communications between the WTRUs 402a, 402b, 402c and traditional land-line communications devices. In addition, the gateway 478 may provide the WTRUs 402a, 402b, 402c with access to the networks 412, which may include other wired or wireless networks that are owned and/or operated by other service providers.

Although not shown in FIG. 15E, it will be appreciated that the RAN 404 may be connected to other ASNs and the core network 406 may be connected to other core networks. The communication link between the RAN 404 the other ASNs may be defined as an R4 reference point, which may include protocols for coordinating the mobility of the WTRUs 402a, 402b, 402c between the RAN 404 and the other ASNs. The communication link between the core network 406 and the other core networks may be defined as an R5 reference, which may include protocols for facilitating interworking between home core networks and visited core networks.

Miscellaneous

Variations of the methods, apparatus and systems described above are possible without departing from the scope of the invention. In view of the wide variety of embodiments that can be applied, it should be understood that the illustrated embodiments are exemplary only, and should not be taken as limiting the scope of the following claims. For instance, in the exemplary embodiments described herein include handheld devices.

Throughout the disclosure, one of skill understands that certain representative embodiments may be used in the alternative or in combination with other representative embodiments.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module. Although the invention has been described in terms of video encoding and decoding methods, apparatus and systems, it is contemplated that they may be implemented in software on microprocessors/general purpose computers (not shown). In certain embodiments, one or more of the functions of the various components may be implemented in software that controls a general-purpose computer.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the described methods.

No element, act, or instruction used in the description of the present application should be construed as critical or essential to the invention unless explicitly described as such. Also, as used herein, each of the articles "a" and "an" are intended to include one or more items. Where only one item is intended, the terms "a single" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero.

Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

The contents of each of the following references are incorporated herein by reference:

(1) ITU-T Rec H.261, "Video Codec for Audiovisual services at px384 kbit/s", November 1988;
(2) ISO/IEC 11172-2:1993, "Information technology—Coding of moving pictures and associated audio for digital storage media at up to about 1.5 Mbit/s—part 2: Video", 1993;
(3) ISO/IEC 13818-2, "Information technology—Generic coding of moving pictures and associated audio information: Video", December, 2000;
(4) ITU-T Rec H.263, "Video coding for low bit rate communication";
(5) ISO/IEC 14496-2, "Information technology—Coding of audio-visual objects—part 2: Visual", December 2001;
(6) ITU-T Rec H.264 and ISO/IEC/MPEG 4 part 10, "Advanced video coding for generic audiovisual services", November 2007;
(7) B. Bross, W-J. Han, J-R. Ohm, G. J. Sullivan, Y. K. Wang, T. Wiegand, "High Efficiency Video Coding (HEVC) Text Specification Draft 10", Document no JCTVC-L1003, January 2013;
(8) A. Luthra, "Joint Call for Proposals on the Scalable Video Coding Extensions of HEVC", ISO/IEC JTC-1/SC29/WG11 N12957, July 2012;
(9) A. Luthra, "Use cases for the scalable enhancement of HEVC", ISO/IEC JTC-1/SC29/WG11 N12955, July 2012;
(10) A. Luthra, "Requirements for the scalable enhancement of HEVC", ISO/IEC JTC-1/SC29/WG11 N12956, July 2012;
(11) Heiko Schwarz, Detlev Marpe and Thomas Wiegand, "Overview of the Scalable Video coding Extension of the H.264/AVC Standard", IEEE Transactions on Circuits and Systems for Video Technology, Vol. 17, No. 9, September 2007;
(12) A. Vetro, T. Wiegand, G. Sullivan, "Overview of the stereo and multiview video coding extensions of the H.264/MPEG-4 AVC standard", Proceedings of the IEEE. 2011;
(13) U.S. Published Patent Application No. 2014/0010294, entitled "Codec Architecture for Multiple Layer Video Coding";
(14) U.S. Published Patent Application No. 2014/0064374, entitled "Method and Apparatus of Motion Vector Prediction for Scalable Video Coding";
(15) InterDigital Communications, "Description of scalable video coding technology", JCTVC document no JCTVC-K0034. October 2012;
(16) J. Chen, J. Boyce, Y. Ye, and M. M. Hunnuksela, "SHVC Test Model 4 (SHM 4)", JCTVC document no JCTVC-O1007, October 2013;
(17) J. Chen, J. Boyce, Y. Ye, and M. M. Hunnuksela, Y. K. Wang, "SHVC Draft 4", JCTVC document no JCTVC-O1008, October 2013;
(18) J-R. Ohm, G. J. Sullivan, "Meeting report of the 13th meeting of the Joint Collaborative Team on Video Coding (JCT-VC)", Incheon, K R, 18-26 Apr. 2013.
(19) G. J. Sullivan and T. Wiegand, "Rate-distortion optimization for video compression", IEEE Signal Processing Magazine, vol. 15, issue 6, November 1998;
(20) "SCE4: Summary Report of SHVC Core Experiment on inter-layer filtering", JCTVC document no JCTVC-M0024, April 2013;
(21) "MV-HEVC/SHVC HLS: On inter-layer sample and syntax prediction indications", JCTVC document no JCTVC-M045, April 2013;
(22) "AHG15: Interlaced to progressive scalability for SHVC hybrid codec use case," JCTVC document no JCTVC-P0163, January 2014;
(23) "Interlaced to progressive scalability in SHVC," JCTVC document no JCTVC-P0165, January 2014;
(24) "On field to frame scalability," JCTVC document no JCTVC-P0175, January 2014;
(25) "BoG report on phase adjustment in SHVC re-sampling process," JCTVC document no JCTVC-P0312, January 2014;
(26) J. Chen, J. Boyce, Y. Ye, and M. M. Hunnuksela, G. J. Sullivan, Y. K. Wang, "SHVC Draft 5," JCTVC document no JCTVC-P1008, January 2014; and
(27) U.S. Published Patent Application No. 2014/0037015, entitled "Upsampling based on sampling grid to align spatial layers in multi-layer video coding", April 2013.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A video decoding method implemented in a video decoder, comprising:
receiving a video signal including base layer video content comprising interlaced field pictures and enhancement layer video content comprising progressive frame pictures;
storing one or more sets of cross layer phase alignment parameters for use in resampling a video picture;
assembling one or more progressive frame inter-layer reference (ILR) pictures for use in predicting at least one progressive frame picture in the enhancement layer based on a field picture in the base layer and one or more of the sets of stored cross layer phase alignment parameters; and
predicting an enhancement layer picture using the ILR picture.

2. The method of claim 1 wherein the interlaced field pictures comprise top field pictures and bottom field pictures.

3. The method of claim 1 further comprising using a first set of the one or more sets of stored cross layer phase alignment parameters to resample a top field picture and using a second set of the one or more sets of stored cross layer phase alignment parameters to resample a bottom field picture.

4. The method of claim 1 wherein each of the stored one or more sets of cross layer phase alignment parameters comprises:
phaseX information that is used to select horizontal phase filters for a luma component of the one or more ILR reference pictures;
phaseXC information that is used to select horizontal phase filters for at least one of the chroma components of the one or more ILR reference pictures;

phaseY information that is used to select vertical phase filters for the luma component of the one or more ILR reference pictures; and/or phaseYC information that is used to select vertical phase filters for at least one of the chroma components of the one or more ILR reference pictures.

5. The method of claim 1 further comprising:
receiving a number indicator indicating a number of sets of cross layer phase alignment parameters that are being transmitted.

6. The method of claim 1 further comprising:
receiving at least one index indicator indicating at least one set of cross layer phase alignment parameters from among the stored one or more sets of cross layer phase alignment parameters to be used in assembling the at least one ILR picture.

7. The method of claim 6 wherein the at least one index indicator is received in a slice segment header.

8. The method of claim 6 wherein the assembling of the one or more ILR pictures includes:
selecting the phase filters for resampling of at least one of the luma and/or chroma components of the one or more ILR pictures based on the at least one set of cross layer phase alignment parameters indicated by the received at least one index indicator.

9. The method of claim 8 wherein the at least one index indicator is associated with a slice of the video signal, and the method further comprises adjusting at least one of the horizontal phase filters and vertical phase filters for a slice in the base layer video content for use in assembling the ILR picture in accordance with the index indicator associated with the slice.

10. The method of claim 1 further comprising receiving via signaling the one or more sets of cross layer phase alignment parameters to be stored.

11. The method of claim 10 wherein the one or more sets of cross layer phase alignment parameters to be stored are received in a Video Parameter Set (VPS).

12. The method of claim 10 wherein the one or more sets of cross layer phase alignment parameters to be stored are received in a Picture Parameter Set (PPS).

13. The method of claim 8 further comprising:
receiving via signaling a flag indicator indicating whether the at least one index indicator is being signaled.

14. The method of claim 1 further comprising:
receiving a flag indicator that indicates whether the one or more sets of cross layer phase alignment parameters are signaled.

15. The method of claim 14 wherein a first state of the flag indicator that indicates whether the one or more sets of cross layer phase alignment parameters are signaled indicates that the one or more sets of cross layer phase alignment parameters are not signaled and that the one or more sets of cross layer phase alignment parameters are to be inferred.

16. The method of claim 15 wherein the inferred one or more sets of cross layer phase alignment parameters comprise a set including a luma horizontal phase parameter, a luma vertical phase parameter, a chroma horizontal phase parameter, and a chroma vertical phase parameter, wherein the luma horizontal phase parameter, the luma vertical phase parameter, and the chroma horizontal phase parameter have the same value, and the chroma horizontal phase parameter and the chroma vertical phase parameter values have different values from each other.

17. The method of claim 15 wherein the inferred one or more sets of cross layer phase alignment parameters is a set comprising:

phaseX information that is used to select horizontal phase filters for a luma component of the one or more ILR reference pictures is 0;

phaseXC information that is used to select horizontal phase filters for at least one of the chroma components of the one or more ILR reference pictures is 0;

phaseY information that is used to select vertical phase filters for the luma component of the one or more ILR reference pictures is 0; and phaseYC information that is used to select vertical phase filters for at least one of the chroma components of the one or more ILR reference pictures is 1.

18. A video encoding method implemented in a video encoder, comprising:
transmitting a video signal including base layer video content comprising interlaced field pictures and enhancement layer video content comprising progressive frame pictures; and transmitting one or more sets of cross layer phase alignment parameters for use in resampling a video picture in the base layer for use by a video decoder in assembling one or more progressive frame inter-layer reference (ILR) pictures for predicting at least one progressive frame picture in the enhancement layer based on a field picture in the base layer and one or more of the sets of cross layer phase alignment parameters.

19. The method of claim 18 wherein each of the one or more sets of cross layer phase alignment parameters comprises:
phaseX information that is used to select horizontal phase filters for a luma component of the ILR reference picture;

phaseXC information that is used to select horizontal phase filters for at least one of the chroma components of the ILR reference picture;

phaseY information that is used to select vertical phase filters for the luma component of the ILR reference picture; and/or phaseYC information that is used to select vertical phase filters for at least one of the chroma components of the ILR reference picture.

20. The method of claim 18 further comprising:
transmitting a number indicator indicating a number of sets of phase values that are being transmitted.

21. The method of claim 18 further comprising transmitting at least one index indicator indicating at least one set of cross layer phase alignment parameters from among the one or more sets of cross layer phase alignment parameters to be used in assembling the ILR picture.

22. The method of claim 21 wherein the at least one index indicator is transmitted in a slice segment header.

23. The method of claim 18 wherein the plurality of sets of cross layer phase alignment parameters are transmitted in a Picture Parameter Set (PPS).

24. The method of claim 23 further comprising:
transmitting a flag indicator indicating whether the at least one index indicator is being signaled.

25. The method of claim 18 further comprising:
transmitting a flag indicator that indicates whether the one or more sets of cross layer phase alignment parameters are signaled or inferred.

26. The method of claim 25 wherein the inferred one or more sets of cross layer phase alignment parameters comprises a set including a luma horizontal phase parameter, a luma vertical phase parameter, a chroma horizontal phase parameter, and a chroma vertical phase parameter, wherein the luma horizontal phase parameter, the luma vertical phase parameter, and the chroma horizontal phase parameter have the same value, and the chroma horizontal phase parameter and the chroma vertical phase parameter have different values from each other.

* * * * *